US010007655B2

(12) United States Patent
Nishioka

(10) Patent No.: US 10,007,655 B2
(45) Date of Patent: Jun. 26, 2018

(54) TABLE SIZE DEPENDENT TRANSACTION TARGET TABLE DISPLAY

(71) Applicant: Rakuten, Inc., Shinagawa-ku, Tokyo (JP)

(72) Inventor: Yuhei Nishioka, Tokyo (JP)

(73) Assignee: Rakuten, Inc., Tokyo (JP)

( * ) Notice: Subject to any disclaimer, the term of this patent is extended or adjusted under 35 U.S.C. 154(b) by 242 days.

(21) Appl. No.: 14/416,744

(22) PCT Filed: Feb. 28, 2013

(86) PCT No.: PCT/JP2013/055503
§ 371 (c)(1),
(2) Date: Jan. 23, 2015

(87) PCT Pub. No.: WO2014/020929
PCT Pub. Date: Feb. 6, 2014

(65) Prior Publication Data
US 2015/0199324 A1 Jul. 16, 2015

(30) Foreign Application Priority Data

Jul. 31, 2012 (JP) ................ 2012-169503

(51) Int. Cl.
*G06F 17/00* (2006.01)
*G06F 17/24* (2006.01)
(Continued)

(52) U.S. Cl.
CPC ...... *G06F 17/245* (2013.01); *G06F 17/30864* (2013.01)

(58) Field of Classification Search
CPC ... B09B 7/00; G06F 15/16; G06F 7/06; G06F 17/00; G06F 17/264; G06F 17/30864
(Continued)

(56) References Cited

U.S. PATENT DOCUMENTS 6,779,152 B1 * 8/2004 Conner ............... G06F 17/2247
707/999.103
7,280,991 B1 * 10/2007 Beams ..................... G09B 7/04
706/46
(Continued)

FOREIGN PATENT DOCUMENTS

JP 10-254906 A 9/1998

OTHER PUBLICATIONS

"Excel 2010 Sorting Data", GCF LearnFree.org, captured by archive.org, on Dec. 28, 2012, (https://web.archive.org/web/20121228164025/http://www.gcflearnfree.org:80/excel2010/11.*
(Continued)

*Primary Examiner* — Cesar Paula
*Assistant Examiner* — Jian Huang
(74) *Attorney, Agent, or Firm* — Sughrue Mion, PLLC

(57) ABSTRACT

It is enabled to arrange transaction targets by using variations of attribute into a table and cause the table to be displayed. An information processing apparatus determines, for a transaction target group identified based on a user operation related to search for transaction targets, whether or not there are two or more attribute values for each attribute item. The information processing apparatus associates an attribute item where it is determined that there are two or more attribute values with tables, rows, or columns. The information processing apparatus identifies a transaction target having an attribute indicated by an attribute value corresponding to a cell from among the transaction target group for each cell. The information processing apparatus causes a table in which each cell includes display information indicating the identified transaction target to be displayed.

20 Claims, 34 Drawing Sheets

(51) Int. Cl.
*G06F 17/30* (2006.01)
*G06N 5/02* (2006.01)

(58) Field of Classification Search
USPC .......................................... 715/212; 709/204
See application file for complete search history.

(56) References Cited

U.S. PATENT DOCUMENTS

| | | | |
|---|---|---|---|
| 7,996,282 B1 | 8/2011 | Scott et al. | |
| 8,745,162 B2* | 6/2014 | Weber | G06F 17/30265 709/203 |
| 8,782,509 B2* | 7/2014 | Tang | G06F 17/246 715/212 |
| 2002/0052859 A1* | 5/2002 | Rosenfeld | G09B 7/04 706/47 |
| 2004/0006556 A1 | 1/2004 | Kwoh et al. | |
| 2006/0195782 A1* | 8/2006 | Wang | G06F 17/30905 715/205 |
| 2007/0101294 A1 | 5/2007 | Fong et al. | |
| 2008/0033915 A1 | 2/2008 | Chen et al. | |
| 2009/0089310 A1* | 4/2009 | Lara | G06F 17/30893 |
| 2011/0289422 A1 | 11/2011 | Spivack et al. | |

OTHER PUBLICATIONS

"Rotate the Data in Excel," published Apr. 1, 2001, in Journal of Accountancy, https://www.journalofaccountancy.com/issues/2001/apr/rotatethedatainexcel.html.*
Transpose_function_excel'_2001, published 2001.*
Excel'2010_screenshots.pdf.*
Transpose_code'2007, published online 2007 at https://www.mrexcel.com/forum/excel-questions/243555-need-help-conditional-transpose.html.*

* cited by examiner

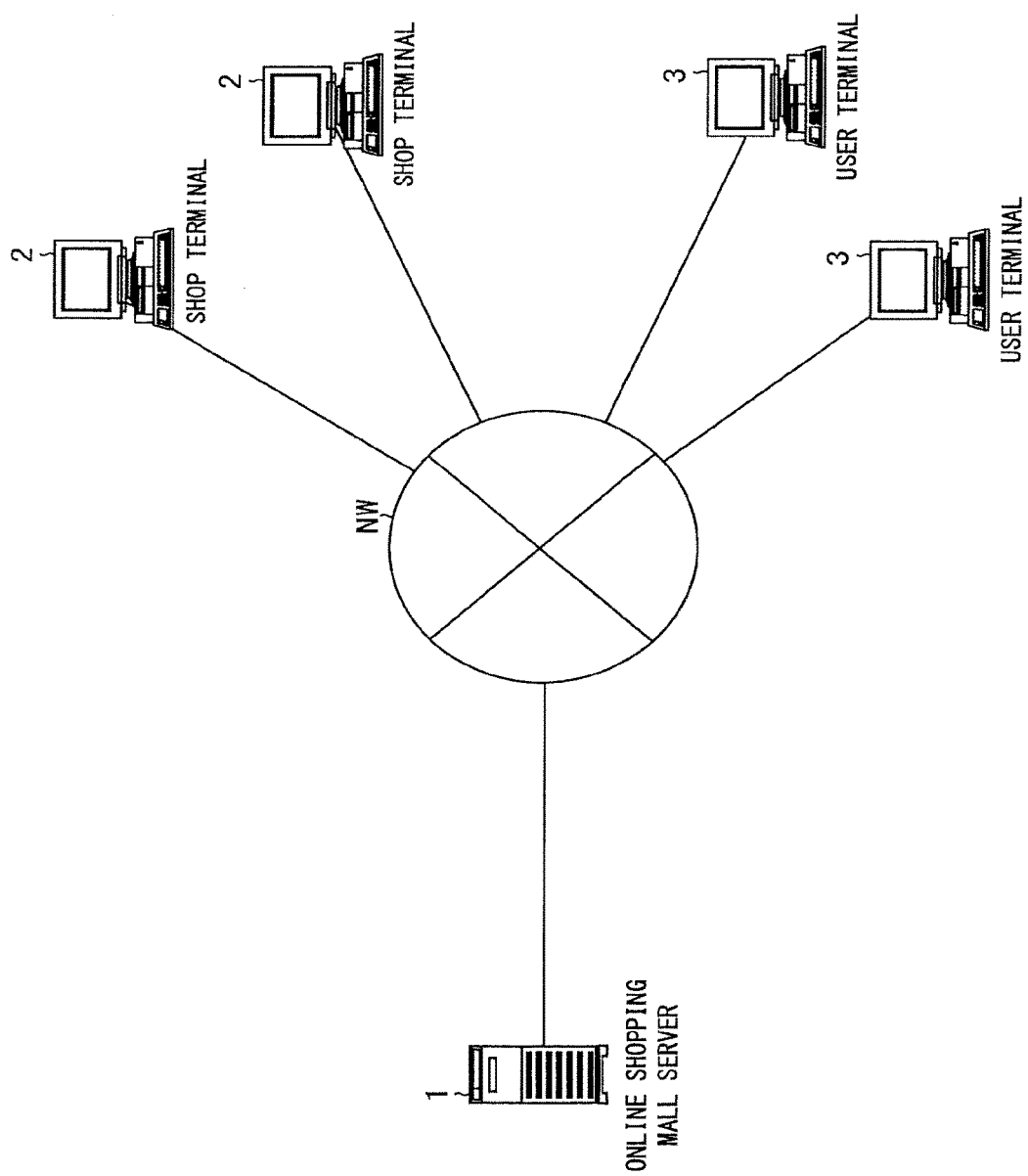

FIG.2A

| GENRE NAME | ATTRIBUTE NAME | PRIORITY |
|---|---|---|
| BEER AND WESTERN LIQUOR WATER AND SOFT DRINK | THE NUMBER OF BOTTLES OR CANS | 1 |
| | CONTENT VOLUME | 2 |
| | CONTAINER | 3 |
| | TASTE | 4 |
| | PRODUCT BRAND | 5 |
| TELEVISION SET | TYPE OF PANEL | 1 |
| | SCREEN SIZE | 2 |
| | POWER CONSUMPTION | 3 |
| | PRODUCT BRAND | 4 |
| REFRIGERATOR | CAPACITY | 1 |
| | NUMBER OF DOORS | 2 |
| | POWER CONSUMPTION | 3 |
| | PRODUCT BRAND | 4 |

FIG.2B

| SALE ITEM NAME | THE NUMBER OF BOTTLES OR CANS | CONTENT VOLUME (ml) | CONTAINER | TASTE | PRODUCT BRAND |
|---|---|---|---|---|---|
| QQQ ABB BOTTLE 334ml | 1 | 334 | BOTTLE | - | ABB |
| QQQ ABB CAN 350ml | 1 | 350 | CAN | - | ABB |
| QQQ ABB CAN 500ml | 1 | 500 | CAN | - | ABB |
| QQQ ABC SMALL BOTTLE | 1 | 334 | BOTTLE | - | ABC |
| QQQ ABC CAN 350ml | 1 | 350 | CAN | - | ABC |
| QQQ ABC MEDIUM BOTTLE | 1 | 500 | BOTTLE | - | ABC |
| QQQ ABC CAN 500ml | 1 | 500 | CAN | - | ABC |
| QQQ ABC LARGE BOTTLE | 1 | 633 | BOTTLE | - | ABC |
| QQQ ABC CAN 350ml×6 | 6 | 350 | CAN | - | ABC |
| QQQ ABC CAN 500ml×6 | 6 | 500 | CAN | - | ABC |
| QQQ ABC MEDIUM BOTTLE×20 | 20 | 500 | BOTTLE | - | ABC |
| QQQ ABC LARGE BOTTLE×20 | 20 | 633 | BOTTLE | - | ABC |
| QQQ ABC CAN 500ml×24 | 24 | 500 | CAN | - | ABC |
| RRR DEF ORANGE JUICE | 1 | 500 | PET BOTTLE | ORANGE | DEF |
| RRR DEF APPLE JUICE | 1 | 500 | PET BOTTLE | APPLE | DEF |
| RRR DEF ORANGE JUICE ×12 | 12 | 500 | PET BOTTLE | ORANGE | DEF |
| RRR DEF APPLE JUICE ×12 | 12 | 500 | PET BOTTLE | APPLE | DEF |

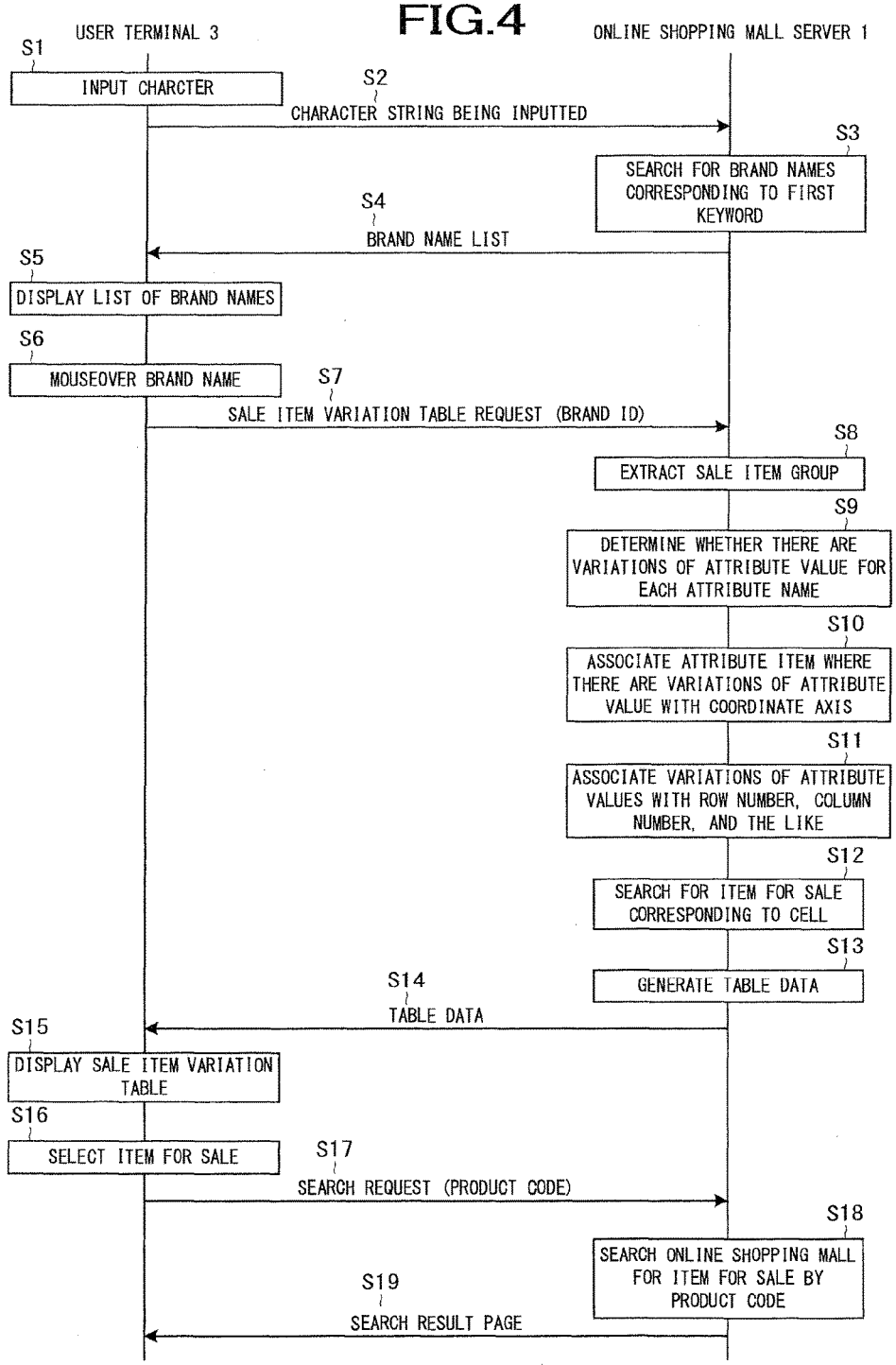

FIG.6A

| ROW NUMBER | 1 | 2 | 3 | 4 |
|---|---|---|---|---|
| NUMBER OF BOTTLES OR CANS | 1 | 6 | 20 | 24 |

FIG.6B

| COLUMN NUMBER | 1 | 2 | 3 | 4 |
|---|---|---|---|---|
| CONTENT VOLUME | 334ml | 350ml | 500ml | 633ml |

FIG.6C

| TAB NUMBER | 1 | 2 |
|---|---|---|
| CONTAINER | BOTTLE | CAN |

FIG.6D
BOTTLE

|  | 334ml | 350ml | 500ml | 633ml |
|---|---|---|---|---|
| 1 | O |  | O | O |
| 6 |  |  |  |  |
| 20 |  |  | O | O |
| 24 |  |  |  |  |

FIG.6E
CAN

|  | 334ml | 350ml | 500ml | 633ml |
|---|---|---|---|---|
| 1 |  | O | O |  |
| 6 |  | O | O |  |
| 20 |  |  |  |  |
| 24 |  |  | O |  |

FIG.6F
BOTTLE

|  | 334ml | 500ml | 633ml |
|---|---|---|---|
| 1 | O | O | O |
| 20 |  | O | O |

FIG.6G
CAN

|  | 350ml | 500ml |
|---|---|---|
| 1 | O | O |
| 6 | O | O |
| 24 |  | O |

FIG.10

| | BOTTLE | | |
|---|---|---|---|
| | 334ml | 500ml | 633ml |
| 1 | QQQ ABC SMALL BOTTLE | QQQ ABC MEDIUM BOTTLE | QQQ ABC LARGE BOTTLE |
| 20 | | QQQ ABC BOTTLE 500ml × 20 | QQQ ABC BOTTLE 633ml × 20 |

| | CAN | |
|---|---|---|
| | 350ml | 500ml |
| 1 | QQQ ABC CAN 350ml | QQQ ABC CAN 500ml |
| 6 | QQQ ABC CAN 350ml × 6 | QQQ ABC CAN 500ml × 6 |
| 24 | | QQQ ABC CAN 500ml × 24 |

Window: 300 ITEM VARIATIONS; Tabs: 301d ABB, 301e ABC; Sections: 310e-1, 310e-2

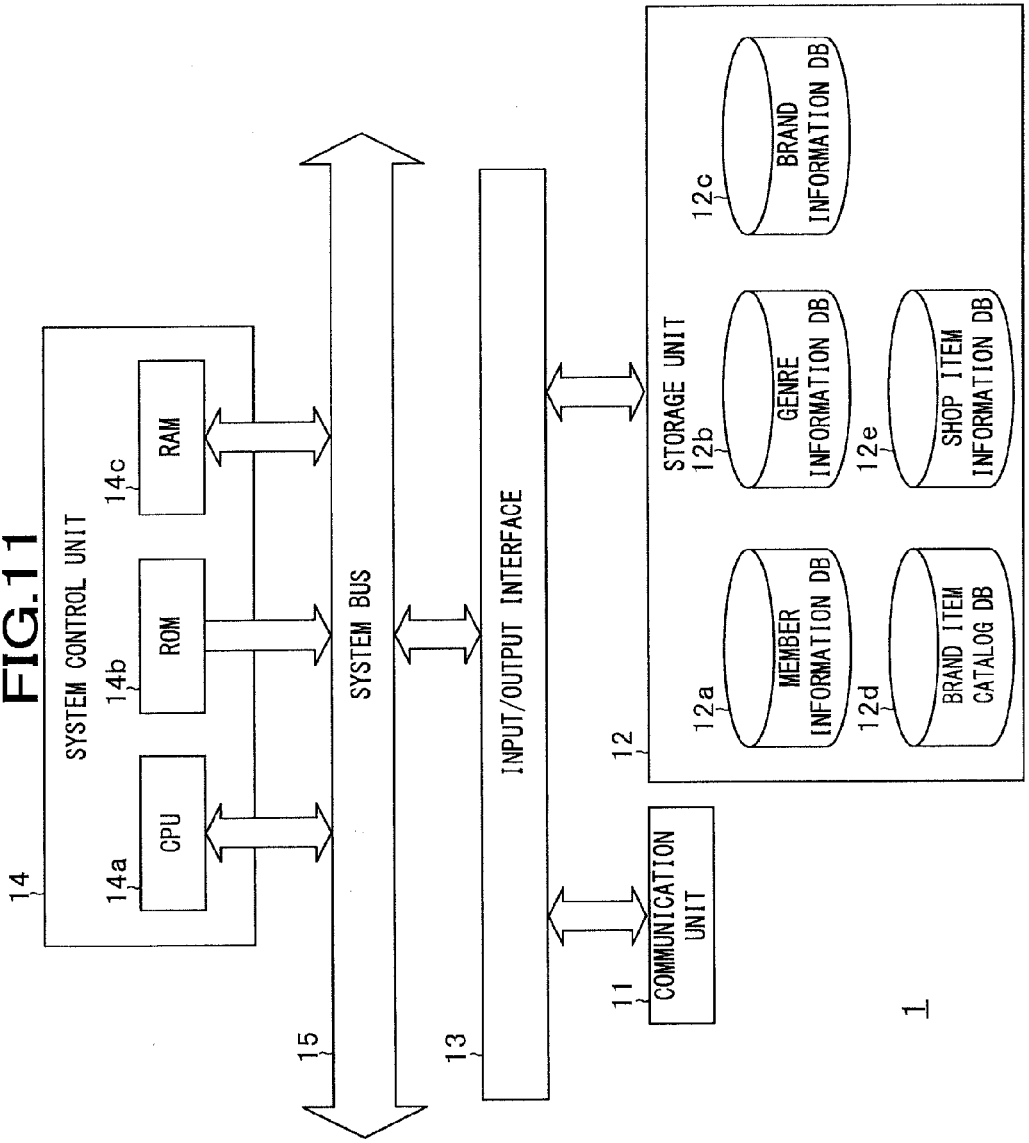

FIG.12A
MEMBER INFORMATION DB 12a

| |
|---|
| USER ID |
| PASSWORD |
| NICKNAME |
| NAME |
| DATE OF BIRTH |
| GENDER |
| POSTAL CODE |
| ADDRESS |
| PHONE NUMBER |
| EMAIL ADDRESS |
| ... |

FIG.12B
GENRE INFORMATION DB 12b

| |
|---|
| GENRE ID |
| GENRE NAME |
| LEVEL |
| PARENT GENRE ID |
| CHILD GENRE ID LIST |
| ATTRIBUTE INFORMATION 1 |
| ATTRIBUTE INFORMATION 2 |
| ... |

FIG.12C
ATTRIBUTE INFORMATION

| |
|---|
| ATTRIBUTE NAME |
| PRIORITY |
| ADDITIONAL CHARACTERS |

FIG.12D
BRAND INFORMATION DB 12c

| |
|---|
| BRAND ID |
| BRAND NAME |
| LEVEL |
| PARENT BRAND ID |
| CHILD BRAND ID LIST |
| GENRE ID |

FIG.12E
BRAND ITEM CATALOG DB 12d

| |
|---|
| PRODUCT CODE |
| SALE ITEM NAME |
| BRAND ID |
| EXPLANATORY TEXT |
| SALE ITEM IMAGE URL |
| ATTRIBUTE VALUE 1 |
| ATTRIBUTE VALUE 2 |
| ... |

FIG.12F
SHOP ITEM INFORMATION DB 12e

| |
|---|
| SHOP ID |
| SALE ITEM ID |
| PRODUCT CODE |
| GENRE ID |
| SALE ITEM NAME |
| SALE ITEM IMAGE URL |
| SALE ITEM DESCRIPTION |
| SALE ITEM PRICE |
| ... |

FIG.21A

BOTTLE

| | 334ml | 500ml | 633ml |
|---|---|---|---|
| 1 | ○ | ○ | ○ |
| 20 | | ○ | ○ |

CAN

| | 350ml | 500ml |
|---|---|---|
| 1 | ○ | ○ |
| 6 | ○ | ○ |
| 24 | | ○ |

| | BOTTLE |
|---|---|
| 1 | ○ |

500ml

| | BOTTLE | CAN |
|---|---|---|
| 1 | ○ | ○ |
| 6 | | ○ |
| 20 | ○ | |
| 24 | | ○ |

350ml

| | CAN |
|---|---|
| 1 | ○ |
| 6 | ○ |

633ml

| | BOTTLE |
|---|---|
| 1 | ○ |
| 20 | ○ |

| | BOTTLE | CAN |
|---|---|---|
| 334ml | ○ | |
| 350ml | | ○ |
| 500ml | ○ | |
| 633ml | ○ | ○ |

20

| | BOTTLE |
|---|---|
| 500ml | ○ |
| 633ml | ○ |

6

| | CAN |
|---|---|
| 350ml | ○ |
| 500ml | ○ |

24

| | CAN |
|---|---|
| 500ml | ○ |

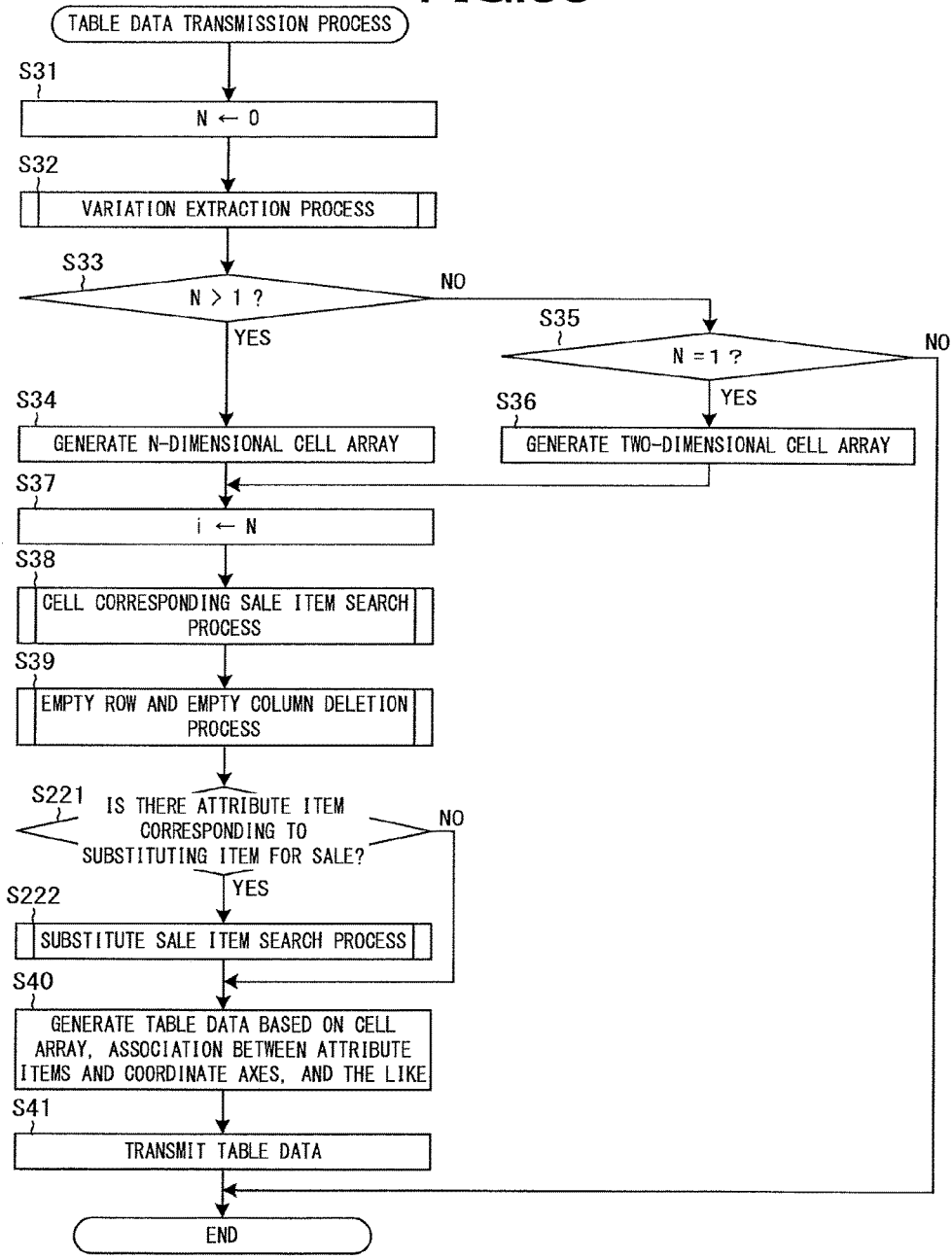

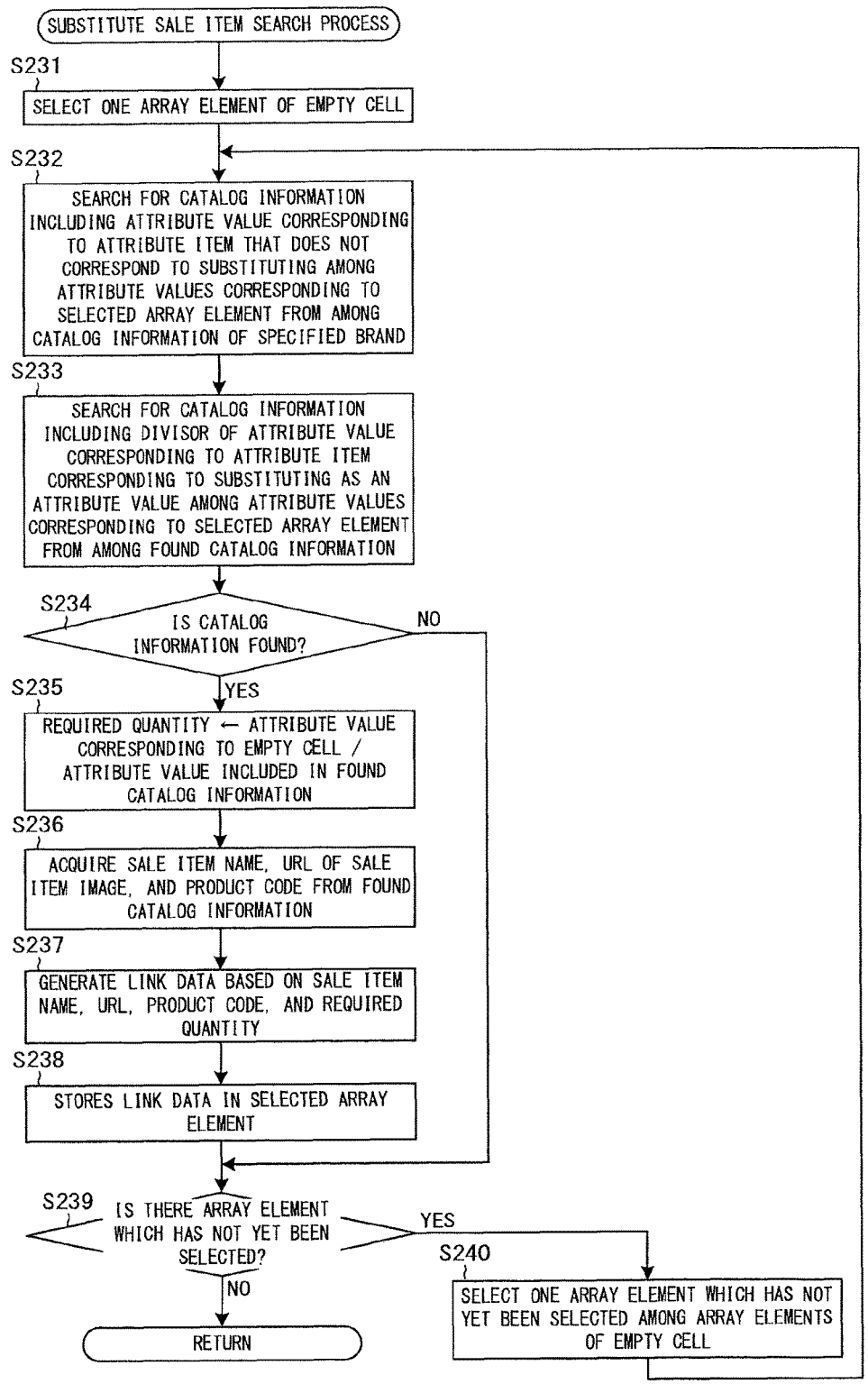

TABLE SIZE DEPENDENT TRANSACTION TARGET TABLE DISPLAY

CROSS REFERENCE TO RELATED APPLICATIONS

This application is a National Stage of International Application No. PCT/JP2013/055503, filed Feb. 28, 2013, claiming priority based on Japanese Patent Application No. 2012-169503, filed Jul. 31, 2012, the contents of all of which are incorporated herein by reference in their entirety.

TECHNICAL FIELD

The present invention relates to a technical field of an information processing apparatus and an information processing method which control display of information related to a transaction target.

BACKGROUND ART

Conventionally, systems are known which perform search based on a search condition specified by a user and cause a search result to be displayed. For example, Patent Document 1 describes displaying objects stored in a storage area of a file system in a main window by replacing objects with other objects for each storage area, displaying objects found based on a search key in a search result display window, and drawing an object, in the main window, having the same category as an object selected from the search result display window as an object related to the selected object.

CITATION LIST

Patent Document

Patent Document 1: Japanese Patent Application Laid-Open No. 10-254906

SUMMARY OF INVENTION

Technical Problem

Meanwhile, the transaction target has some kind of attribute. For example, when a transaction target group including a plurality of transaction targets is identified according to a user operation such as specifying a search condition, variations of attribute may appear among the transaction target group. However, when various transaction targets are handled, types of attributes held by the transaction targets are different due to, for example, divisions of the transaction targets and the like, so that it is impossible to arrange the transaction targets by using the variations of attribute and display the transaction targets.

The present invention is made in view of the above situation, and an object of the present invention is to provide an information processing apparatus, an information processing method, and an information processing program, which can arrange the transaction targets into a table by using the variations of attribute and cause the table to be displayed.

Solution to Problem

In order to solve the above problem, the invention according to claim 1 is an information processing apparatus comprising: a determination means that determines, for a transaction target group identified based on a user operation from among a plurality of transaction targets each having an attribute indicated by an attribute value corresponding to an attribute item, whether or not there are two or more attribute values for each attribute item; an association means that associates the attribute item where it is determined that there are two or more attribute values by the determination means with tables, rows, or columns; a transaction target identification means that identifies, on the basic of association by the association means, the transaction target having the attribute indicated by the attribute value corresponding to a cell of the table from among the transaction target group for each cell; and a table display control means that causes the table in which the cell includes display information indicating the transaction target identified by the transaction target identification means to be displayed.

According to the invention, display information indicating a transaction target having an attribute indicated by an attribute value corresponding to the position of a cell is displayed in the cell. Therefore, it is possible to arrange the transaction targets by using variations of attribute into a table and cause the table to be displayed.

Even if a transaction target group is identified based on a user operation related to search of transaction target, for example, when only a list of transaction targets included in the identified transaction target group is just displayed, the user cannot easily recognize what attribute each transaction target has. Therefore, for example, the user has to perform an operation to check what attribute each transaction target has and look for a transaction target having an attribute which the user desires. When the information processing apparatus executes processing according to the user operation, the processing load of the information processing apparatus increases. On the other hand, according to the present embodiment, the transaction targets are arranged by using the variations of attribute and displayed, so that it is possible to reduce such a user operation. Therefore, it is possible to reduce the processing load of the information processing apparatus.

The invention according to claim 2 is the information processing apparatus according to claim 1, further comprising: an attribute item information acquisition means that acquires attribute item information of a division to which the transaction target group belongs from an attribute item information storage means storing the attribute item information indicating the attribute item for each division of the transaction target; and an attribute value acquisition means that acquires the attribute value of each transaction target included in the transaction target group from an attribute value storage means storing the attribute value of each transaction target for each transaction item, wherein the determination means determines whether or not there are two or more attribute values on the basis of the attribute value acquired by the attribute value acquisition means for the attribute item indicated by the attribute item information acquired by the attribute item information acquisition means.

According to the invention, an administrator or the like can set an attribute item suitable for a division of the transaction target as an attribute item where variations of attribute value are showed in a table.

The invention according to claim 3 is the information processing apparatus according to claim 1 or 2, wherein the transaction target group is identified by using a brand of the transaction target, which is positioned in a layer lower than that of a corporate brand in a hierarchy of brands.

According to the invention, the transaction target group is identified by using a brand of a transaction target which is positioned at a layer lower than that of a corporate brand, so that it is possible to reduce cells that do not include display information. The reason of this is because it is highly probable that a company prepares transaction targets that are applied to a wide range of fields from among various combinations of variations of attribute value determined by the company.

The invention according to claim 4 is the information processing apparatus according to any one of claims 1 to 3, wherein the association means includes a row-column determination means that determines, for at least one of the attribute items where it is determined that there are two or more attribute values by the determination means, whether the attribute item is associated with the rows or the columns so that a number relationship between a number of vertical cells and a number of horizontal cells in the table corresponds to a length relationship between a vertical length and a horizontal length of an area in which the table is displayed.

According to the invention, the number relationship between the number of vertical cells and the number of horizontal cells in the table corresponds to the length relationship between the vertical length and the horizontal length of the display area, so that the user can easily see the entire table.

The invention according to claim 5 is the information processing apparatus according to any one of claims 1 to 4, wherein the association means includes an attribute item determination means that determines the attribute item that is associated with the rows, the attribute item that is associated with the columns, and the attribute item that is associated with the tables when there are three or more attribute items where it is determined that there are two or more attribute values by the determination means, and the table display control means enables each of a plurality of the tables to be displayed.

According to the invention, even when there are three or more attribute items where there are variations of attribute value, it is possible to cause a table including display information of a transaction target corresponding to a combination of variations of attribute values to be displayed.

The invention according to claim 6 is the information processing apparatus according to claim 5, further comprising: a priority acquisition means that acquires a priorities of the attribute items in the division to which the transaction target group belongs from a priority storage means storing priorities of the attribute items for each division, wherein the attribute item determination means determines the attribute item that is associated with the tables on the basis of the priority acquired by the priority acquisition means.

According to the invention, when an administrator or the like sets a priority for each attribute item for each genre, it is possible to cause a table to be displayed in a form according to the priorities.

The invention according to claim 7 is the information processing apparatus according to claim 5 or 6, wherein the table display control means causes the table from which a row and a column that do not include the display information are removed to be displayed, and the attribute item determination means determines the attribute item that is associated with the tables so that a number of cells that do not include the display information among cells in the plurality of tables is the smallest.

According to the invention, it is possible to cause a table in which the number of cells that do not include display information is small to be displayed.

The invention according to claim 8 is the information processing apparatus according to any one of claims 5 to 7, further comprising: an attribute value identification means that identifies the attribute value corresponding to a search condition specified based on the user operation from among the attribute values where it is determined that there are two or more of them by the determination means, wherein the attribute item determination means determines the attribute item corresponding to the attribute value identified by the attribute value identification means to be the attribute item associated with the tables, and the table display control means enables each of the plurality of tables to be displayed so that a table to be displayed can be replaced with another table of the plurality of tables, and causes the table corresponding to the attribute value identified by the attribute value identification means to be displayed at first among the plurality of tables.

According to the invention, it is possible to cause a table corresponding to a transaction target having an attribute desired by the user to be displayed among a plurality of tables.

The invention according to claim 9 is the information processing apparatus according to any one of claims 1 to 8, wherein for the cell to which there is no transaction target having the attribute indicated by the attribute value corresponding, the transaction target identification means identifies a transaction target to be a component of one transaction target and a number of the components so that the one transaction target has the attribute indicated by the attribute value corresponding to the cell when a plurality of the same transaction targets compose the one transaction target, and the table display control means causes the table in which the cell includes the display information according to the transaction target and the number that are identified by the transaction target identification means to be displayed.

According to the invention, even for a cell where there is no transaction target having an attribute indicated by a corresponding attribute value, when a plurality of transaction targets is provided, if the transaction targets are substantially equivalent to a transaction target having an attribute indicated by an attribute value corresponding to the cell, display information of the transaction targets is displayed in a form according to the number required. Therefore, the user can easily recognize that there is a substitute transaction target.

The invention according to claim 10 is the information processing apparatus according to any one of claims 1 to 9, further comprising: a division display control means that causes one or more divisions identified based on a word included in a search character string inputted by a user to be displayed from among a plurality of divisions of the transaction target; a transaction target group identification means that identifies the transaction target group belonging to the division specified by the user from the one or more displayed divisions; a search means that, when any of the display information is specified by the user from the displayed table, searches a transaction target information storage means for transaction target information related to the transaction target indicated by the specified display information, the transaction target information storage means storing the transaction target information related to the transaction target provided from each of a plurality of providers that may provide the same transaction targets, the providers being different from each other; and a search result display control means that causes a search result by the search means to be displayed, wherein the determination means determines whether or not there are two or more attribute values for the transaction target group identified by the transaction target group identification means.

According to the invention, if there are one or more providers that provide a transaction target indicated by display information specified by the user among a plurality of providers, information related to the transaction target for each provider is displayed as a search result. Therefore, it is possible to easily search for a transaction target which belongs to a division desired by the user and has an attribute desired by the user.

The invention according to claim 11 is an information processing method performed by a computer, the method comprising: a determination step of determining, for a transaction target group identified based on a user operation from among a plurality of transaction targets each having an attribute indicated by an attribute value corresponding to an attribute item, whether or not there are two or more attribute values for each attribute item; an association step of associating the attribute item where it is determined that there are two or more attribute values in the determination step with tables, rows, or columns; a transaction target identification step of identifying, on the basis of association in the association step, the transaction target having the attribute indicated by the attribute value corresponding to a cell of the table from among the transaction target group for each cell; and a table display control step of causing the table in which the cell includes display information indicating the transaction target identified in the transaction target identification step to be displayed.

The invention according to claim 12 is an information processing program that causes a computer to function as: a determination means that determines, for a transaction target group identified based on a user operation from among a plurality of transaction targets each having an attribute indicated by an attribute value corresponding to an attribute item, whether or not there are two or more attribute values for each attribute item; an association means that associates the attribute item where it is determined that there are two or more attribute values by the determination means with tables, rows, or columns; a transaction target identification means that identifies, on the basis of association by the association means, the transaction target having the attribute indicated by the attribute value corresponding to a cell of the table from among the transaction target group for each cell; and a table display control means that causes the table in which the cell includes display information indicating the transaction target identified by the transaction target identification means to be displayed.

Advantageous Effect of Invention

According to the present invention, display information indicating a transaction target having an attribute indicated by an attribute value corresponding to the position of a cell is displayed in the cell. Therefore, it is possible to arrange the transaction targets by using variations of attribute into a table and cause the table to be displayed.

BRIEF DESCRIPTION OF DRAWINGS

FIG. 1 is a diagram illustrating an example of a schematic configuration of an information processing system S according to an embodiment.

FIG. 2A is a diagram illustrating an example of attribute names defined for each genre.

FIG. 2B is information illustrating a registration example of attribute values.

FIG. 4 is a sequence diagram illustrating a process overview of the information processing system S according to an embodiment.

FIG. 6A is a diagram illustrating an example of association between variations of attribute value corresponding to "the number of bottles or cans" and row numbers.

FIG. 6B is a diagram illustrating an example of association between variations of attribute value corresponding to "content volume" and column numbers.

FIG. 6C is a diagram illustrating an example of association between variations of attribute value corresponding to "container" and tab numbers.

FIG. 6D is a diagram illustrating an example of content of a sale item variation table corresponding to "bottle".

FIG. 6E is a diagram illustrating an example of content of a sale item variation table corresponding to "can".

FIG. 6F is a diagram illustrating an example of content of a sale item variation table corresponding to "bottle" from which rows and columns where all cells are empty are deleted.

FIG. 6G is a diagram illustrating an example of content of a sale item variation table corresponding to "can" from which rows and columns where all cells are empty are deleted.

FIG. 10 is a diagram illustrating a display example of the sale item variation window 300 when the user selects a tab 301*e*.

FIG. 11 is a block diagram illustrating an example of a schematic configuration of an online shopping mall server 1 according to an embodiment.

FIG. 12A is a diagram illustrating an example of content registered in a member information DB 12*a*.

FIG. 12B is a diagram illustrating an example of content registered in a genre information DB 12*b*.

FIG. 12C is a diagram illustrating an example of content included in attribute information.

FIG. 12D is a diagram illustrating an example of content registered in a brand information DB 12*c*.

FIG. 12E is a diagram illustrating an example of content registered in a brand item catalog DB 12*d*.

FIG. 12F is a diagram illustrating an example of content registered in a shop item information DB 12*f*.

FIGS. 21A to 21C are diagrams illustrating an example of content of sale item variation tables in which rows and columns where all cells are empty are deleted.

FIG. 33 is a flowchart illustrating a process example of a table data transmission process of a system control unit 14 of the online shopping mall server 1 according to an embodiment.

FIG. 34 is a flowchart illustrating a process example of a substitute sale item search process of the system control unit 14 of the online shopping mall server 1 according to an embodiment.

DESCRIPTION OF EMBODIMENTS

Figure 3A:
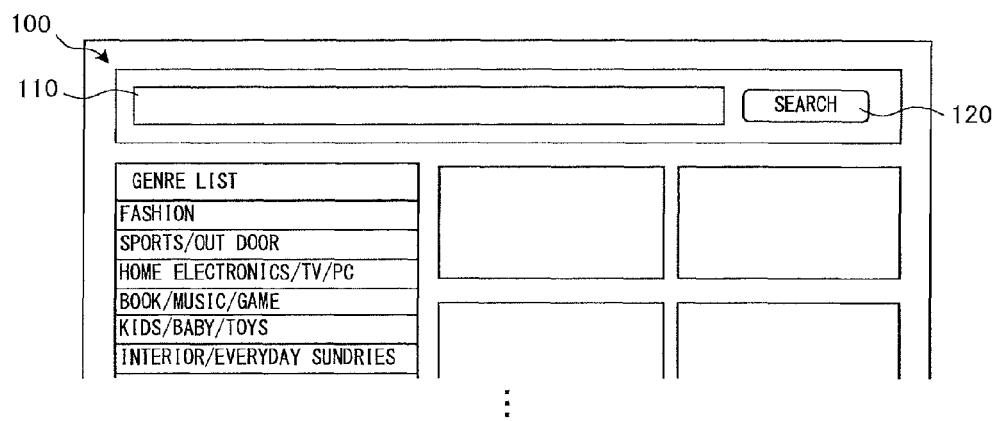
FIG. 3A is a diagram illustrating a display example of a top page of an online shopping mall.

Hereinafter, embodiments of the present invention will be described in detail with reference to the drawings. The embodiments described below are embodiments where the present invention is applied to an information processing system.

1. First Embodiment 1-1. Schematic Configuration and Function of Information Processing System First, a configuration of an information processing system S according to the present embodiment will be described with reference to FIG. 1. FIG. 1 is a diagram illustrating an example of a schematic configuration of the information processing system S according to the present embodiment.

As illustrated in FIG. 1, the information processing system S includes an online shopping mall server 1, a plurality of shop terminals 2, and a plurality of user terminals 3. The online shopping mall server 1, each shop terminal 2, and each user terminal 3 can transmit and receive data to and from each other through a network NW by using, for example, TCP/IP as a communication protocol. The network NW includes, for example, the Internet, a dedicated communication line (for example, a CATV (Community Antenna Television) line), a mobile communication network (including a base station and the like), and a gateway.

The online shopping mall server 1 is a server device that executes various processes related to an online shopping mall from which items for sale can be purchased. The online shopping mall server 1 is an example of an information processing apparatus of the present invention. A user can purchase a desired item for sale from a desired shop by using the online shopping mall. For example, the online shopping mall server 1 transmits a web page of the online shopping mall and executes processes related to a search and a purchase of an item for sale according to a request from the user terminal 3. The item for sale is an example of a transaction target of the present invention.

The shop terminal 2 is a terminal device used by an employee or the like of a shop that is open in the online shopping mall. The shop terminal 2 accesses a server device such as the online shopping mall server 1 based on an operation from the employee or the like. Thereby, the shop terminal 2 receives a web page from the server device and displays the web page. In the shop terminal 2, software such as a browser and an email client is installed. For example, an employee registers information of an item for sale to be sold in the online shopping mall and checks content of order of an item for sale by using the shop terminal 2. The shop is an example of a provider that provides transaction targets.

The user terminal 3 is a terminal device of a user who uses the online shopping mall. The user terminal 3 receives a web page from the online shopping mall server 1 and displays the web page by accessing the online shopping mall server 1 based on an operation from the user. In the user terminal 3, software such as a browser and an email client is installed. For example, a personal computer, a PDA (Personal Digital Assistant), a mobile information terminal such as a smartphone, and a mobile phone are used as the user terminal 3.

1-2. Attribute of Item for Sale

Next, attributes of items for sale which are sold in the online shopping mall will be described with reference to FIG. 2.

Each items for sale which is sold in the online shopping mall is categorized by a shop that sells the item for sale. The genre of the item for sale is a division of the item for sale when the item for sale is classified based on a predetermined criterion. The genre may be referred to as a category. For example, an item for sale is classified by the type of the item for sale. A genre name that is a name of a genre is, for example, a common noun. The genres of item for sale are hierarchically defined by a tree structure. In the tree structure, a genre corresponding to a child of a certain genre is referred to as a "child genre". A genre corresponding to a descendant of a certain genre is referred to as a "descendant genre". A genre corresponding to a parent of a certain genre is referred to as a "parent genre". For example, there are genres such as "food", "water and soft drink", and "beer and Western liquor" as the highest genres. As child genres of the "beer and Western liquor", for example, there are "beer", "Western liquor", "liqueur", and the like. The genre is an example of a division in the present invention.

As a division of an item for sale, there is a brand in addition to the genre. The brand indicates the source (for example, producer or seller) of an item for sale. A brand name is basically a proper noun. Examples of the type of brand include a corporate brand and a product brand. The corporate brand is a brand of the company itself as a producer or a seller of an item for sale. A product brand is a brand of at least one, not but all, of items for sale produced or sold by a company. The brands are hierarchically defined by a tree structure. The brand located at the highest layer is the corporate brand. The brand located at a layer lower than that of the corporate brand is the product brand. In the present embodiment, the number of layers of the brand is two. The brand located at the first layer is the corporate brand and the brand located at the second layer is the product brand. The number of hierarchies of the brand may be only one or may be three or more. A brand corresponding to a child of a certain brand is referred to as a "child brand". A brand corresponding to a parent of a certain brand is referred to as a "parent brand". The brand is an example of a division in the present invention.

Each item for sale has attributes. The attribute is defined with an attribute name and an attribute value for each attribute item. The attribute name is a name of the attribute. The attribute name indicates an item or a type of the attribute. The attribute name is an example of attribute item information in the present invention. An attribute of an item for sale has an attribute value corresponding to the attribute name. The actual attribute value is a numerical value or a character string.

FIG. 2A is a diagram illustrating an example of attribute names defined for each genre. In the online shopping mall, attribute names of attributes of items for sale that belong to a genre are registered for each genre in a genre information DB 12b described later. As illustrated in FIG. 2A, for example, "the number of bottles or cans", "content volume", "container", "taste", and "product brand" are defined as attribute names corresponding to genres of beverage such as "water and soft drink" and "beer and Western liquor". Further, for example, "type of panel", "screen size", "power consumption", and "product brand" are defined as attribute names corresponding to a genre of "television set". Further, for example, "capacity", "the number of doors", "power consumption", and "product brand" are defined as attribute names corresponding to a genre of "refrigerator". The priority illustrated in FIG. 2A will be described later.

FIG. 2B is information illustrating a registration example of attribute values. Regarding each item for sale produced and/or sold by a company that has a brand, in a catalog of a brand item, attribute values corresponding to attribute names corresponding to a genre to which the item for sale belongs are registered. FIG. 2B illustrates a registration example of attribute values of beverage items for sale. As illustrated in FIG. 2B, attributes corresponding to each of "the number of bottles or cans", "content volume", "container", "taste", and "product brand" are registered for beverage items for sale. In FIG. 2B, "QQQ" is a corporate brand name of a company Q that produces and sells beer. "ABB" and "ABC" are product brand names of the beer produced and sold by the company Q. "RRR" is a corporate brand name of a company R that produces and sells soft drinks. "DEF" is a product brand name of juice produced and sold by the company R. Attribute values corresponding to "taste" of the beer of the product brands ABB and ABC are set to an invalid value.

1-3. Display of Sale Item Variation Table

Next, a display of a sale item variation table will be described with reference to FIGS. 3 to 10.

When a brand is specified by a user, the online shopping mall server 1 causes the user terminal 3 to display a sale item variation table for items for sale of the specified brand. The sale item variation table is a table representing variations of the item for sale of the specified brand. Specifically, the sale item variation table is a table in which the items for sale are arranged by using the variations of attribute value and displayed for attribute items which has variations in the attribute value among attribute items corresponding to the specified brand. The sale item variation table is an example of a table in the present invention.

When the user selects any one of items for sale from the sale item variation table, the online shopping mall server 1 searches the online shopping mall for the selected item for sale. To search the online shopping mall for the item for sale is to search for the item for sale from items for sale sold by a plurality of shops but not to search a catalog of brand items for the item for sale.

FIG. 3A is a diagram illustrating a display example of a top page of the online shopping mall. The top page is a web page located at the highest level in the online shopping mall. As illustrated in FIG. 3, the top page includes a search condition setting area 100. The search condition setting area 100 is an area in which elements and the like to specify the search condition are displayed. Specifically, the search condition setting area 100 includes a keyword input field 110, a search button 120, and the like. The keyword input field 110 is an area for inputting a keyword as a search condition. A user can input a plurality of keywords by inputting blanks as separators between keywords. When the search button 120 is selected, the online shopping mall server 1 searches the online shopping mall for items for sale by the keyword inputted in the keyword input field 110. The keyword inputted in the keyword input field 110 is an example of a word in the present invention. Inputting a keyword in the keyword input field 110 is an example of an operation related to a search of a transaction target.

FIG. 4 is a sequence diagram illustrating a process overview of the information processing system S according to the present embodiment. As illustrated in FIG. 4, every time a user inputs a character to the keyword input field 110 (step S1), the user terminal 3 transmits a character string being inputted in the keyword input field 110 to the online shopping mall server 1 (step S2). The online shopping mall server 1 which receives the character string searches for brand names corresponding to the first keyword included in the character string (step S3). The brand names corresponding to the keyword may be, for example, at least one of a brand name identical to the keyword and brand names partially identical to the keyword. Further, the brand names corresponding to the keyword may be, for example, brand names whose forward part is identical to the keyword or brand names whose backward part is identical to the keyword. When the user inputs a plurality of keywords, the online shopping mall server 1 may search for, for example, brand names corresponding to any one of the plurality of keywords.

Next, the online shopping mall server 1 transmits a list of the brand names found by the search to the user terminal 3 (step S4). The user terminal 3 displays the received list of the brand names (step S5).

Figure 3B:
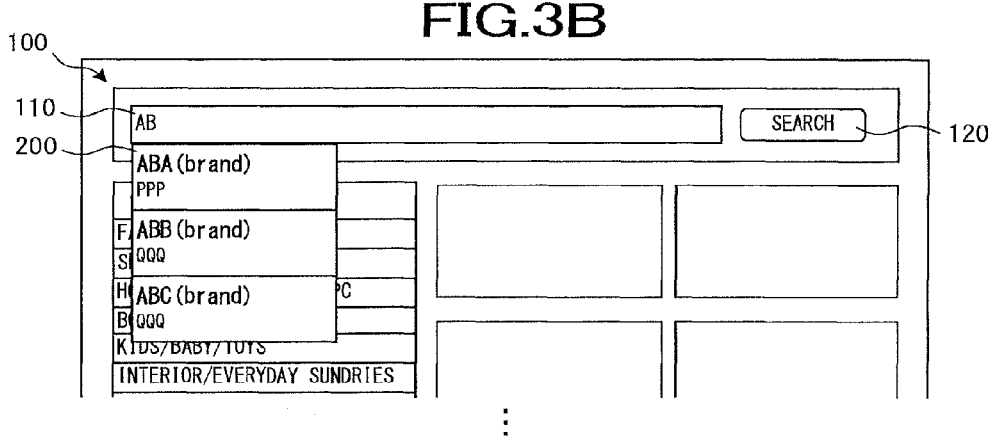
FIG. 3B is a diagram illustrating a display example of a list of brand names.

FIG. 3B is a diagram illustrating a display example of the list of the brand names. When there are brand names corresponding to the first keyword included in the character string being inputted into the keyword input field 110, as illustrated in FIG. 3B, a proposal area 200 is displayed in the top page. The proposal area 200 is an area in which a list of the brand names is displayed as candidates for a search condition. For example, when the user inputs "AB" in the keyword input field 110, for example, brand names such as "ABA", "ABB", and "ABC" are displayed in the proposal area 200.

After the list of the brand names is displayed, when the user clicks any one of the brand names from the proposal area 200, the online shopping mall server 1 transmits a web page that displays information related to the brand indicated by the clicked brand name to the user terminal 3. Or, the online shopping mall server 1 may search the online shopping mall for items for sale related to the brand indicated by the clicked brand name.

On the other hand, if the user mouses over, or hovers a mouse pointer over, any one of the brand names from the proposal area 200 (step S6), the user terminal 3 transmits a sale item variation table request to the online shopping mall server 1 (step S7). The sale item variation table request includes a brand ID corresponding to the brand name moused over. The brand ID is identification information of the brand. Mousing over a brand name is an example of specifying the brand name. For example, when the user operates a cursor key and focuses one of the brand names, the brand name may be specified. Specifying a brand name is an example of an operation related to a search of a transaction target.

In the description below, an example will be described in which the user selects "ABB" from the proposal area 200. The online shopping mall server 1 extracts a sale item group, or a group of items for sale, of a brand corresponding to the brand ID included in the sale item variation table request from a catalog of brand item (step S8). For example, as illustrated in FIG. 2B, there are three items for sale whose product brand name are "ABB"s. Therefore, the online shopping mall server 1 extracts the three items for sale as a sale item group.

The online shopping mall server 1 determines whether or not there are variations of attribute value in the extracted sale item group for each attribute item. When there are variations, it means that there are two or more attribute values different from each other among attribute values of items for sale included in the sale item group. Two or more attribute values different from each other in a certain attribute item are variations of the attribute value. In a certain attribute item, the number of variations of the attribute value is referred to as "the number of variations". When the number of variations is two or more, there are variations. For example, as illustrated in FIG. 2B, all the attribute values corresponding to the "the number of bottles or cans" of the items for sale whose product brand name are "ABB"s are "1" s. Therefore, there is no variation of the number of bottles or cans. All the attribute values corresponding to the "taste" are invalid values. Therefore, there is no variation of the taste. There is no variation of the product brand. On the other hand, the attribute values corresponding to the "content volume" are "334", "350", and "500". Therefore, there are three variations of the content volume. The attribute values corresponding to the "container" are "bottle", "can", and "can". Therefore, there are two variations of the container.

Next, the online shopping mall server 1 associates an attribute item where there are variations of attribute value with a coordinate axis of cells of the sale item variation table (step S10). When it is assumed that there are coordinate axes of cells corresponding to the sale item variation table, there are at least a row direction coordinate axis and a column direction coordinate axis. The row direction coordinate axis is referred to as a "column axis". The column direction coordinate axis is referred to as a "row axis". When the attribute item is associated with the row axis, the variations of the attribute value corresponding to the attribute item are associated with the rows. When the attribute item is associated with the column axis, the variations of the attribute value corresponding to the attribute item are associated with the columns. As illustrated in FIG. 2A, a priority is defined for each attribute item. Therefore, the online shopping mall server 1 performs associating based on the priority. Specifically, among the attribute items having variations of the attribute value, the online shopping mall server 1 associates an attribute item having the highest priority with the row axis and associates an attribute item having the second highest priority with the column axis. For example, as illustrated in FIG. 2A, the priority of the number of bottles or cans is 1, the priority of the content volume is 2, the priority of the container is 3, the priority of the taste is 4, and the priority of the product brand is 5. In any genre, the priority of the product brand may be set to the lowest level. The online shopping mall server 1 associates the content volume with the row axis and associates the container with the column axis for the sale item group of "ABB". For example, the online shopping mall server 1 may associate an attribute item having the highest priority with the column axis and associate an attribute item having the second highest priority with the row axis.

Next, the online shopping mall server 1 associates the variations of attribute values with position components of the cells in the sale item variation table according to the association between the attribute items and the coordinate axes (step S11). For example, the online shopping mall server 1 associates "334", "350", and "500" of the content volume with the row numbers 1, 2, and 3, respectively.

Further, the online shopping mall server 1 associates "bottle" and "can" of the container with the column numbers 1 and 2, respectively.

Next, the online shopping mall server 1 searches for an item for sale that has an attribute indicated by an attribute value corresponding to the position of a cell for each cell in the sale item variation table from the sale item group of the specified brand (step S12). For example, the attribute values corresponding to the cell of the row number of 1 and the column number of 1 are "334" for the content volume and "bottle" for the container. Therefore, as illustrated in FIG. 2B, an item for sale of "QQQ ABB bottle 334 ml" is found. For example, the attribute values corresponding to the cell of the row number of 1 and the column number of 2 are "350" for the content volume and "bottle" for the container. Therefore, as illustrated in FIG. 2B, there is no corresponding item for sale.

Next, the online shopping mall server 1 generates table data (step S13). The table data is data for displaying the sale item variation table. The online shopping mall server 1 adds links indicating found items for sale into corresponding cells and thereby generates the table data (step S14). Then, the online shopping mall server 1 transmits the table data to the user terminal 3.

Figure 5A:
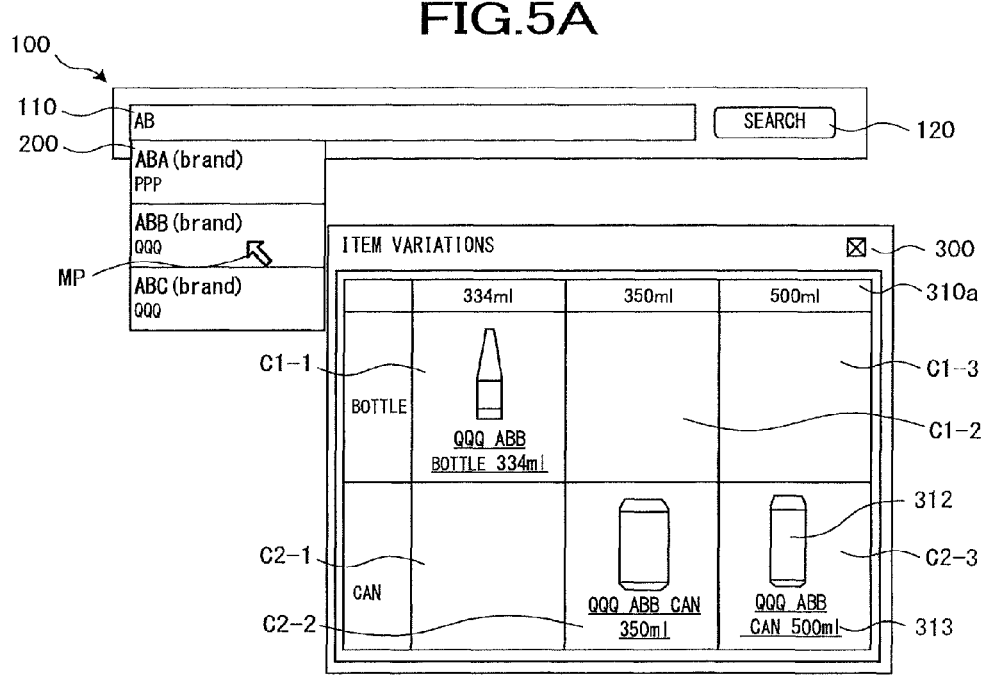
FIG. 5A is a diagram illustrating a display example of a sale item variation table.

The user terminal 3 that receives the table data displays the sale item variation table based on the table data on a screen (step S15). FIG. 5A is a diagram illustrating a display example of the sale item variation table. If the user mouses over any one of the brand names from the proposal area 200, as illustrated in FIG. 5A, the sale item variation window 300 is overlaid and displayed on the top page. A sale item variation table 310*a* is displayed in the sale item variation window 300.

The sale item variation table 310*a* includes one or more cells Cy-x. Here, y represents the row number and x represents the column number. When there is an item for sale that has attributes indicated by attribute values corresponding to the position of the cell Cy-x, a sale item image 312 and a sale item name 313 are displayed in the cell Cy-x. The sale item image 312 is information representing an item for sale that has the attributes indicated by the attribute values corresponding to the position of the cell Cy-x by an image. The sale item name 313 is information representing the item for sale having the attributes indicated by the attribute values corresponding to the position of the cell Cy-x by a sale item name. Each of the sale item image 312 and the sale item name 313 is an example of display information in the present invention. The sale item image 312 and the sale item name 313 are links to search the items for sale which is represented by these information pieces from the online shopping mall. FIG. 5A illustrates a display example of the sale item variation table when the user mouses over "ABB" by a mouse pointer MP from the proposal area 200. Therefore, the sale item images 312 and the sale item names 313 are displayed in the cells C1-1, C2-2, and C2-3, but the sale item images 312 and the sale item names 313 are not displayed in the cells C1-2, C1-3, and C2-1. A cell in which the sale item image 312 and the sale item name 313 are not displayed is referred to as an "empty cell". Only either one of the sale item image 312 and the sale item name 313 may be displayed. The information that represents an item for sale is not limited to an image or a name of the item for sale.

In the sale item variation table 310*a*, an attribute value associated with a row is displayed in a heading cell of each row and an attribute value associated with a column is displayed in a heading cell of each column. If needed, characters or the like that indicate a unit are added to an attribute value displayed in each heading. For example, "ml" is added to "334" corresponding to the "content volume". A corresponding attribute name may be displayed near the heading. The heading cells do not have to be displayed. The reason of this is because the attribute value may be recognized from the sale item image 312 and the sale item name 313.

After the sale item variation table is displayed, it is assumed that the user selects either one of the sale item image 312 and the sale item name 313 of any one of the cells Cy-x (step S16). Then, the user terminal 3 transmits a search request of items for sale to the online shopping mall server 1 (step S17). The search request includes a product code of an item for sale that is indicated by the selected sale item image 312 or sale item name 313. The product code may be, for example, the JAN (Japanese Article Number Code) code or the like. The online shopping mall server 1 searches the online shopping mall for items for sale by using the product code included in the search request (step S18). For example, in FIG. 5A, when the user selects the sale item image 312 in the cell C2-2, the online shopping mall server 1 searches for items for sale each of which has a name of "QQQ ABB, can 350 ml" of the ABB brand. Regarding the item for sale having the name of "QQQ ABB, can 350 ml", the content volume is 350 ml and the container is a can. Next, the online shopping mall server 1 transmits a search result page to the user terminal 3 (step S19). The search result page is a web page on which the search result of items for sale is displayed.

Figure 5B:
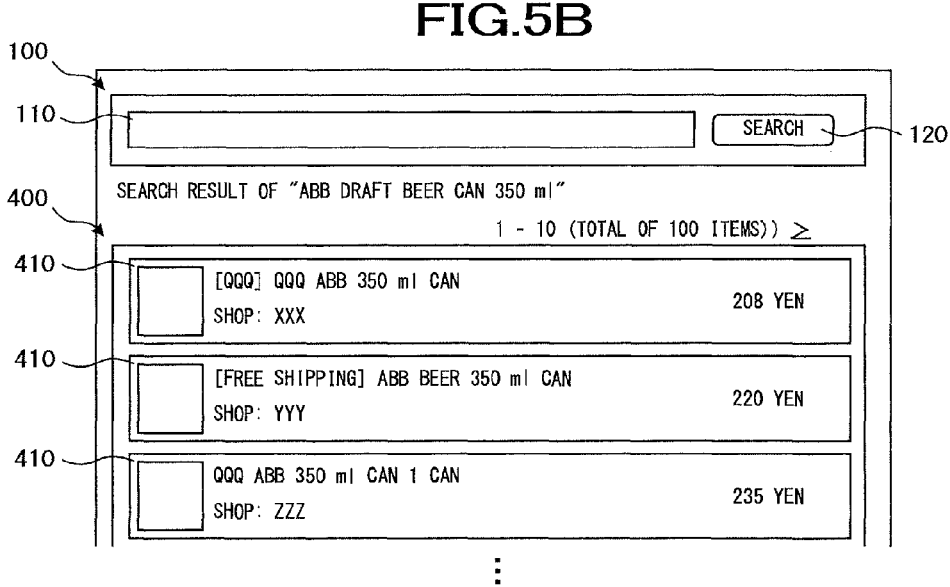
FIG. 5B is a diagram illustrating a display example of a search result page.

FIG. 5B is a diagram illustrating a display example of the search result page. As illustrated in FIG. 5B, the search result page includes a search condition setting area 100, a search result display area 400, and the like. In the search condition setting area 100, for example, the user can specify a search condition to narrow down the found items for sale. In the search result display area 400, a list of found items for sale is displayed. Specifically, searched sale item information 410 is displayed for each found item for sale. In the searched sale item information 410, for example, an image of the item for sale, a sale item name, a shop name of a shop which sells the item for sale, a price, and the like are displayed. The sale item name displayed in the searched sale item information 410 is a sale item name registered by the shop. The sale item name displayed in the searched sale item information 410 may be different from the sale item name registered in the catalog of brand item. When the user selects any one of pieces of the searched sale item information 410 from the search result display area 400, the user terminal 3 displays a sale item page of an item for sale corresponding to the selected searched sale item information 410 on the screen. The sale item page is a web page on which detailed information of a specific item for sale is displayed. The user can perform an operation to purchase the item for sale on the sale item page.

In this way, the user selects an item for sale from the sale item variation table in which variations of the item for sale are arranged by using the attribute values and displayed, so that the user can easily search items for sale that have attributes desired by the user from among items for sale of a brand desired by the user. On the other hand, it is assumed that when the user specifies a brand name from the proposal area 200, the online shopping mall server 1 searches the online shopping mall for items for sale which belong to the specified brand name. Further, it is assumed that a list of the searched items for sale is displayed on the search result page. In this case, the user can search for items for sale of a brand desired by the user. However, when only a list of items for sale is simply displayed, the user cannot easily recognize what attributes each item for sale has. Therefore, for example, the user may cause a sale item page to be displayed by selecting the searched sale item information 410 in order to check what attributes each item for sale has. Further, for example, the user may request search again by specifying a search condition to narrow down the items for sale in order to find item for sale having attributes desired by the user. When the online shopping mall server 1 transmits a sale item page and/or performs search according to the operations described above, the processing load of the online shopping mall server 1 increases. On the other hand, according to the present embodiment, the items for sale are arranged by using the variations of attribute and displayed, so that it is possible to reduce the operation of the user. Therefore, it is possible to reduce the processing load of the online shopping mall server 1.

The example illustrated in FIG. 5A is an example of a case in which there are two attribute items where there are variations of attribute value. The number of attribute items where there are variations of attribute value is the number of coordinate axes of the cells. Therefore, the number of attribute items where there are variations of attribute value is referred to as "the number of dimensions". When the number of dimensions is one, the attribute item which has variations of attribute value is associated with, for example, the row axis. Then, a sale item variation table is displayed in which there is only one column that includes the cells Cy-x.

On the other hand, when the number of dimensions is three or more, only the row axis and the column axis are insufficient to display the sale item variation table. Therefore, in order to increase the number of coordinate axes, the online shopping mall server 1 associates each of a plurality of variations of attribute value corresponding to an attribute item whose priority is lower than the second highest priority with any of a plurality of sale item variation tables. For example, the online shopping mall server 1 generates table data so that each of a plurality of sale item variation tables can be displayed by switching the tables by using a tab. When the number of attribute items where there are variations of attribute value is three, one tab is associated with one sale item variation table. In this way, a coordinate axis corresponding to tab is provided. The coordinate axis corresponding to tab is referred to as a "tab axis". The position component of a cell on the tab axis is a tab number. The online shopping mall server 1 associates an attribute item whose priority is the lowest with the tab axis.

Meanwhile, when the variations of item for sale are displayed by a plurality of sale item variation tables, in a certain sale item variation table, all cells in a certain row may be empty cells and/or all cells in a certain column may be empty cells. Rows and columns where all cells are empty do not need to be displayed. Therefore, the online shopping mall server 1 generates table data so that sale item variation tables in which rows and columns where all cells are empty are deleted are displayed.

A specific example will be described below. The user mouses over "ABC" from the proposal area 200 illustrated in FIG. 3B. Regarding the item for sale whose product brand name is "ABC", as illustrated in FIG. 2B, the variations of the number of bottles or cans are "1", "6", "20", and "24". The variations of the content volume are "334", "350", "500", and "633". The variations of the container are "bottle" and "can". There is no variation of the taste and the product brand. Therefore, the online shopping mall server 1 associates the number of bottles or cans with the row coordinate, associates the content volume with the column coordinate, and associates the container with the tab coordinate.

FIG. 6A is a diagram illustrating an example of association between variations of attribute value corresponding to "the number of bottles or cans" and row numbers. FIG. 6B is a diagram illustrating an example of association between variations of attribute value corresponding to "content volume" and column numbers. FIG. 6C is a diagram illustrating an example of association between variations of attribute value corresponding to "container" and tab numbers. As illustrated in FIG. 6C, the "bottle" is associated with the tab number 1 and the "can" is associated with the tab number 2. Therefore, the variations of the item for sale are divided into a sale item variation table corresponding to the "bottle" and a sale item variation table corresponding to the "can" and displayed. The number of rows and the number of columns in each sale item variation table are four and four except for the heading row and the heading column.

FIG. 6D is a diagram illustrating an example of content of the sale item variation table corresponding to the "bottle". FIG. 6E is a diagram illustrating an example of content of the sale item variation table corresponding to the "can". FIG. 6F is a diagram illustrating an example of content of the sale item variation table corresponding to "bottle" from which rows and columns where all cells are empty are deleted. FIG. 6G is a diagram illustrating an example of content of the sale item variation table corresponding to "can" from which rows and columns where all cells are empty are deleted. In FIGS. 6D to 6G, a field in which "O" is written represents a cell where a corresponding item for sale exists and a blank field represents an empty cell where a corresponding item for sale does not exist. Among items for sale of "ABC" whose container is a bottle, there is no item for sale whose content volume is 350 ml, no item for sale whose number of bottles or cans is 6, and no item for sale whose number of bottles or cans is 24. Therefore, as illustrated in FIG. 6D, all cells in a column corresponding to the content volume of 350 ml, a row corresponding to the number of bottles or cans of 6, and a row corresponding to the number of bottles or cans of 24 are empty cells. Therefore, as illustrated in FIG. 6F, these rows and a column are deleted and a sale item variation table of two rows and three columns is generated. Among items for sale of "ABC" whose container are cans, there is no item for sale whose content volume is 334 ml, no item for sale whose content volume is 633 ml, and no item for sale whose number of bottles or cans is 20. Therefore, as illustrated in FIG. 6G, a sale item variation table of three rows and two columns is generated.

Figure 7:
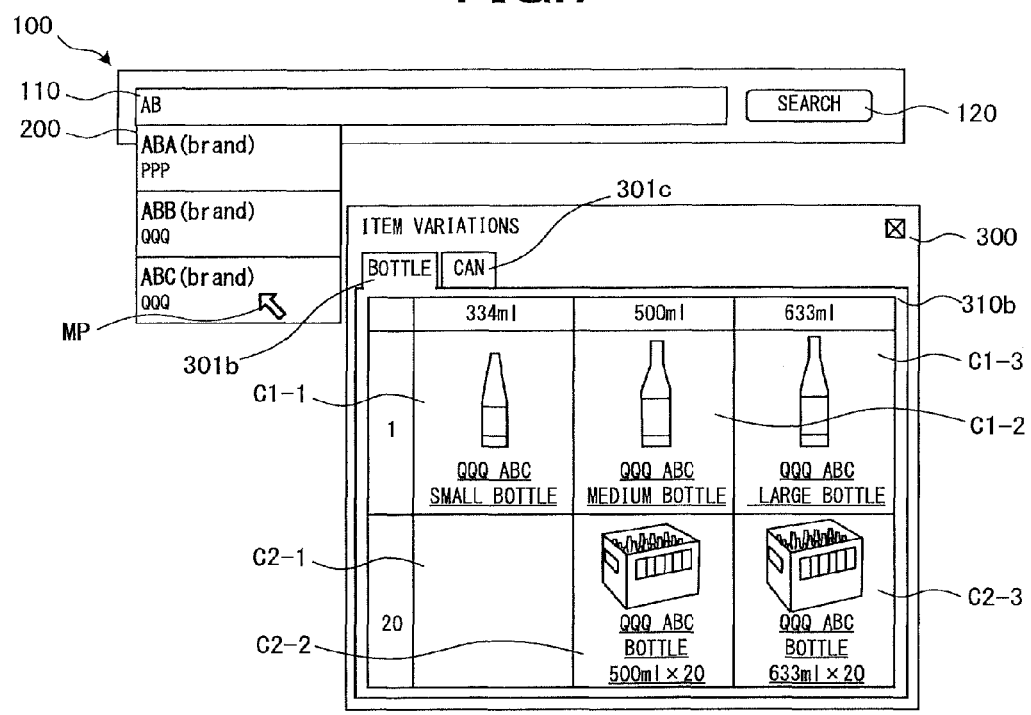
FIG. 7 is a diagram illustrating a display example of a sale item variation window 300 when a user mouses over "ABC" from a proposal area 200.

FIG. 7 is a diagram illustrating a display example of the sale item variation window 300 when the user mouses over "ABC" from the proposal area 200. As illustrated in FIG. 7, tabs 301*b* and 301*c* and a sale item variation table 310*b* are displayed in the sale item variation window 300. In each tab, a corresponding attribute value is displayed. The tab 301*b* corresponds to the "bottle" and the tab 301*c* corresponds to the "can". FIG. 7 illustrates a state in which the tab 301*b* is selected. Therefore, the sale item variation table 310*b* corresponding to the "bottle" is displayed in the sale item variation window 300. A corresponding attribute name may be displayed near the tab.

Figure 8:
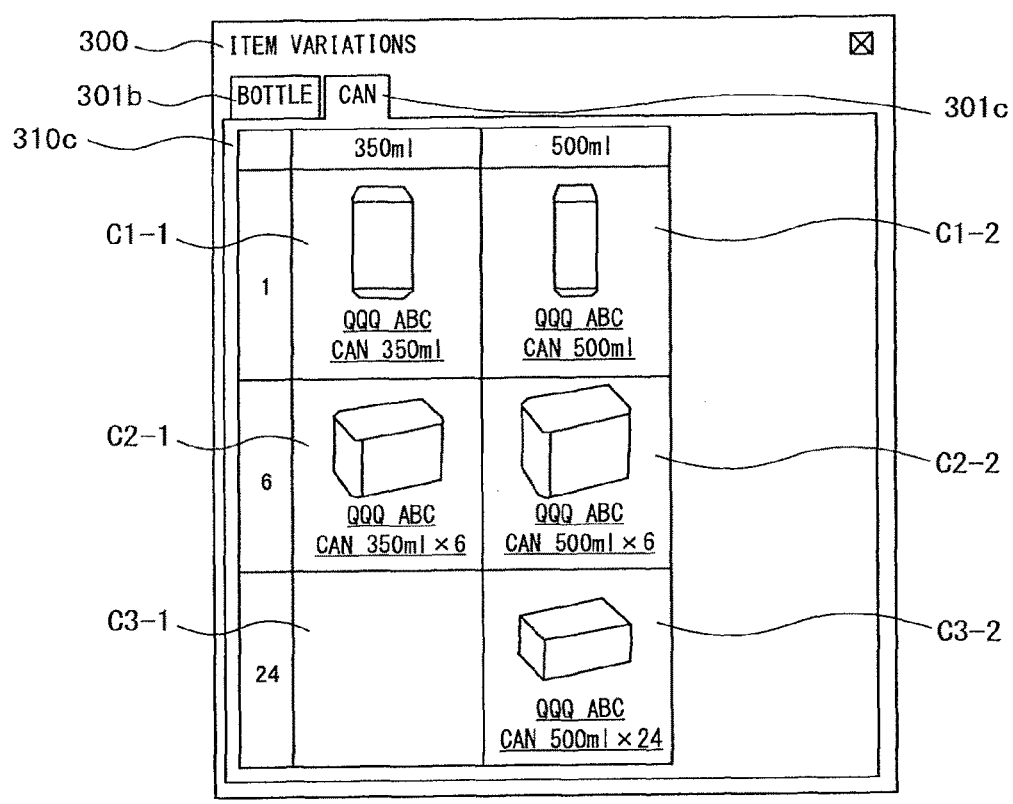
FIG. 8 is a diagram illustrating a display example of the sale item variation window 300 when the user selects a tab 301*c*.

FIG. 8 is a diagram illustrating a display example of the sale item variation window 300 when the user selects the tab 301*c*. When the user selects the tab 301*c*, as illustrated in FIG. 8, in the sale item variation window 300, the tabs 301*b* and 301*c* are continuously displayed and a sale item variation table 310*c* is displayed. The sale item variation table 310c is a sale item variation table corresponding to the "can". The user can replace a sale item variation table to be displayed with another one of a plurality of sale item variation tables by selecting a tab in this way.

The examples in FIGS. 5A, 7, and 8 are display examples of the sale item variation table when the user specifies a product brand. The user can specify, for example, a corporate brand. For example, the user specifies "QQQ". In this case, as illustrated in FIG. 2B, in the sale item variation group of the "QQQ", there are variations of a corresponding attribute value for each of "the number of bottles or cans", "content volume", "container", and "product brand". Therefore, the number of dimensions is four. When the number of dimensions is four, for example, the online shopping mall server 1 generates table data so that a plurality of sale item variation tables are displayed corresponding to one tab. In this way, a coordinate axis corresponding to the sale item variation tables in one tab is provided. The coordinate axis corresponding to a plurality of sale item variation tables in one tab is referred to as an "in-tab table axis". The position component of a cell on the in-tab table axis is a table number. For example, the online shopping mall server 1 associates an attribute item having the third highest priority with the in-tab table axis and associates an attribute item having the lowest priority with the tab axis. In the case of "QQQ", "the number of bottles or cans" is associated with the row axis, the "content volume" is associated with the column axis, the "container" is associated with the in-tab table axis, and the "product brand" is associated with the tab axis.

Figure 9:
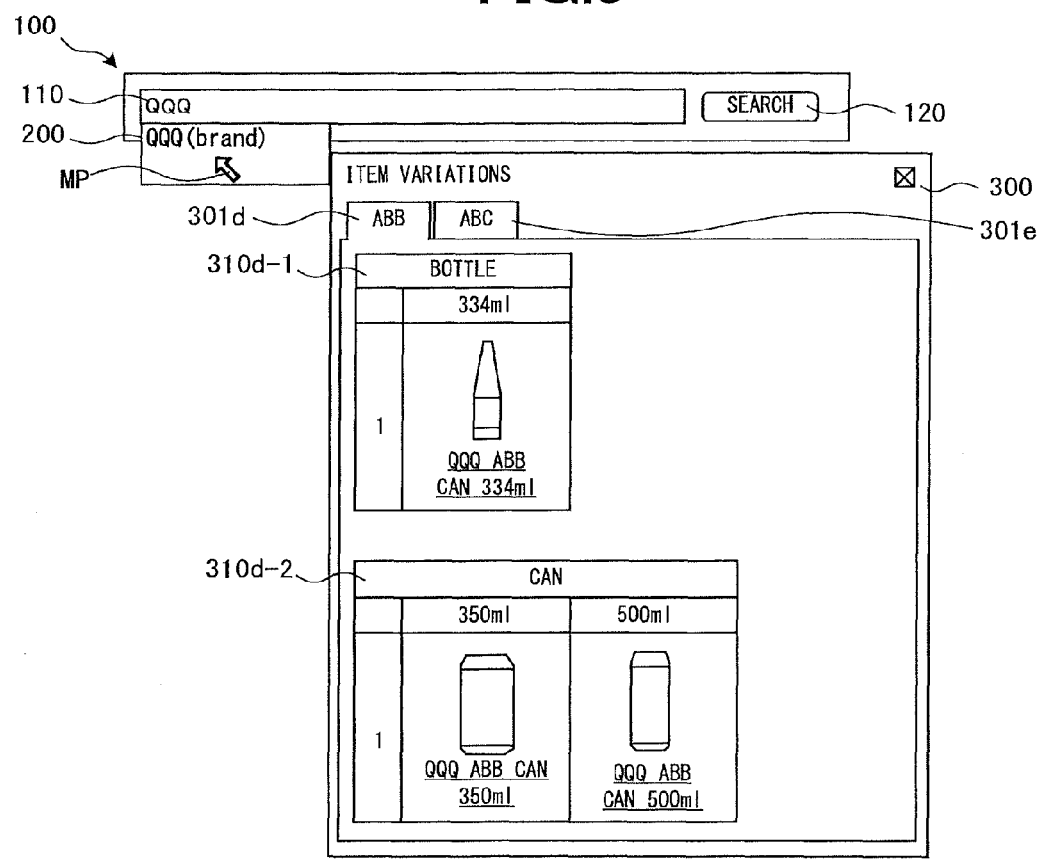
FIG. 9 is a diagram illustrating a display example of the sale item variation window 300 when the user mouses over "QQQ" from the proposal area 200.

FIG. 9 is a diagram illustrating a display example of the sale item variation window 300 when the user mouses over "QQQ" from the proposal area 200. When the user inputs "QQQ" in the keyword input field 110 and mouses over "QQQ" from the proposal area 200 displayed by the input of "QQQ", as illustrated in FIG. 9, in the sale item variation window 300, tabs 301d and 301e and sale item variation tables 310d-1 and 310d-2 are displayed. The tab 301d corresponds to "ABB" and the tab 301e corresponds to "ABC". FIG. 9 illustrates a state in which the tab 301d is selected. The sale item variation table 310d-1 corresponds to "ABB" and "bottle". The sale item variation table 310d-2 corresponds to "ABB" and "can". In the heading of each sale item variation table, an attribute value of an attribute item corresponding to the in-tab table axis is displayed. A corresponding attribute name may be displayed in the heading of the sale item variation table or near the heading of the sale item variation table.

FIG. 10 is a diagram illustrating a display example of the sale item variation window 300 when the user selects the tab 301e. When the user selects the tab 301e, as illustrated in FIG. 10, in the sale item variation window 300, the tabs 301d and 301e are continuously displayed and an sale item variation tables 310e-1 and 310e-2 are displayed. The sale item variation table 310e-1 corresponds to "ABC" and "bottle". The sale item variation table 310e-2 corresponds to "ABC" and "can".

Even when the number of dimensions is five or more, the number of coordinate axes can be increased. For example, the sale item variation tables may be arranged vertically and horizontally corresponding to one tab and displayed. Coordinate axes may be assigned to vertical arrangement and horizontal arrangement respectively in a table. Further, a plurality of areas for displaying a plurality of sale item variation tables may be provided corresponding to one tab. A coordinate axis may be assigned to the areas. Further, a plurality of sub-tabs may be provided for one tab. A coordinate axis may be assigned to the sub-tabs. A means for replacing a sale item variation table to be displayed with another one of a plurality of sale item variation tables is not limited to the tab. For example, a plurality of sale item variation tables may be switched and displayed by a radio button, a list box, and the like. It is not compulsory to switch and display a plurality of sale item variation tables. For example, all sale item variation tables may be displayed at the same time.

It is not compulsory to prioritize the attribute items. The online shopping mall server 1 may associates any attribute item with any coordinate axis. For example, the online shopping mall server 1 may associate the product brand with the tab axis and may associate the other attribute items with any other coordinate axes. When the number of dimensions is two, the online shopping mall server 1 may associate one attribute item with the tab axis and may associate the other attribute item with the row axis or the column axis.

1-3. Configuration of Online Shopping Mall Server

Next, a configuration of the online shopping mall server 1 will be described with reference to FIGS. 11 to 13.

FIG. 11 is a block diagram illustrating an example of a schematic configuration of the online shopping mall server 1 according to the present embodiment. As illustrated in FIG. 11, the online shopping mall server 1 includes a communication unit 11, a storage unit 12, an input/output interface 13, and a system control unit 14. The system control unit 14 and the input/output interface 13 are connected to each other through a system bus 15.

The communication unit 11 connects to the network NW and controls communication state with the shop terminal 2 and the user terminal 3.

The storage unit 12 includes, for example, a hard disk drive and the like. The storage unit 12 is an example of an attribute item information storage means, an attribute value storage means, a priority storage means, and a transaction target information storage means in the present invention. In the storage unit 12, databases are constructed which are a member information DB 12a, a genre information DB 12b, a brand information DB 12c, a brand item catalog DB 12d, and a shop item information DB 12e. The "DB" is an abbreviation of database.

FIG. 12A is a diagram illustrating an example of content registered in the member information DB 12a. In the member information DB 12a, member information is registered which is related to users registered in the online shopping mall as a member. Specifically, in the member information DB 12a, user attributes are registered in association with each other for each user. The user attributes are a user ID, a password, a nickname, a name, a date of birth, a gender, a postal code, an address, a phone number, an email address, and the like.

FIG. 12B is a diagram illustrating an example of content registered in the genre information DB 12b. In the genre information DB 12b, genre information related to genres of item for sale is registered. Specifically, in the genre information DB 12b, attributes of a genre are registered in association with each other for each genre. The attributes of the genre are a genre ID, a genre name, a level of the genre, a parent genre ID, a child genre ID list, one or more pieces of attribute information, and the like. For example, the genre information is set by an administrator of the online shopping mall.

The genre ID is identification information of the genre defined by the genre information. The level of the genre indicates the depth of the layer of the genre. For example, the level of the highest genre is 1. The deeper the layer is, the greater the value of the level is. The parent genre ID is a genre ID of the parent genre of the genre indicated by the genre ID. The child genre ID list is a list of genre IDs of child genres of the genre indicated by the genre ID. The child genre ID list is set when the genre indicated by the genre ID has child genres.

FIG. 12C is information illustrating an example of content included in the attribute information. The attribute information is information of attributes held by items for sale included in the genre indicated by the genre ID. The attribute information is registered for each attribute item. As illustrated in FIG. 12C, in the attribute information, an attribute name, a priority, and additional characters are included in association with each other. The additional characters are characters which is added to an attribute value and displayed when the attribute value is displayed in a heading or a tab in a sale item variation table. For example, characters indicating a unit are registered as the additional characters. When attribute items of all descendant genres of one genre are the same, the attribute information may be registered only for the one genre, which represents these genres. When the system control unit 14 needs the attribute information of the descendant genres, the system control unit 14 may use the attribute information of the one genre. For example, the attribute items of "beer", "Western liquor", and "liqueur", which are child genres of the "beer and Western liquor", are the same, so that the attribute information is registered only for the "beer and Western liquor".

FIG. 12D is a diagram illustrating an example of content registered in the brand information DB 12c. In the brand information DB 12c, brand information related to brand is registered. Specifically, in the brand information DB 12c, a brand ID, a brand name, a level of the brand, a parent brand ID, a child brand ID list, and a genre ID are registered in association with each other for each brand. For example, the brand information is set by an administrator of the online shopping mall.

The brand ID is identification information of a brand defined by the brand information. The level of the brand indicates the depth of the layer of the brand. For example, the level of the highest brand is 1. The deeper the layer is, the greater the value of the level is. The parent brand ID is a brand ID of the parent brand of the brand indicated by the brand ID. The child brand ID list is a list of brand IDs of child brands of the brand indicated by the brand ID. The child brand ID list is set when the brand indicated by the brand ID has child brands. The genre ID indicates a genre to which items for sale indicated by the brand ID belongs.

FIG. 12E is a diagram illustrating an example of content registered in the brand item catalog DB 12d. The brand item catalog DB 12d corresponds to a catalog of brand items. In the brand item catalog DB 12d, catalog information related to brand items is registered. Specifically, in the brand item catalog DB 12d, a product code, a sale item name, a brand ID, an explanatory text, a URL (Uniform Resource Locator) of a sale item image, and one or more attribute values are registered in association with each other for each brand item. For example, the catalog information is set by an administrator of the online shopping mall. The band ID indicates a product brand of the item for sale. The explanatory text indicates an explanation of the item for sale.

The attribute value included in the catalog information is an attribute value according to the genre to which the item for sale belongs. Specifically, the genre ID corresponding to the brand ID included in the catalog information is identified from the brand information DB 12c and the attribute information corresponding to the genre ID is identified from the genre information DB 12b. The attribute value corresponding to the attribute name included in the attribute information is included in the catalog information. For example, when the first attribute information of "beer" is attribute information related to "the number of bottles or cans" and the second attribute information is attribute information related to the "content volume", the first attribute value included in the catalog information is an attribute value corresponding to "the number of bottles or cans" and the second attribute value is an attribute value corresponding to the "content volume" as the attribute values according to the genre. The attribute name and the attribute value may be included in the catalog information in association with each other.

FIG. 12F is a diagram illustrating an example of content registered in the shop item information DB 12e. In the shop item information DB 12e, sale item information related to items for sale which are sold in the online shopping mall is registered. The sale item information is information registered by a shop. Specifically, in the shop item information DB 12e, a shop ID, a sale item ID, a product code, a genre ID, a sale item name, a URL of a sale item image, a sale item description, a sale item price, and the like are registered in association with each other for each item for sale sold by the shop. The shop ID is identification information of the shop which sells the item for sale. The sale item ID is identification information of item for sale for the shop to manage the item for sale which is sold by the shop. The item for sale is identified by a combination of the shop ID and the sale item ID. The product code is a code number to identify the item for sale. The product code may be, for example, the JAN code or the like. When the same items for sale are sold by a plurality of shops, the same product codes are given to the items for sale. The genre ID indicates a genre to which the item for sale belongs. The genre ID included in the sale item information is basically a genre ID of a genre of the deepest layer. In other words, a genre ID of the most subdivided genre is included. The sale item name is a name of the item for sale given by the shop.

Next, other information stored in the storage unit 12 will be described. The storage unit 12 stores various data such as an HTML (HyperText Markup Language) documents for displaying web pages, an XML (Extensible Markup Language) documents, image data, text data, and electronic documents. The storage unit 12 also stores various values that were set.

Further, the storage unit 12 stores various programs such as an operating system, a WWW (World Wide Web) server program, a DBMS (Database Management System), and an electronic commerce management program. The electronic commerce management program is a program for executing various processes related to the electronic commerce. The electronic commerce management program is an example of an information processing program in the present invention. For example, the various programs may be acquired from another server device or the like through the network NW or may be recorded in a recording medium such as a DVD (Digital Versatile Disc) and read through a drive device. The electronic commerce management program and the like may be a program product.

The input/output interface 13 executes interface processing among the communication unit 11, the storage unit 12, and the system control unit 14.

Figure 13:
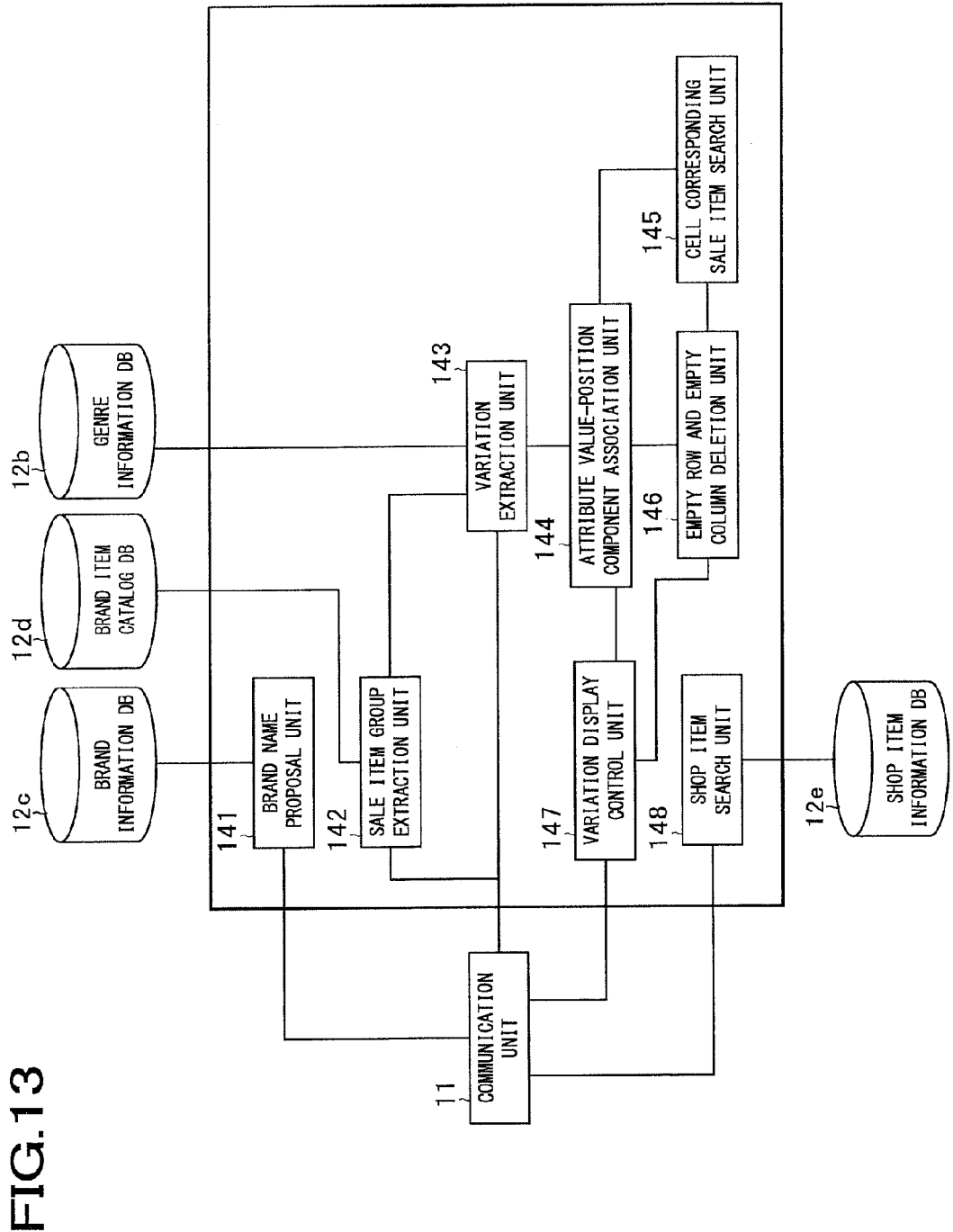
FIG. 13 is a diagram illustrating an example of functional blocks of the online shopping mall server 1 according to an embodiment.

FIG. 13 is a block diagram illustrating an example of functional blocks of the online shopping mall server 1 according to the present embodiment. The system control unit 14 includes a CPU 14a, a ROM (Read Only Memory) 14b, a RAM (Random Access Memory) 14c, and the like. The CPU 14a reads and executes various programs, so that, as illustrated in FIG. 13, the system control unit 14 functions as a brand name proposal unit 141, a sale item group extraction unit 142, a variation extraction unit 143, an attribute value-position component association unit 144, a cell corresponding sale item search unit 145, an empty row and empty column deletion unit 146, a variation display control unit 147, and a shop item search unit 148.

The brand name proposal unit 141 is an example of a division display control means in the present invention. The sale item group extraction unit 142 is an example of a transaction target group identification means in the present invention. The variation extraction unit 143 is an example of a variation determination means, an attribute value acquisition means, an attribute item information acquisition means, and a priority acquisition means in the present invention. The attribute value-position component association unit 144 is an example of an attribute item determination means in the present invention. The cell corresponding sale item search unit 145 is an example of a transaction target identification means in the present invention. A combination of the variation extraction unit 143 and the empty row and empty column deletion unit 146 is an example of an association means in the present invention. A combination of the empty row and empty column deletion unit 146 and the variation display control unit 147 is an example of a table display control means in the present invention. The shop item search unit 148 is an example of a search means and a search result display control means in the present invention.

The brand name proposal unit 141 receives a character string being inputted, which is transmitted from the user terminal 3 every time a user inputs a character in the keyword input field 110 on the top page, through the communication unit 11. Next, the brand name proposal unit 141 searches for brand names corresponding to the first keyword included in the received character string from the brand information DB 12c. Next, the brand name proposal unit 141 transmits a list of the found brand names to the user terminal 3 along with brand IDs corresponding to the brand names. Thereby, the brand name proposal unit 141 causes the user terminal 3 to display the list of brands on a screen.

The sale item group extraction unit 142 receives a sale item variation table request including a brand ID, which was specified by the user from the list of brands, through the communication unit 11. Next, the sale item group extraction unit 142 identifies a sale item group that belongs to the brand specified by the user. Specifically, the sale item group extraction unit 142 searches the brand item catalog DB 12d for catalog information including the brand ID included in the sale item variation table request.

The variation extraction unit 143 acquires attribute information of a genre to which the sale item group identified by the sale item group extraction unit 142 belongs. Specifically, the variation extraction unit 143 acquires a genre ID corresponding to the brand ID included in the sale item variation table request from the brand information DB 12c. Next, the variation extraction unit 143 acquires attribute information corresponding to the acquired genre ID from the genre information DB 12b. Further, the variation extraction unit 143 acquires attribute values of each item for sale included in the sale item group identified by the sale item group extraction unit 142. Specifically, the variation extraction unit 143 acquires attribute values corresponding to an attribute item indicated by the acquired attribute information for each attribute item from each piece of catalog information found by the sale item group extraction unit 142. Next, the variation extraction unit 143 calculates the number of variations for each attribute item based on the acquired attribute values. Next, when the number of variations is smaller than or equal to one, the variation extraction unit 143 determines that there is no variation of the attribute value, and when the number of variations is greater than or equal to two, the variation extraction unit 143 determines that there are variations of the attribute value. Then, the variation extraction unit 143 extracts attribute items where there are variations of the attribute value and the variations of the attribute value.

The attribute value-position component association unit 144 associates each of the attribute items extracted by the variation extraction unit 143 with a coordinate axis of cells in the sale item variation table based on the priorities. Next, the attribute value-position component association unit 144 associates each of a plurality of variations of attribute value with a position component along a coordinate axis associated with a corresponding attribute item.

The cell corresponding sale item search unit 145 searches for items for sale having an attribute value corresponding to a position of each cell in a sale item variation table from the sale item group identified by the sale item group extraction unit 142 based on the association between an attribute item and a coordinate axis and the association between an attribute value and a position component by the attribute value-position component association unit 144.

The empty row and empty column deletion unit 146 deletes rows and columns where all cells are empty due to absence of an item for sale which has an attribute value corresponding to the position of the cells from the sale item variation table. As a result, the association between the attribute value and the position component changes.

The variation display control unit 147 causes the user terminal 3 to display the sale item variation table on the screen. Specifically, the variation display control unit 147 transmits an HTML document of a top page to the user terminal 3 according to a request from the user terminal 3. In the HTML document of the top page, a script to cause the sale item variation window 300 to be overlaid and displayed on the top page and display the sale item variation table on the sale item variation window 300 is described. The script includes commands to cause the sale item variation window 300 to display tabs and replace a sale item variation table to be displayed with another one of a plurality of sale item variation tables by rewriting content of the sale item variation window 300 according to user's selecting of a tab. Further, the variation display control unit 147 generates table data to display a sale item variation table based on the association between an attribute item and a coordinate axis and the association between an attribute value and a position component by the attribute value-position component association unit 144 and the catalog information of the sale item identified the cell corresponding sale item search unit 145. The content of the table data is arbitrary. For example, the table data may be data in which the sale item variation table is written in a language such as HTML. The variation display control unit 147 transmits the generated table data to the user terminal 3 through the communication unit 11.

When either one of the sale item image 312 or the sale item name 313 is selected from the sale item variation table displayed by the user terminal 3, the shop item search unit 148 searches the online shopping mall for items for sale indicated by the selected sale item image 312 or sale item name 313. Specifically, the shop item search unit 148 receives a search request transmitted from the user terminal 3 through the communication unit 11. Next, the shop item search unit 148 searches the shop item information DB 12*e* for sale item information including the product code included in the received search request. Further, the shop item search unit 148 causes the user terminal 3 to display the search result of the items for sale from the online shopping mall on the screen. Specifically, the shop item search unit 148 generates an HTML document of the search result page based on the found sale item information. Next, the shop item search unit 148 transmits the generated HTML document to the user terminal 3 through the communication unit 11.

The online shopping mall server 1 may include a plurality of server devices. For example, a server device that executes processing such as searching items for sale and ordering an item for sale in the online shopping mall, a server device that controls display of the sale item variation table, a server device that transmits a web page according to a request from the user terminal 3, a server device that manages databases, and the like may be connected to each other by a LAN or the like.

1-4. Operation of Information Processing System

Next, the operation of the information processing system S will be described with reference to FIGS. 14 to 17.

Figure 14:
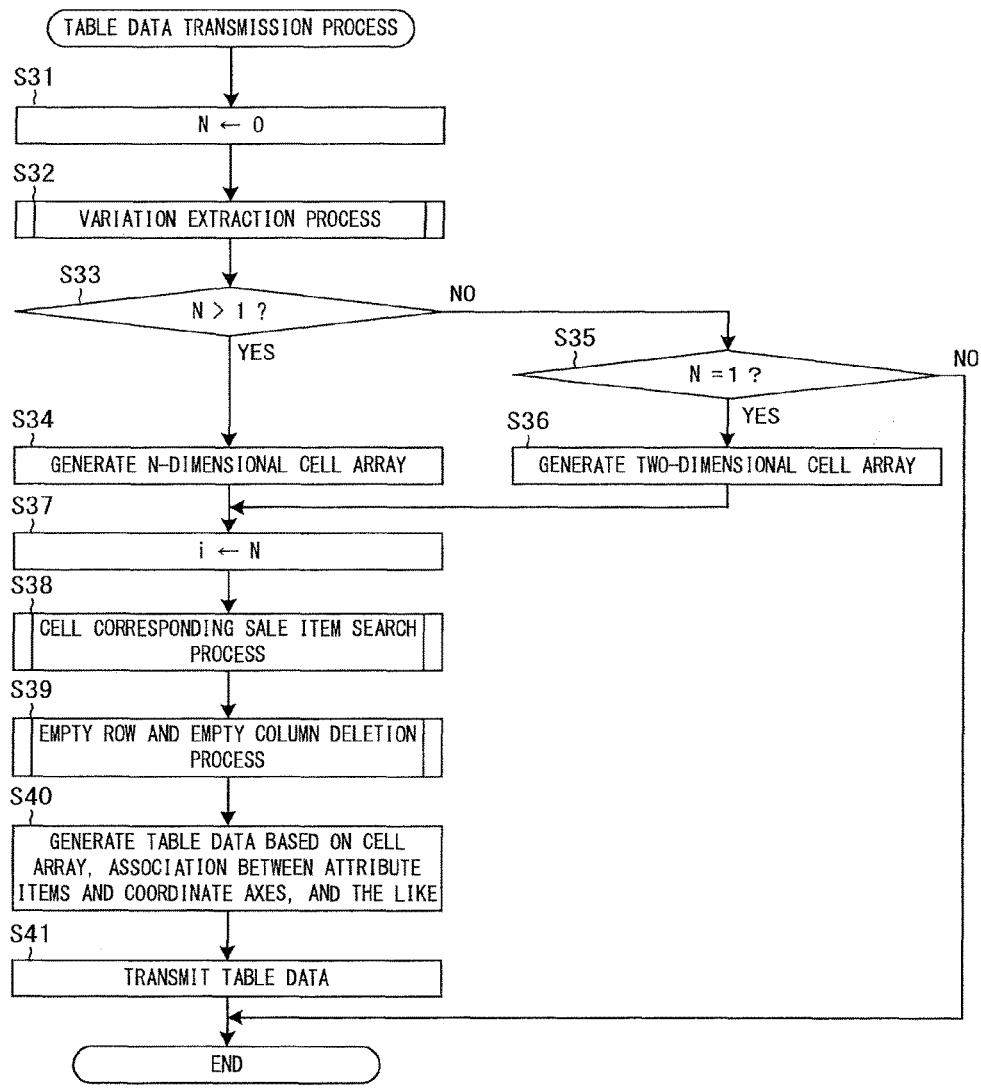
FIG. 14 is a flowchart illustrating a process example of a table data transmission process of a system control unit 14 of the online shopping mall server 1 according to an embodiment.

FIG. 14 is a flowchart illustrating a process example of a table data transmission process of the system control unit 14 of the online shopping mall server 1 according to the present embodiment. When the proposal area 200 is displayed on the top page, a user specifies a brand by mousing over any one of brand names from a list of the brand names displayed in the proposal area 200. Then, the user terminal 3 transmits a sale item variation table request including a brand ID of the specified brand to the online shopping mall server 1. The table data transmission process is started when the online shopping mall server 1 receives the sale item variation table request.

As illustrated in FIG. 14, the variation extraction unit 143 sets the number of dimensions N to 0 (step S31). Next, the variation extraction unit 143 executes a variation extraction process (step S32). In the variation extraction process, attribute items where there are variations of the attribute value, the variations of the attribute value, and the number of variations are extracted. Further, in the variation extraction process, the number of dimensions N is set to the number of attribute items where there are variations of the attribute value. The details of the variation extraction process will be described later.

After the variation extraction process, the variation display control unit 147 determines whether or not the number of dimensions N is greater than one (step S33). At this time, if the variation display control unit 147 determines that the number of dimensions N is greater than one (YES in step S33), the variation display control unit 147 proceeds to step S34. On the other hand, if the variation display control unit 147 determines that the number of dimensions N is smaller than or equal to one (NO in step S33), the variation display control unit 147 proceeds to step S35.

In step S34, the variation display control unit 147 generates an N-dimensional cell array. An element in the cell array is represented by a cell (first index, second index, . . . N-th index). Each index of the cell array corresponds to a position component of a cell. In the present embodiment, the association between the ordinal number of the index of the cell array and the coordinate axis of the cell is determined in advance. Specifically, the first index of the cell array corresponds to the row number. The second index of the cell array corresponds to the column number. When the number of dimensions N is three or more, the N-th index of the cell array corresponds to the tab number. When the number of dimensions N is four or more, the third index to the (N−1)-th index of the cell array correspond to an in-tab table number or the like. Data of a link indicating an item for sale which has an attribute value corresponding to the index is stored in an element in the cell array. For example, the data of a link is data written in a language such as HTML. An attribute value is stored in an array element corresponding to a cell of the row heading and the column heading. An array element where the second index of the cell array is 0 corresponds to a cell of the column heading and an array element where the first index of the cell array is 0 corresponds to a cell of the row heading. Next, the variation display control unit 147 proceeds to step S37.

In step S35, the variation display control unit 147 determines whether or not the number of dimensions N is one. At this time, if the variation display control unit 147 determines that the number of dimensions N is one (YES in step S35), the variation display control unit 147 proceeds to step S36. On the other hand, if the variation display control unit 147 determines that the number of dimensions N is not one (NO in step S35), the variation display control unit 147 ends the table data transmission process.

In step S36, the variation display control unit 147 generates a two-dimensional cell array. The reason of this is because array elements corresponding to cells of the row heading and the column heading are required. Next, the variation display control unit 147 proceeds to step S37.

In step S37, the cell corresponding sale item search unit 145 sets the ordinal number i of the index of the cell array to the number of dimensions N. Next, the cell corresponding sale item search unit 145 performs a cell corresponding sale item search process (step S38). In the cell corresponding sale item search process, an item for sale which has attribute values corresponding to the indexes of each element in the cell array are searched. In the cell corresponding sale item search process, data of a link to a found item for sale is stored in an element of the cell array. The ordinal number i is used in the cell corresponding sale item search process. The details of the cell corresponding sale item search process will be described later.

After the cell corresponding sale item search process, the empty row and empty column deletion unit 146 performs an empty row and empty column deletion process (step S39). In the empty row and empty column deletion process, elements in the cell array are moved. Thereby, rows and columns where all cells are empty are practically deleted. The details of the empty row and empty column deletion process will be described later.

After the empty row and empty column deletion process, the variation display control unit 147 generates table data based on the association between the attribute items and the coordinate axes (step S40). Specifically, the variation display control unit 147 generates the table data so that the sale item images 312 and the sale item names 313 are displayed in the sale item variation table based on data of links stored in the cell array. Further, the variation display control unit 147 generates the table data so that attribute values are displayed in the row headings and the column headings in the sale item variation table based on the attribute values stored in the cell array. Further, the variation display control unit 147 generates the table data so that attribute values are displayed in tab headings and a table heading based on the attribute name (1) to the attribute name (N). Next, the variation display control unit 147 transmits the generated table data to the user terminal 3 that is the transmission source of the sale item variation table request (step S41). After completing this process, the variation display control unit 147 ends the table data transmission process.

The user terminal 3 displays the sale item variation table on the screen based on the table data received from the online shopping mall server 1. Thereby, for example, the sale item variation tables as illustrated in FIG. 5A, 7, or 9 are displayed. Further, by the operation for selecting a tab, the sale item variation tables as illustrated in FIG. 8 or 10 are displayed.

Figure 15:
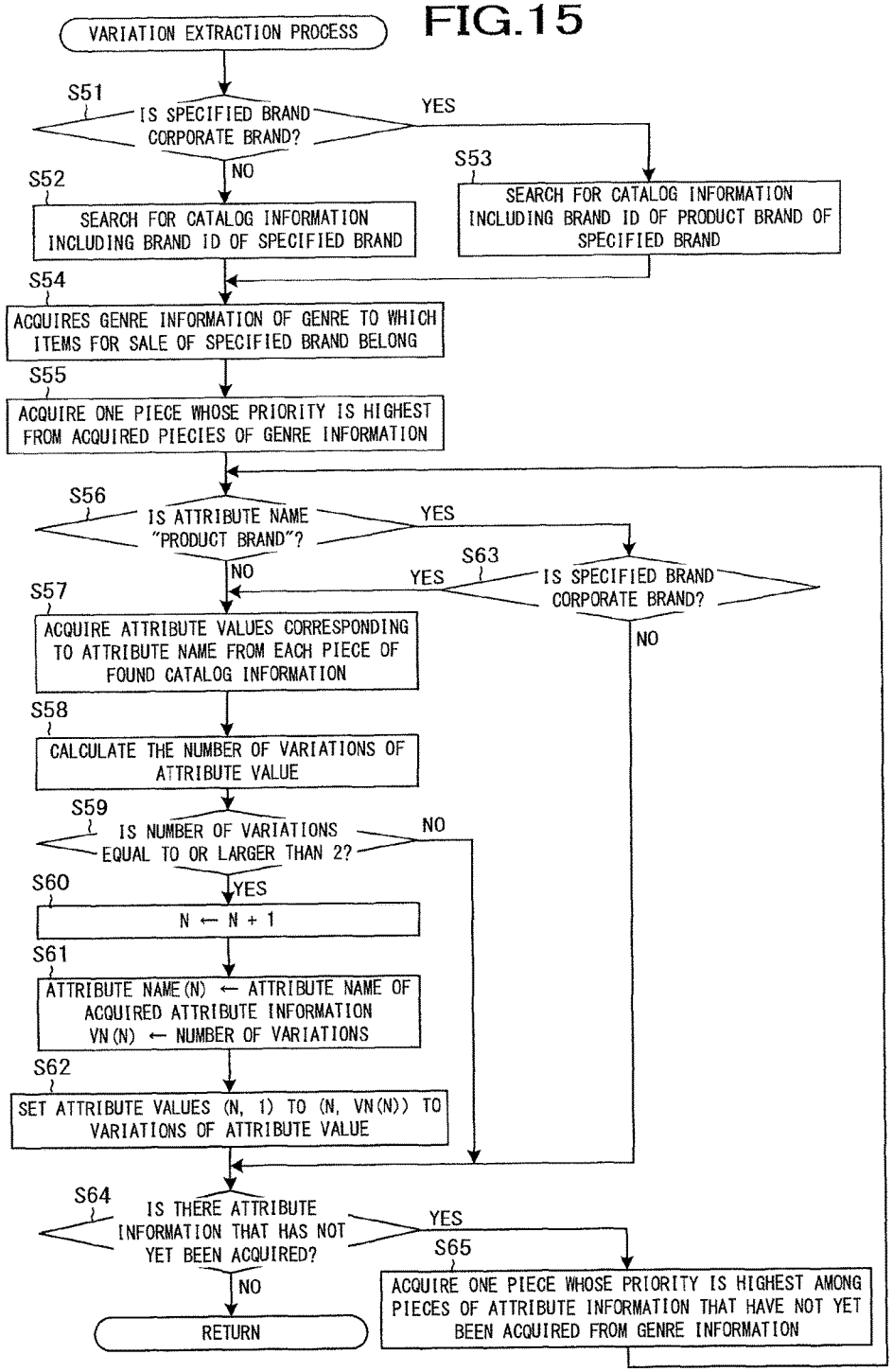
FIG. 15 is a flowchart illustrating a process example of a variation extraction process of the system control unit 14 of the online shopping mall server 1 according to an embodiment.

FIG. 15 is a flowchart illustrating a process example of a variation extraction process of the system control unit 14 of the online shopping mall server 1 according to the present embodiment.

As illustrated in FIG. 15, the variation extraction unit 143 determines whether or not a brand specified by a user is a corporate brand (step S51). Specifically, the variation extraction unit 143 acquires brand information including a brand ID included in a sale item variation table request from the brand information DB 12*c*. Next, the variation extraction unit 143 determines whether or not a level included in the acquired brand information is set to 1. If the level is set to 1, the specified brand is a corporate brand. If the level is set to 2, the specified brand is a product brand. If the variation extraction unit 143 determines that the specified brand is a product brand (NO in step S51), the variation extraction unit 143 proceeds to step S52. On the other hand, if the variation extraction unit 143 determines that the specified brand is a corporate brand (YES in step S51), the variation extraction unit 143 proceeds to step S53.

In step S52, the sale item group extraction unit 142 searches the brand item catalog DB 12*d* for catalog information including a brand ID of the specified brand. Next, the sale item group extraction unit 142 proceeds to step S54.

In step S53, the sale item group extraction unit 142 searches the brand item catalog DB 12*d* for catalog information including a brand ID of a product brand belonging to the specified brand. Specifically, the sale item group extraction unit 142 acquires a brand ID of a product brand from a child brand ID list included in brand information acquired from the brand information DB 12*c*. Then, the sale item group extraction unit 142 searches for catalog information including the brand ID for each acquired brand ID. Next, the sale item group extraction unit 142 proceeds to step S54.

In step S54, the variation extraction unit 143 acquires genre information of a genre to which an item for sale of the specified brand belongs from the genre information DB 12*b*. Specifically, the variation extraction unit 143 acquires a genre ID from the brand information acquired from the brand information DB 12*c*. Then, the variation extraction unit 143 searches for genre information including the acquired genre ID.

Next, the variation extraction unit 143 acquires one piece of attribute information whose priority is the highest among pieces of attribute information included in the acquired genre information (step S55). Next, the variation extraction unit 143 determines whether or not the attribute name included in the acquired attribute information is a "product brand" (step S56). At this time, if the variation extraction unit 143 determines that the attribute name is not the "product brand" (NO in step S56), the variation extraction unit 143 proceeds to step S57. On the other hand, if the variation extraction unit 143 determines that the attribute name is the "product brand" (YES in step S56), the variation extraction unit 143 proceeds to step S63.

In step S57, the variation extraction unit 143 acquires attribute values corresponding to an attribute item included in the acquired attribute information from each piece of catalog information found in step S52 or S53. The catalog information searched in step S52 or S53 is referred to as a "catalog information group of a specified brand". Next, the variation extraction unit 143 calculates the number of variations of the attribute value based on the acquired attribute values (step S58). Specifically, when there is a plurality of attribute values whose values are the same among the acquired attribute values, the variation extraction unit 143 deletes all the attribute values whose values are the same except for one attribute value. Thereby, the variation extraction unit 143 extracts variations of the attribute value. Then, the variation extraction unit 143 counts the number of remaining attribute values as the number of variations.

Next, the variation extraction unit 143 determines whether or not the number of variations is greater than or equal to two (step S59). At this time, if the variation extraction unit 143 determines that the number of variations is greater than or equal to two (YES in step S59), the variation extraction unit 143 proceeds to step S60. On the other hand, if the variation extraction unit 143 determines that the number of variations is smaller than two (NO in step S59), the variation extraction unit 143 proceeds to step S64.

In step S60, the variation extraction unit 143 adds 1 to the number of dimensions N. Next, the variation extraction unit 143 sets the attribute name (N) to the attribute name included in the acquired attribute information. Further, the variation extraction unit 143 sets the number of variations VN(N) to the calculated number of variations (step S61).

Next, the attribute value-position component association unit 144 sets the attribute values (N, 1) to (N, VN(N)) to the extracted variations of the attribute value (step S62). The value of the first index of the attribute value array corresponds to the ordinal number of the index of the cell array. Therefore, the value of the first index of the attribute value array corresponds to the coordinate axis of the cells. The value of the second index of the attribute value array corresponds to the position component on a coordinate axis associated with the value of the first index. Therefore, by the processes of steps S61 and S62, an attribute item where there are variations of the attribute value is associated with a coordinate axis based on the priority and each of variations of the attribute value is associated with a position component. After completing this process, the attribute value-position component association unit 144 proceeds to step S64.

In step S63, the variation extraction unit 143 determines whether or not the brand specified by the user is a corporate brand. At this time, if the variation extraction unit 143 determines that the specified brand is a corporate brand (YES in step S63), the variation extraction unit 143 proceeds to step S57. In this case, there is a probability that there are variations of the product brand in the specified corporate brand. Therefore, in step S57, the variation extraction unit 143 acquires the brand ID of the product brand as the attribute value. On the other hand, if the variation extraction unit 143 determines that the specified brand is a product brand (NO in step S63), the variation extraction unit 143 proceeds to step S64.

In step S64, the variation extraction unit 143 determines whether or not there is attribute information that has not yet been acquired from the genre information. At this time, if the variation extraction unit 143 determines that there is attribute information that has not been acquired (YES in step S64), the variation extraction unit 143 proceeds to step S65.

In step S65, the variation extraction unit 143 acquires one piece of attribute information whose priority is the highest among pieces of attribute information that have not yet been acquired from the genre information. Next, the variation extraction unit 143 proceeds to step S56. On the other hand, if the variation extraction unit 143 determines that all pieces of attribute information have been acquired (NO in step S64), the variation extraction unit 143 ends the variation extraction process.

Figure 16:
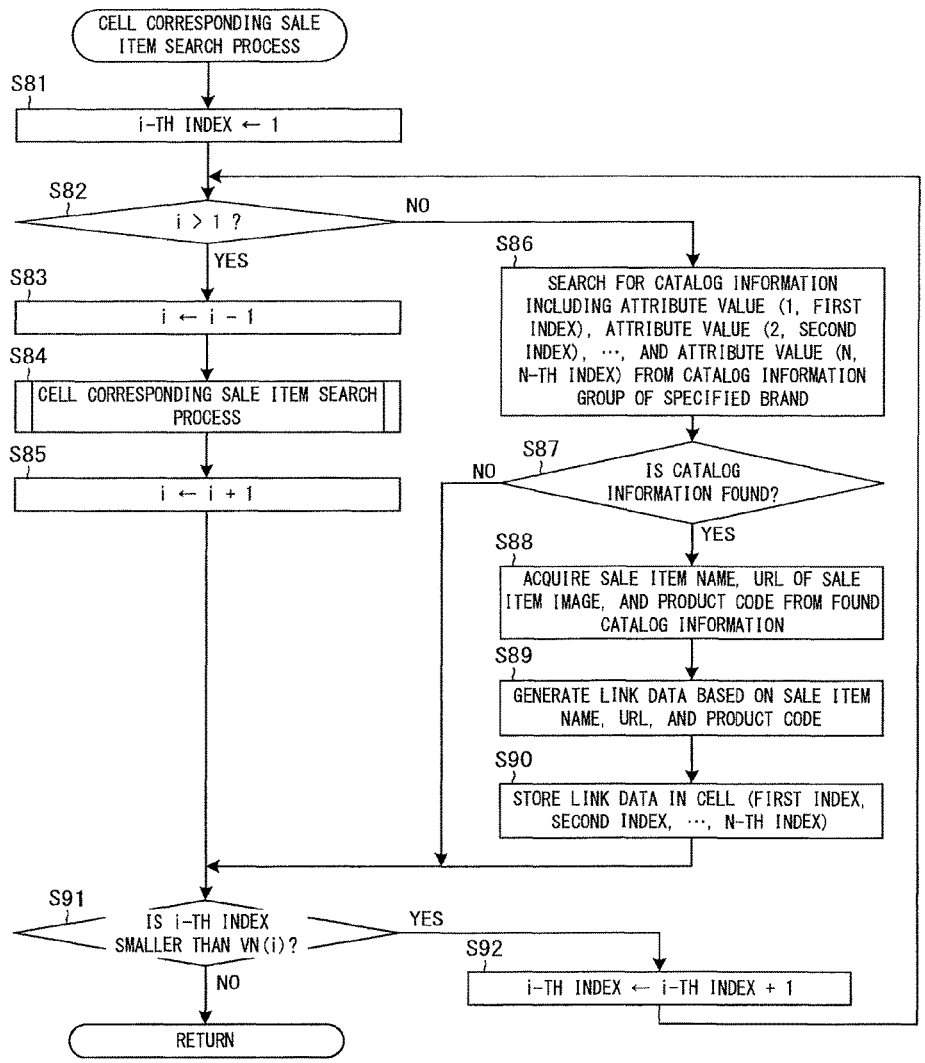
FIG. 16 is a flowchart illustrating a process example of a cell-related item for sale search process of the system control unit 14 of the online shopping mall server 1 according to an embodiment.

FIG. 16 is a flowchart illustrating a process example of the cell corresponding sale item search process of the system control unit 14 of the online shopping mall server 1 according to the present embodiment.

As illustrated in FIG. 16, the cell corresponding sale item search unit 145 sets the i-th index of the cell array to 1 (step S81). Next, the cell corresponding sale item search unit 145 determines whether or not the ordinal number i is greater than one (step S82). At this time, if the cell corresponding sale item search unit 145 determines that the ordinal number i is greater than one (YES in step S82), the cell corresponding sale item search unit 145 proceeds to step S83. On the other hand, if the cell corresponding sale item search unit 145 determines that the ordinal number i is 1 (NO in step S82), the cell corresponding sale item search unit 145 proceeds to step S86.

In step S83, the cell corresponding sale item search unit 145 subtracts 1 from the ordinal number i. Next, the cell corresponding sale item search unit 145 performs the cell corresponding sale item search process by recursive call (step S84). Next, the cell corresponding sale item search unit 145 adds 1 to the ordinal number i (step S85). Next, the cell corresponding sale item search unit 145 proceeds to step S91.

When the cell corresponding sale item search unit 145 proceeds to step S86, the setting of all the indexes from the first index to the N-th index in the cell array is completed. Therefore, in step S86, the cell corresponding sale item search unit 145 searches for catalog information of an item for sale which has an attribute value corresponding to the set indexes from the catalog information group of the specified brand. Specifically, the cell corresponding sale item search unit 145 searches for catalog information in which the attribute value corresponding to the attribute name (1) is the attribute value (1, first index), the attribute value corresponding to the attribute name (2) is the attribute value (2, second index), . . . , and the attribute value corresponding to the attribute name (N) is the attribute value (N, N-th index).

Next, the cell corresponding sale item search unit 145 determines whether or not the catalog information is found (step S87). At this time, if the cell corresponding sale item search unit 145 determines that the catalog information is found (YES in step S87), the cell corresponding sale item search unit 145 proceeds to step S88. On the other hand, if the cell corresponding sale item search unit 145 determines that the catalog information is not found (NO in step S87), the cell corresponding sale item search unit 145 proceeds to step S91.

In step S88, the variation display control unit 147 acquires a sale item name, a URL of a sale item image, and a product code from the found catalog information. Next, the variation display control unit 147 generates data of link indicating the item for sale based on the acquired information (step S89). Specifically, the variation display control unit 147 generates the data of link so that the sale item image 312 and the sale item name 313 are displayed in a cell of the sale item variation table. Further, the variation display control unit 147 generates data of link so that a search request including a product code is transmitted when the sale item image 312 or the sale item name 313 is selected.

Next, the variation display control unit 147 stores the generated link data in a cell (first index, second index, . . . N-th index) (step S90). Next, the variation display control unit 147 proceeds to step S91.

In step S91, the cell corresponding sale item search unit 145 determines whether or not the value of the i-th index is smaller than VN(N). At this time, if the cell corresponding sale item search unit 145 determines that the value of the i-th index is smaller than VN(N) (YES in step S91), the cell corresponding sale item search unit 145 proceeds to step S92. In step S92, the cell corresponding sale item search unit 145 adds 1 to the i-th index. Next, the cell corresponding sale item search unit 145 proceeds to step S82. On the other hand, if the cell corresponding sale item search unit 145 determines that the value of the i-th index is greater than or equal to VN(N) (NO in step S91), the cell corresponding sale item search unit 145 ends the cell corresponding sale item search process.

By the recursive call of the cell corresponding sale item search process and repetition of steps S82 to S92, An item for sale corresponding to each element of the cell array are searched for, and data of links indicating the found item for sale is set.

Figure 17:
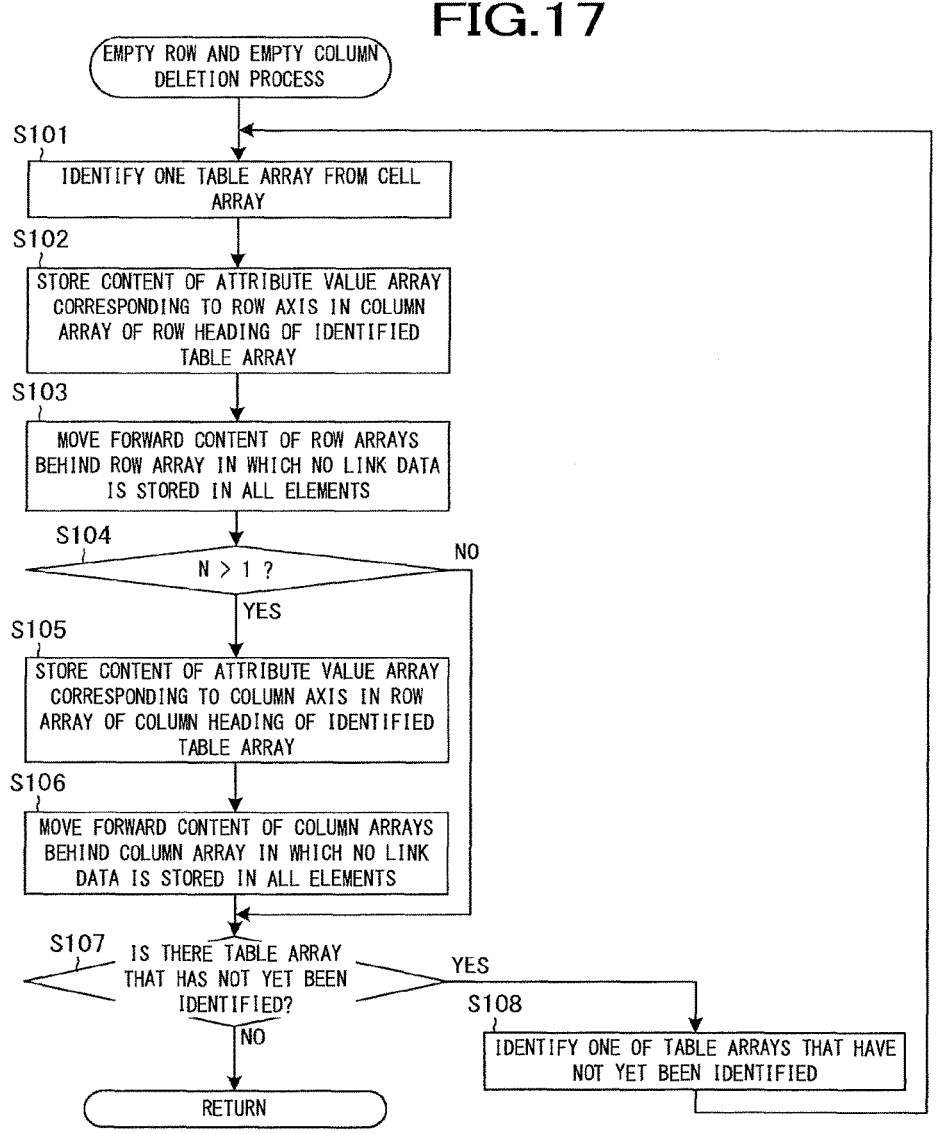
FIG. 17 is a flowchart illustrating a process example of an empty row and empty column deletion process of the system control unit 14 of the online shopping mall server 1 according to an embodiment.

FIG. 17 is a flowchart illustrating a process example of the empty row and empty column deletion process of the system control unit 14 of the online shopping mall server 1 according to the present embodiment.

As illustrated in FIG. 17, the empty row and empty column deletion unit 146 identifies a two-dimensional partial array corresponding to one sale item variation table from a cell array based on the association between an index and the row axis and the association between an index and the column axis in the cell array (step S101). In the present embodiment, the first index of the cell array corresponds to the row axis and the second index corresponds to the column axis. Here, the identified partial array is referred to as a "table array". Each one-dimensional array corresponding to a row in the table array is referred to as a "row array". Each one-dimensional array corresponding to a column in the table array is referred to as a "column array".

Next, the variation display control unit 147 stores content of attribute value array corresponding to an attribute item associated the row axis in a column array corresponding to a row heading of the sale item variation table which is in the identified table array (step S102). Here, when the attribute information corresponding to the attribute item associated with the row axis includes additional characters, the variation display control unit 147 adds the additional characters to the attribute values and stores the attribute values.

Next, the empty row and empty column deletion unit 146 determines whether or not no data of link is stored in all elements in a row array for each row array of the identified table array. When there is a row array in which no data of link is stored in all the elements, the empty row and empty column deletion unit 146 moves content of row arrays behind the row array forward by one row (step S103).

Next, the empty row and empty column deletion unit 146 determines whether or not the number of dimensions N is greater than one (step S104). At this time, if the empty row and empty column deletion unit 146 determines that the number of dimensions N is greater than one (YES in step S104), the empty row and empty column deletion unit 146 proceeds to step S105. On the other hand, if the empty row and empty column deletion unit 146 determines that the number of dimensions N is smaller than or equal to one (NO in step S104), the empty row and empty column deletion unit 146 proceeds to step S107.

In steps S105 and S106, the variation display control unit 147 and the empty row and empty column deletion unit 146 perform the same process executed on the rows in steps S102 and S103 on the columns. Next, the empty row and empty column deletion unit 146 proceeds to step S107.

In step S107, the empty row and empty column deletion unit 146 determines whether or not there is a table array that has not yet been identified from the cell array. At this time, if the empty row and empty column deletion unit 146 determines that there is a table array that has not yet been identified (YES in step S107), the empty row and empty column deletion unit 146 proceeds to step S108. In step S108, the empty row and empty column deletion unit 146 identifies one of the table arrays that have not yet been identified from the cell array. Next, the empty row and empty column deletion unit 146 proceeds to step S101. On the other hand, if the empty row and empty column deletion unit 146 determines that all the table arrays have been identified (NO in step S107), the empty row and empty column deletion unit 146 ends the empty row and empty column deletion process.

As described above, according to the present embodiment, the system control unit 14 determines, for a sale item group identified based on a mouseover of a brand name by a user from among a plurality of items for sale each of which has an attribute indicated by an attribute value corresponding to an attribute item, whether or not there are two or more attribute values for each attribute item, associates each of variations of attribute values which it is determined that there are two or more with a sale item variation table, a row or a column of the sale item variation table, identifies an item for sale which has the attribute indicated by a variation corresponding to a cell for each cell from among the identified sale item group based on the association, and causes the user terminal 3 to display a sale item variation table in which cells include sale item images and a sale item names which indicate the identified items for sale. Therefore, it is possible to arrange items for sale by using variations of attribute into a table and cause the table to be displayed.

Further, the system control unit 14 acquires an attribute name of a genre to which the identified sale item group belongs from the storage unit 12 that stores an attribute name indicating an attribute item for each genre of item for sale, acquires an attribute value of each item for sale included in the identified sale item group from the storage unit 12 that stores an attribute value of each item for sale for each attribute item, and determines whether or not there are variations of attribute value based on the attribute values acquired for the attribute item indicated by the acquired attribute name. Therefore, an administrator can set an attribute item suitable for a genre of an item for sale as an attribute item where the variations of the attribute value are represented in the sale item variation table.

Further, a sale item group is identified by a product brand, so that it is possible to reduce the number of empty cells that do not include a sale item image and a sale item name. The reason of this is because it is highly probable that, when a company produces and/or sells an item for sale that belongs to a product brand, the company prepares items for sale that are applied to a wide range of fields from among various combinations of variations of attribute value determined by the company, such as, for example, a combination of the content volume and the number of bottles or cans.

Further, when there are three or more attribute items where there are variations of attribute value, the system control unit 14 determines an attribute item where the variations of attribute value are associated with rows, an attribute item where the variations of attribute value are associated with columns, and attribute items where the variations of attribute value are associated with tabs or tables in a tab, and enables the user terminal 3 to display each of a plurality of sale item variation tables. Therefore, even when there are three or more attribute items where there are variations of attribute value, it is possible to cause a sale item variation table including sale item images and sale item names corresponding to combinations of variations of attribute values to be displayed.

Further, the system control unit 14 acquires priorities of attribute items in a genre to which the identified sale item group belongs from the storage unit 12 that stores priorities of attribute items in association with the attribute items for each genre, and determines an attribute item where the variation is associated with one of a plurality of sale item variation tables. Therefore, when an administrator sets a priority on each attribute item for each genre, it is possible to cause a sale item variation table to be displayed in a form according to the priorities.

Further, the system control unit 14 causes one or more brands to be displayed which are identified from a plurality of brands of items for sale based on a keyword included in a character string being inputted into the keyword input field 110 by the user, identifies a sale item group belonging to a brand which is specified by the user from the one or more displayed brands, and determines whether or not there are variations of attribute value in the sale item group belonging to the specified brand, and when any one of sale item images or any one of sale item names is specified by the user from the displayed sale item variation table, the system control unit 14 searches for sale item information related to items for sale indicated by the specified sale item image or sale item name from the storage unit 12 that stores sale item information of items for sale sold by each of a plurality of shops different from each other which may sell the same items for sale, and the search result page is displayed by the user terminal 3. Therefore, if there are one or more shops that sell an item for sale indicated by the sale item image or the sale item name specified by the user among a plurality of shops, information related to the item for sale for each shop is displayed as a search result. Therefore, it is possible to easily search for an item for sale which belongs to a brand desired by the user and has an attribute desired by the user.

1-5. Modified Example

Modified examples will be described below. The modified examples described below can be applied to embodiments described after the modified examples.

Modified Example 1

The division to identify a sale item group is not limited to brand. For example, the division to identify a sale item group may be genre. Specifically, the online shopping mall server 1 searches for genre names corresponding to a keyword inputted into the keyword input field 110 and performs control so that the searched genre names are displayed in the proposal area 200. When a genre name is specified from the proposal area 200, the online shopping mall server 1 identifies a sale item group belonging to a genre indicated by the specified genre name and performs control so that a sale item variation table of the identified sale item group is displayed. In this case, there is a case in which item for sale of a plurality of corporate brands belong to one genre. Therefore, the online shopping mall server 1 may define corporate brand as an attribute item and determine whether or not there are variations of corporate brand. The priority of the corporate brand may be set to the lowest level.

Modified Example 2

The online shopping mall server 1 may display the sale item variation table on a web page different from the top page instead of overlaying and displaying the sale item variation table on the top page. For example, when the user clicks some division of the proposal area 200, a web page of the sale item variation table may be displayed. Further, when the user selects one of divisions from a web page in which a list of divisions is displayed, a web page of the sale item variation table may be displayed.

Modified Example 3

The online shopping mall server 1 may perform control so that the user can specify a plurality of divisions having at least one attribute item different from each other's. The divisions may be arbitrarily specified. For example, a plurality of divisions can be selected in a web page in which a list of divisions is displayed. When a plurality of divisions are selected, for example, the online shopping mall server 1 may identify a common attribute item among the plurality of divisions and perform control so as to display variations of the item for sale for the common attribute item. For example, the online shopping mall server 1 identifies a common attribute item by determining whether or not attribute names are the same.

For example, it is assumed that the user specifies a television set and a refrigerator as genres. As illustrated in FIG. 2B, common attribute items between the television set and a refrigerator are the power consumption and the product brand. Therefore, the online shopping mall server 1 determines whether or not there are variations of attribute value for each of the power consumption and the product brand and generates table data based on the determination result. In this case, there may be a plurality of items for sale which have an attribute indicated by an attribute value corresponding to the position of one cell in the sale item variation table. In this case, a plurality of combinations of the sale item image 312 and the sale item name 313 may be included in one cell. The corporate brand may be included in the common attribute items.

Modified Example 4

A plurality of product brands whose genre is different from each other may belong to one corporate brand. For example, it is assumed that "SSS" is a brand name of a company S that produces and sells electrical products. Further, "GHI", "JKL", and "MNO" are product brand names held by the company S. For example, "GHI" is a product brand of television set, "JKL" is a product brand of recording device, and "MNO" is a product brand of music player. Genres of the television set, the recording device, and the music player are different from each other. Therefore, at least one attribute item is different among the television set, the recording device, and the music player. In this case, for example, in the same manner as in the modified example 3, the online shopping mall server 1 may perform control so as to display a sale item variation table for the common attribute item.

Or, for example, the online shopping mall server 1 may associate the product brands with the tab axis and execute control so that an independent sale item variation table is displayed based on attribute items corresponding to each product brand. For example, when a tab corresponding to "GHI" is selected, a sale item variation table is displayed for attribute items where there are variations of attribute value among the type of panel, the screen size, and the power consumption. When a tab corresponding to "JKL" is selected, for example, a sale item variation table is displayed for attribute items where there are variations of attribute value among a type of reproducible optical disk, a capacity of hard disk, the number of simultaneously recordable programs, and the like.

2. Second Embodiment

Next, a second embodiment will be described with reference to FIGS. 18 to 20. In the second embodiment, the online shopping mall server 1 determines whether an attribute item where there are variations of attribute value is associated with the row axis or the column axis so that a number relationship between the number of vertical cells and the number of horizontal cells in a sale item variation table corresponds to a length relationship between the vertical length and the horizontal length of the screen of the user terminal 3 on which the sale item variation table is displayed.

Figure 18A:
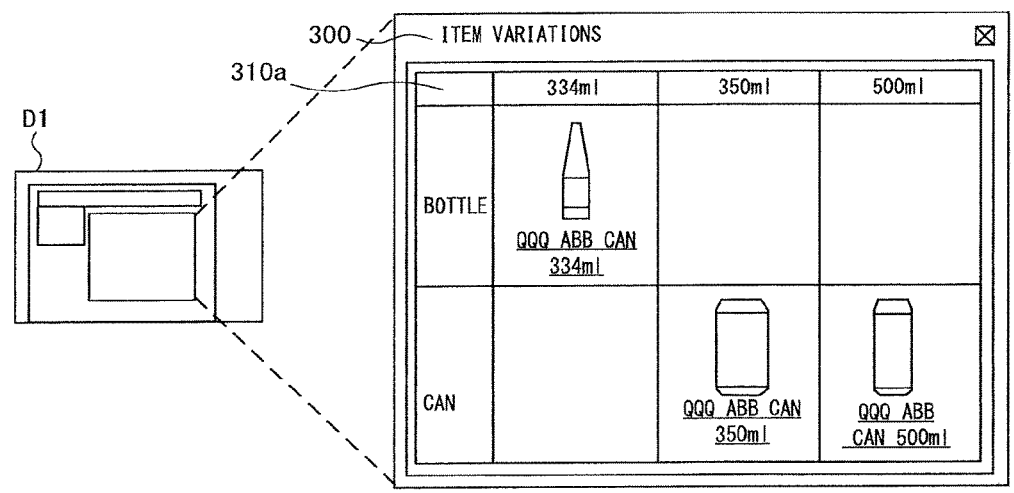
FIGS. 18A and 18B are diagrams each illustrating a display example of a sale item variation table in "ABB".
Figure 18B:
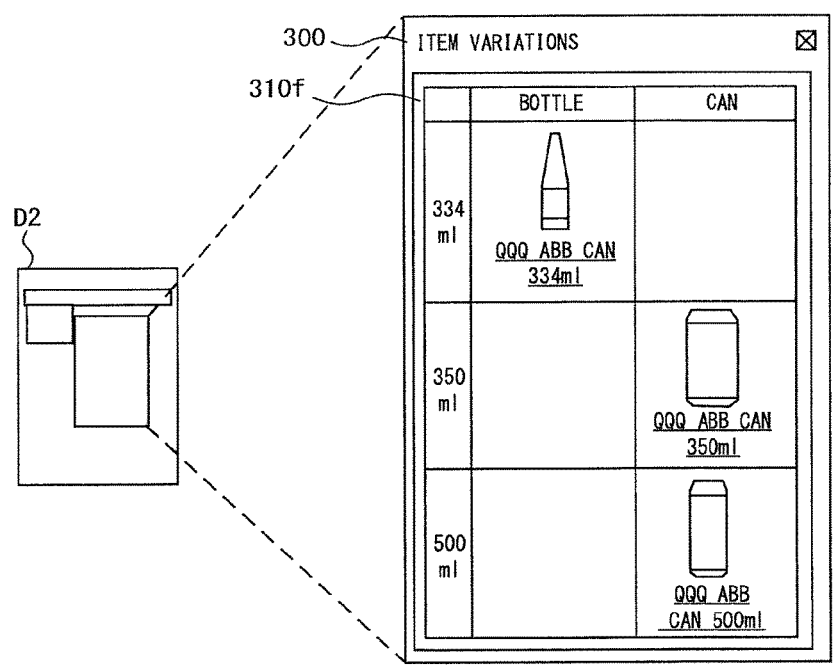

FIGS. 18A and 18B are diagrams illustrating a display example of a sale item variation table in "ABB". Regarding the item for sale of "ABB", the number of variations of the number of bottles or cans is two and the number of variations of the content volume is three. Therefore, the sale item variation table is a table of two rows and three columns or a table of three rows and two columns.

FIG. 18A is a display example of the sale item variation table when the horizontal length of the screen D1 is longer than the vertical length. In this case, the online shopping mall server 1 determines whether each of the number of bottles or cans and the content volume is associated with the row axis or the column axis so that the number of horizontal cells is greater than the number of vertical cells. Therefore, the number of bottles or cans is associated with the row axis and the content volume is associated with the column axis. Therefore, as illustrated in FIG. 18A, a sale item variation table 310a of two rows and three columns is displayed in the sale item variation window. The screen of the user terminal 3 is an example of an area in which the sale item variation table is displayed.

FIG. 18B is a display example of the sale item variation table when the vertical length of the screen D2 is longer than the horizontal length. In this case, the online shopping mall server 1 determines whether each of the number of bottles or cans and the content volume is associated with the row axis or the column axis so that the number of vertical cells is greater than the number of horizontal cells. In this case, the content volume is associated with the row axis and the number of bottles or cans is associated with the column axis. Therefore, as illustrated in FIG. 18B, a sale item variation table 310f of three rows and two columns is displayed in the sale item variation window.

In this way, the number relationship of the numbers of cells in the sale item variation table corresponds to the length relationship of the screen, so that the user can easily see the entire sale item variation table. Specifically, there is a high probability that the entire sale item variation table is included in the screen. Or, even if the entire sale item variation table is not included in the screen, a user operation necessary to see every part of the sale item variation table is reduced.

When the number of dimensions is two, the online shopping mall server 1 may determine whether one of two attribute items where there are variations of attribute value is associated with the row axis or the column axis. Thereby, the coordinate axis with which the remaining one attribute item is associated is automatically determined. When the number of dimensions is three or more, for example, the online shopping mall server 1 may determine whether one of two attribute items whose priorities are the highest level and the second highest level is associated with the row axis or the column axis. When the number of dimensions is one, the online shopping mall server 1 may determine whether one attribute item where there are variations of attribute value is associated with the row axis or the column axis.

Figure 19:
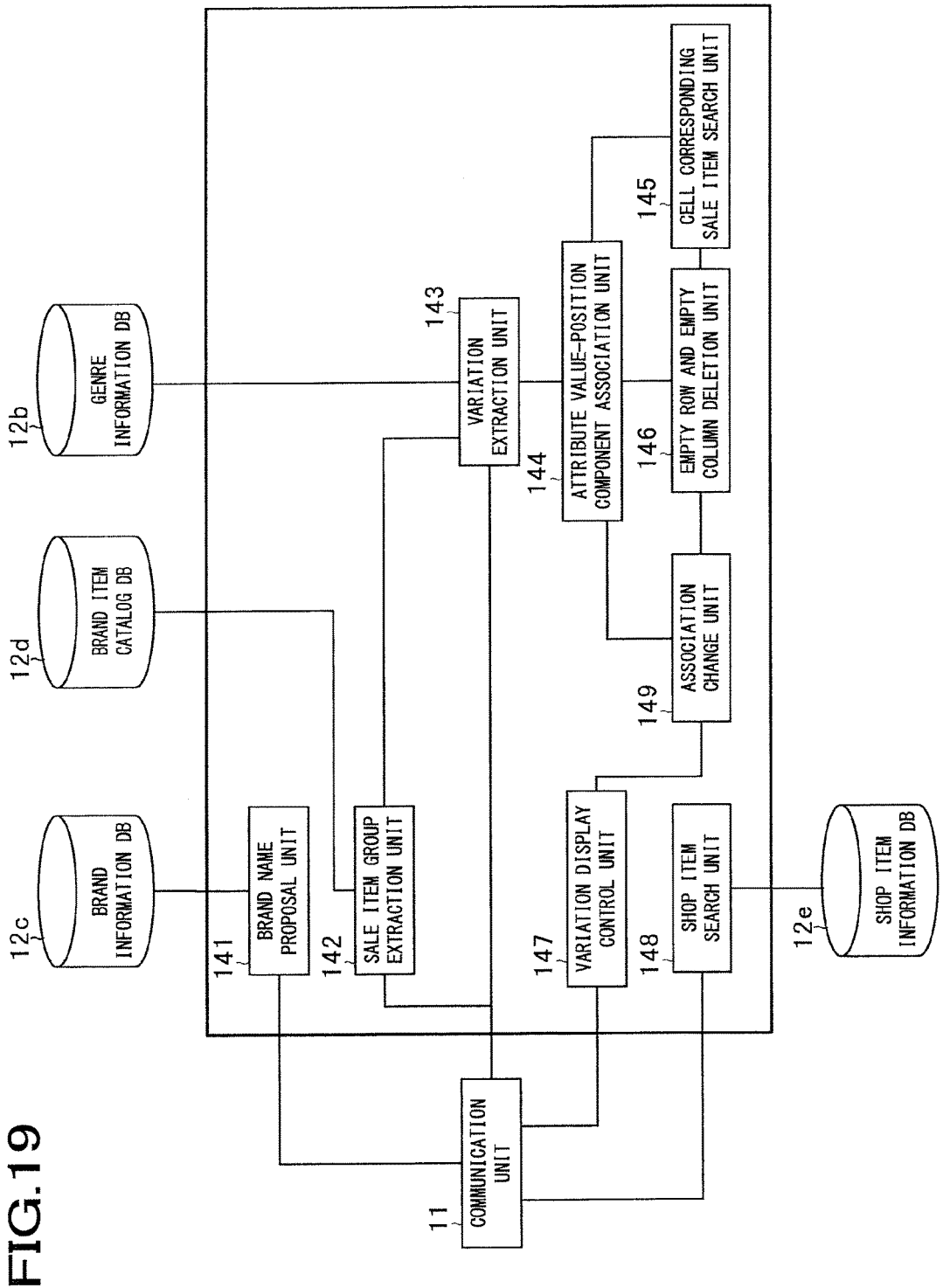
FIG. 19 is a diagram illustrating an example of functional blocks of an online shopping mall server 1 according to an embodiment.

FIG. 19 is a block diagram illustrating an example of functional blocks of the online shopping mall server 1 according to the present embodiment. In FIG. 19, the same components as those in FIG. 13 are denoted by the same reference numerals. As illustrated in FIG. 19, the system control unit 14 functions as a brand name proposal unit 141, a sale item group extraction unit 142, a variation extraction unit 143, an attribute value-position component association unit 144, an cell corresponding sale item search unit 145, an empty row and empty column deletion unit 146, a variation display control unit 147, a shop item search unit 148, and an association change unit 149. The association change unit 149 is an example of a row and column determination means in the present invention.

The association change unit 149 exchanges the attribute item associated with the row axis and the attribute item associated with the column axis when the number relationship between the number of vertical cells and the number of horizontal cells does not correspond to the length relationship between the vertical length and the horizontal length of the screen as a result of association between the attribute items and the coordinate axes executed by the attribute value-position component association unit 144 based on the priorities. The association change unit 149 acquires information indicating the length relationship between the vertical length and the horizontal length of the screen from, for example, a sale item variation table request transmitted from the user terminal 3. For example, the association change unit 149 may acquire user agent information from the header of the request and determine the type of the user terminal 3 based on the acquired information. Then the association change unit 149 may determine the length relationship based on the type of the user terminal 3. When the resolution of the screen is included in the header of the request, the association change unit 149 may determine the length relationship based on the included resolution. The association change unit 149 may use another method that can determine the length relationship.

When a sale item variation table to be displayed is replaced with another one of a plurality of sale item variation tables by using tabs, for example, the association change unit 149 may determine the number relationship based on the number of vertical cells and the number of horizontal cells of the sale item variation table that is displayed first. When a plurality of sale item variation tables are displayed at the same time, for example, the association change unit 149 may determine the number relationship based on the number of vertical cells and the number of horizontal cells of the sale item variation table that is displayed at the uppermost and the leftmost position. The association change unit 149 may determine the number relationship based on, for example, an average value between the number of vertical cells and the number of horizontal cells.

Figure 20:
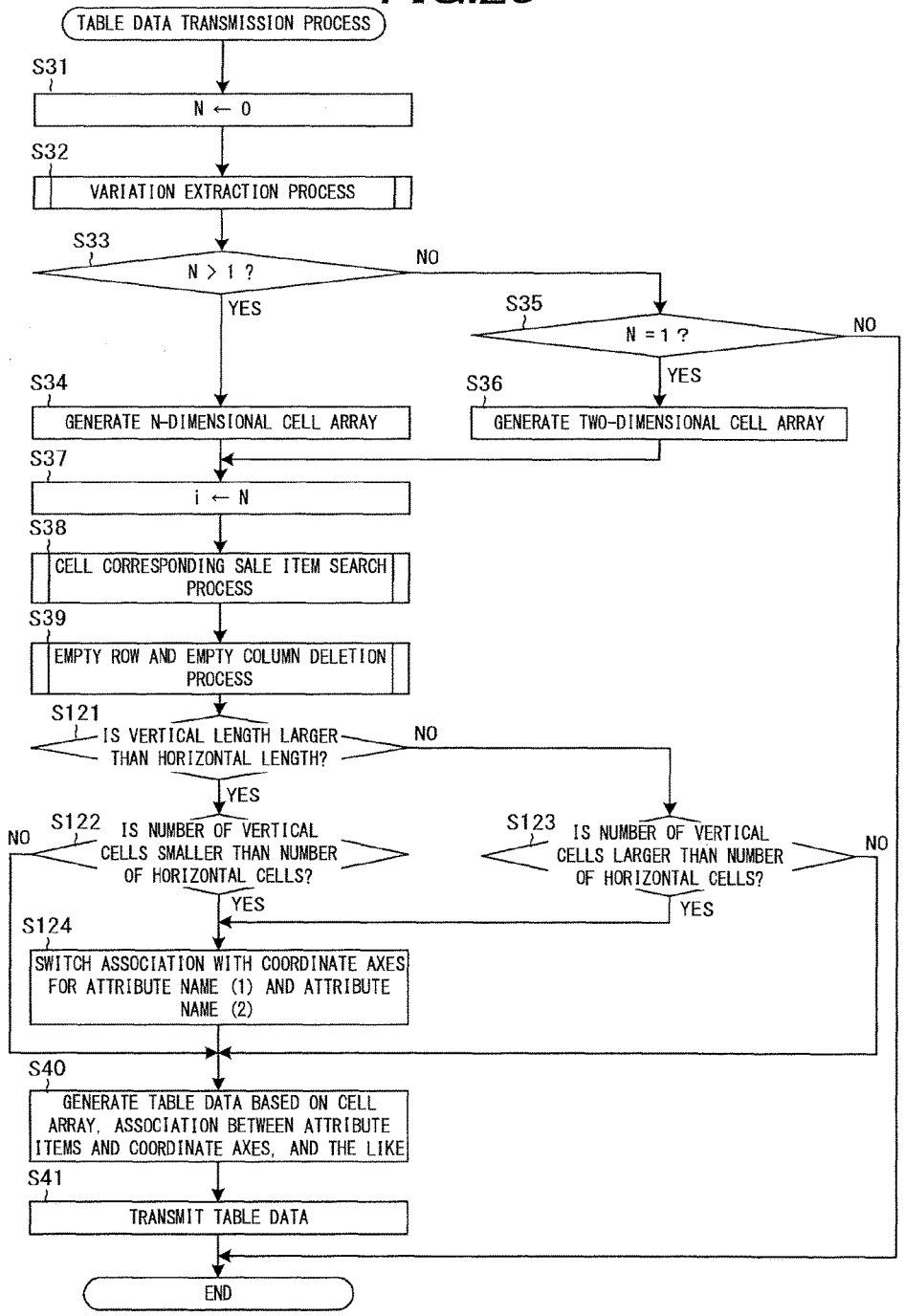
FIG. 20 is a flowchart illustrating a process example of a table data transmission process of a system control unit 14 of the online shopping mall server 1 according to an embodiment.

FIG. 20 is a flowchart illustrating a process example of a table data transmission process of the system control unit 14 of the online shopping mall server 1 according to the present embodiment. In FIG. 20, the same processes as those in FIG. 14 are denoted by the same reference numerals.

As illustrated in FIG. 20, after steps S31 to S39 are executed, the association change unit 149 determines whether or not the vertical length of the screen is longer than the horizontal length based on the sale item variation table request (step S121). At this time, if the association change unit 149 determines that the vertical length is longer than the horizontal length (YES in step S121), the association change unit 149 proceeds to step S122. On the other hand, if the association change unit 149 determines that the vertical length is not longer than the horizontal length (NO in step S121), the association change unit 149 proceeds to step S123.

In step S122, the association change unit 149 determines whether or not the number of vertical cells in the sale item variation table is smaller than the number of horizontal cells. In the variation extraction process, an attribute item indicated by the attribute name (1) is associated with the row axis and an attribute item indicated by the attribute name (2) is associated with the column axis. In the empty row and empty column deletion process, attribute values are stored in the column arrays corresponding to the row headings and the row arrays corresponding to the column headings based on the association between the attribute items and the coordinate axes. Therefore, the association change unit 149 calculates the number of vertical cells and the number of horizontal cells based on content of the column arrays corresponding to the row headings and the row arrays corresponding to the column headings. If the association change unit 149 determines that the number of vertical cells is not smaller than the number of horizontal cells (NO in step S122), the association change unit 149 proceeds to step S40. On the other hand, if the association change unit 149 determines that the number of vertical cells is smaller than the number of horizontal cells (YES in step S122), the association change unit 149 proceeds to step S124.

In step S123, the association change unit 149 determines whether or not the number of vertical cells in the sale item variation table is greater than the number of horizontal cells. At this time, if the association change unit 149 determines that the number of vertical cells is greater than the number of horizontal cells (YES in step S123), the association change unit 149 proceeds to step S124. On the other hand, if the association change unit 149 determines that the number of vertical cells is not greater than the number of horizontal cells (NO in step S123), the association change unit 149 proceeds to step S40.

In step S124, the association change unit 149 associates the attribute item indicated by the attribute name (1) with the column axis and associates the attribute item indicated by the attribute name (2) with the row axis. Next, the variation display control unit 147 executes steps S40 and S41 and ends the table data transmission process.

As described above, according to the present embodiment, the system control unit 14 determines whether a variation of attribute value corresponding to at least one of attribute items where it is determined that there are variations of attribute value is associated with the row axis or the column axis so that the number relationship between the number of vertical cells and the number of horizontal cells in the sale item variation table matches to the length relationship between the vertical length and the horizontal length of the screen of the user terminal 3 on which the sale item variation table is displayed. Therefore, the user can easily see the entire sale item variation table.

3. Third Embodiment

Next, a third embodiment will be described with reference to FIGS. 21 to 24. In the third embodiment, when the number of dimensions is three or more, the online shopping mall server 1 determines attribute items to be associated with the row axis and the column axis respectively so that the number of empty cells among the cells in a plurality of sale item variation tables to be displayed is the smallest.

When the number of dimensions is three or more, the number of empty cells changes depending on the attribute items associated with the row axis and the column axis respectively among the coordinate axes of the cells. When the number of empty cells is relatively great for the number of cells in the sale item variation table, it means that the number of variations of item for sale displayed in the sale item variation table is small compared to a total number of cells in the sale item variation table. It is not appropriate to provide a sale item variation table in which the number of variations of item for sale is small to a user. Therefore, the online shopping mall server 1 associates attribute items with the coordinate axes so that the number of empty cells is the smallest.

A specific example will be described below. It is assumed that the brand specified by the user is "ABC". The number of dimensions of "ABC" is three, so that two attribute items are associated with the row axis and the column axis and the other one attribute item is associated with the tab axis.

FIGS. 21A to 21C are diagrams illustrating an example of content of sale item variation tables in which rows and columns where all cells are empty are deleted. A field in which "0" is written represents a cell where a corresponding item for sale exists and a blank field represents an empty cell where a corresponding item for sale does not exist. FIG. 21A illustrates content of sale item variation tables in which the number of bottles or cans is associated with the row axis and the content volume is associated with the column axis. The number of variations of the container is two, so that the sale item variation table is divided into two tables. In this case, as illustrated in FIG. 21A, the number of empty cells is two. FIG. 21B illustrates content of sale item variation tables in which the number of bottles or cans is associated with the row axis and the container is associated with the column axis. The number of variations of the content volume is four, so that the sale item variation table is divided into four tables. In this case, as illustrated in FIG. 21B, the number of empty cells is three. FIG. 21C illustrates content of sale item variation tables in which the content volume is associated with the row axis and the container is associated with the column axis. The number of variations of the number of bottles or cans is four, so that the sale item variation table is divided into four tables. In this case, as illustrated in FIG. 21C, the number of empty cells is three. Therefore, finally, the number of bottles or cans is associated with the row axis and the content volume is associated with the column axis. Thus, the sale item variation tables are displayed as illustrated in FIG. 7 or 8 in the sale item variation window 300. When the row axis and the column axis are replaced with each other, the result is the same.

Figure 22:
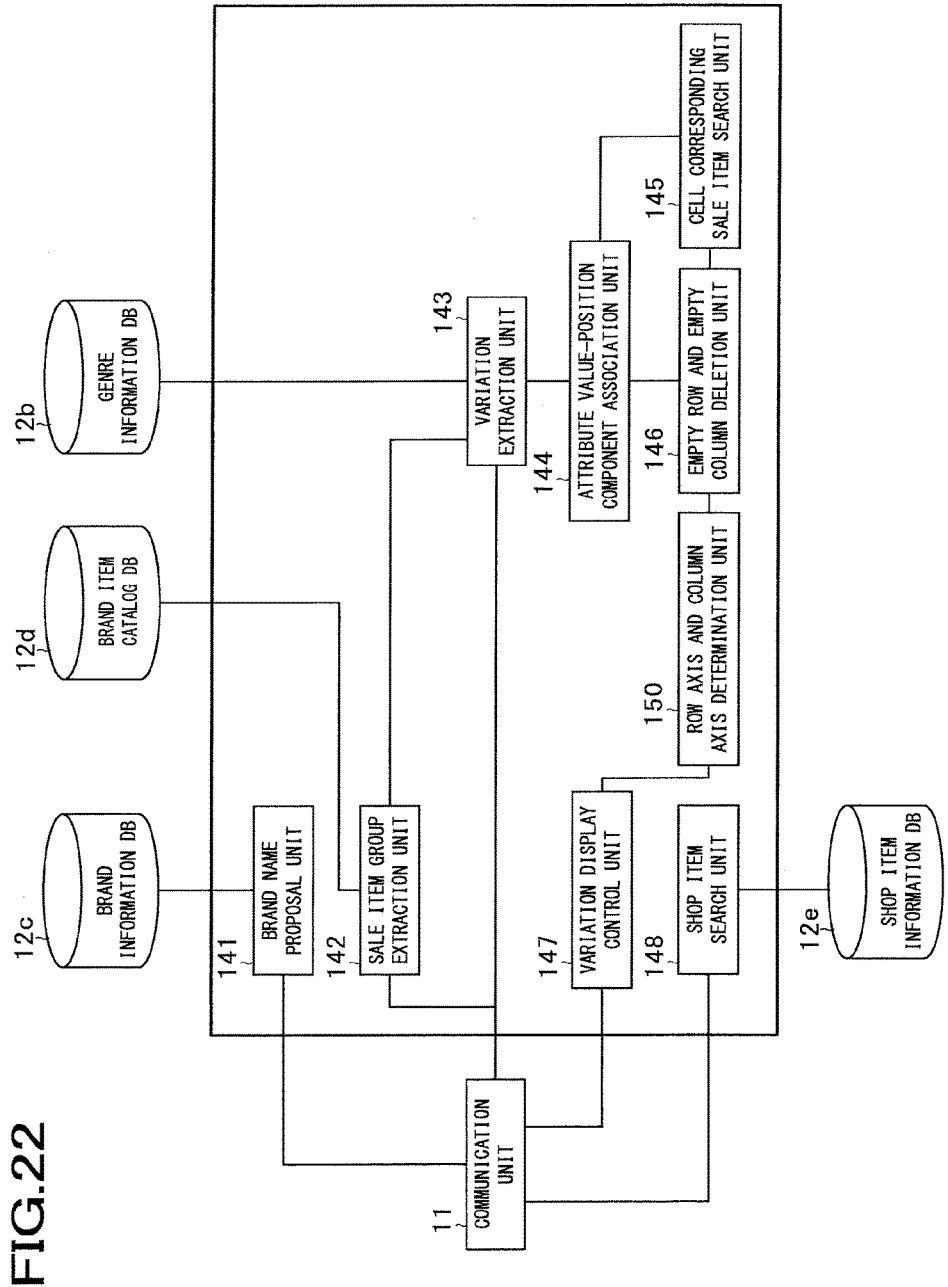
FIG. 22 is a diagram illustrating an example of functional blocks of an online shopping mall server 1 according to an embodiment.

FIG. 22 is a block diagram illustrating an example of functional blocks of the online shopping mall server 1 according to the present embodiment. In FIG. 22, the same components as those in FIG. 13 are denoted by the same reference numerals. As illustrated in FIG. 22, the system control unit 14 functions as a brand name proposal unit 141, a sale item group extraction unit 142, a variation extraction unit 143, an attribute value-position component association unit 144, an cell corresponding sale item search unit 145, an empty row and empty column deletion unit 146, a variation display control unit 147, a shop item search unit 148, and a row axis and column axis determination unit 150. The row axis and column axis determination unit 150 is an example of an attribute item determination means in the present invention. The row axis and column axis determination unit 150 associates attribute items with the coordinate axes so that the number of empty cells is the smallest.

Figure 23:
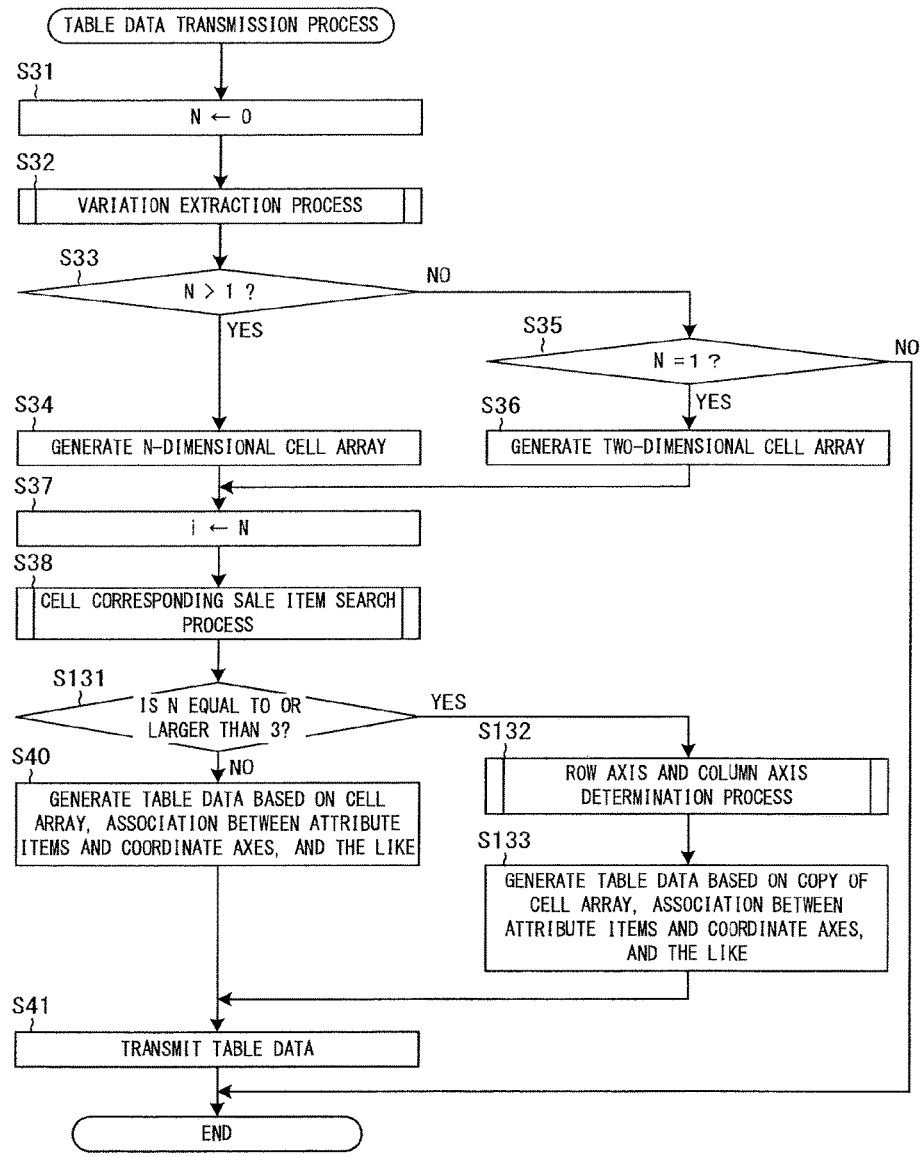
FIG. 23 is a flowchart illustrating a process example of a table data transmission process of a system control unit 14 of the online shopping mall server 1 according to an embodiment.

FIG. 23 is a flowchart illustrating a process example of the table data transmission process of the system control unit 14 of the online shopping mall server 1 according to the present embodiment. In FIG. 23, the same processes as those in FIG. 14 are denoted by the same reference numerals.

As illustrated in FIG. 23, steps S31 to S38 are executed. Here, the association between attribute items and the coordinate axes in the variation extraction process may be changed later. After step S38 is executed, the row axis and column axis determination unit 150 determines whether or not the number of dimensions N is greater than or equal to three (step S131). At this time, if the row axis and column axis determination unit 150 determines that the number of dimensions N is smaller than three (NO in step S131), the variation display control unit 147 executes steps S40 and S41 and ends the table data transmission process. On the other hand, if the row axis and column axis determination unit 150 determines that the number of dimensions N is greater than or equal to three (YES in step S131), the row axis and column axis determination unit 150 executes a row axis and column axis determination process (step S132).

Figure 24:
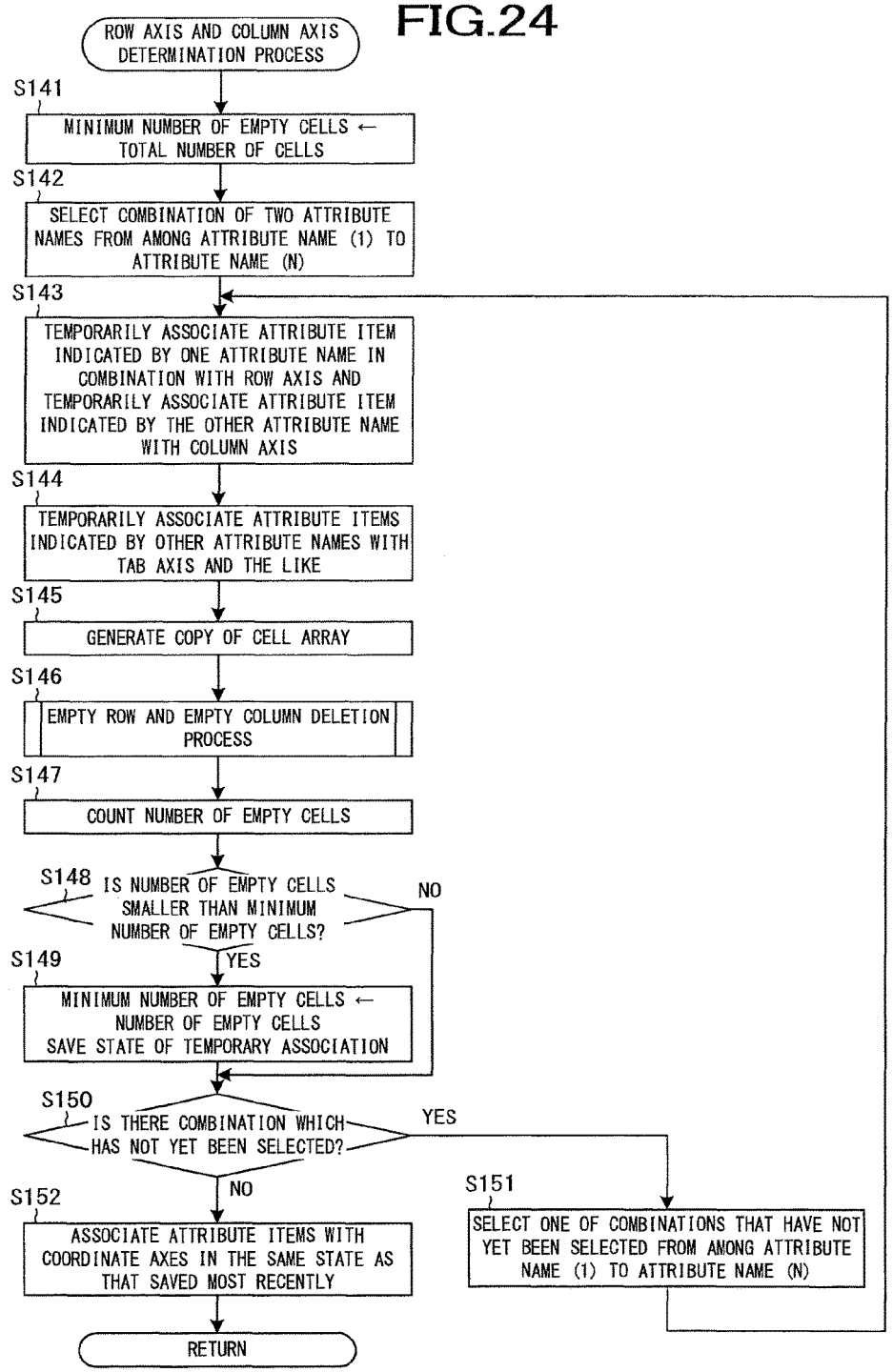
FIG. 24 is a flowchart illustrating a process example of a row axis and column axis determination process of the system control unit 14 of the online shopping mall server 1 according to an embodiment.

FIG. 24 is a flowchart illustrating a process example of the row axis and column axis determination process of the system control unit 14 of the online shopping mall server 1 according to the present embodiment.

As illustrated in FIG. 24, the row axis and column axis determination unit 150 sets the minimum number of empty cells to a total number of cells in the sale item variation table calculated based on the numbers of variations VN(1) to VN(N) (step S141). Next, the row axis and column axis determination unit 150 selects a combination of two attribute names from among the attribute name (1) to the attribute name (N) (step S142).

Next, the row axis and column axis determination unit 150 temporarily associates an attribute item indicated by one attribute name included in the selected combination with the row axis and temporarily associates an attribute item indicated by the other attribute name included in the selected combination with the column axis (step S143). The row axis and column axis determination unit 150 may associate an attribute item with a higher priority between attribute items indicated by the attribute names included in the selected combination with the row axis. Next, the row axis and column axis determination unit 150 temporarily associates attribute items indicated by attribute names other than the attribute names included in the selected combination among the attribute name (1) to the attribute name (N) with the tab axis, the in-tab table axis, and the like respectively (step S144). The row axis and column axis determination unit 150 may perform the association according to the priorities of the attribute items.

Next, the row axis and column axis determination unit 150 generates a copy of the cell array where setting is performed in the cell corresponding sale item search process (step S145). Next, the empty row and empty column deletion unit 146 executes the empty row and empty column deletion process (step S146). In the present embodiment, the empty row and empty column deletion process is executed on the copy of the cell array. A table array is identified according to the association between the attribute items and the coordinate axes in steps S143 and S144.

Next, the row axis and column axis determination unit 150 counts the number of empty cells in the sale item variation table according to the association between the attribute items and the coordinate axes in steps S143 and S144 based on content of the copy on which the empty row and empty column deletion process is performed (step S147). Next, the row axis and column axis determination unit 150 determines whether or not the number of empty cells is smaller than the minimum number of empty cells (step S148). At this time, if the row axis and column axis determination unit 150 determines that the number of empty cells is smaller than the minimum number of empty cells (YES in step S148), the row axis and column axis determination unit 150 proceeds to step S149. On the other hand, if the row axis and column axis determination unit 150 determines that the number of empty cells is greater than or equal to the minimum number of empty cells (NO in step S148), the row axis and column axis determination unit 150 proceeds to step S150.

In step S149, the row axis and column axis determination unit 150 sets the minimum number of empty cells to the number of empty cells. Further, the row axis and column axis determination unit 150 saves a state of the temporary association between the attribute items and the coordinate axes in step S144. Next, the row axis and column axis determination unit 150 proceeds to step S150.

In step S150, the row axis and column axis determination unit 150 determines whether or not there is a combination which has not yet been selected among the combinations of two attribute names that can be selected from among the attribute name (1) to the attribute name (N). At this time, if the row axis and column axis determination unit 150 determines that there is a combination which has not yet been selected (YES in step S150), the row axis and column axis determination unit 150 proceeds to step S151. On the other hand, if the row axis and column axis determination unit 150 determines that all the combinations have been selected (NO in step S150), the row axis and column axis determination unit 150 proceeds to step S152.

In step S151, the row axis and column axis determination unit 150 selects one of the combinations of two attribute names that have not yet been selected from among the attribute name (1) to the attribute name (N). Next, the row axis and column axis determination unit 150 proceeds to step S143.

In step S152, the row axis and column axis determination unit 150 reads the state of the association between the attribute items and the coordinate axes which is finally saved in step S149 and performs association between the attribute items and the coordinate axes in the same state as the read state. After completing this process, the row axis and column axis determination unit 150 ends the row axis and column axis determination process.

After the row axis and column axis determination process, as illustrated in FIG. 23, the variation display control unit 147 generates table data based on the association between the attribute items and the coordinate axes in the row axis and column axis determination process, the copy of the cell array according to the association, and the attribute name (1) to the attribute name (N) (step S133). Next, the variation display control unit 147 proceeds to step S41.

As described above, the system control unit 14 causes a sale item variation table from which rows and columns not including a sale item image and a sale item name are removed to be displayed and determines attribute items where variations are associated with one of a plurality of sale item variation tables so that the number of cells that do not include a sale item image and a sale item name among cells in a plurality of sale item variation tables is the smallest. Therefore, it is possible to cause a sale item variation table in which the number of cells that do not include a sale item image and a sale item name is small to be displayed.

The online shopping mall server 1 can perform association between the attribute items and coordinate axes by combining the third embodiment with at least one of the first embodiment and the second embodiment. For example, after performing the association between the attribute items and the coordinate axes based on the number of empty cells, the online shopping mall server 1 may determine whether or not the row axis and the column axis are replaced with each other based on the length relationship of the screen of the user terminal 3.

4. Fourth Embodiment

Next, a fourth embodiment will be described with reference to FIGS. 25 to 28. In the fourth embodiment, the online shopping mall server 1 determines an attribute item to be associated with the tab axis based on a keyword included in a character string being inputted into the keyword input field 110 by a user.

For example, the user may want to know variations of item for sale in a sale item group having a specific attribute among sale item groups of a certain brand. For example, the user wants to know variations of item for sale whose content volume is 500 ml among items for sale of "ABC". In this case, for example, in a display as illustrated in FIGS. 7 and 8, the sale item variation table is divided into two tabs, so that the user cannot see all the variations of the item for sale whose content volume is 500 ml at the same time. Further, for example, in a display as illustrated in FIG. 10, the user may be able to see all the variations of the item for sale whose content volume is 500 ml at the same time. However, information of items for sale whose content volume is not 500 ml is included in each sale item variation table, so that it is difficult for the user to check the variations which the user wants to know.

Therefore, if the user inputs an attribute value following a brand name in the keyword input field 110, the online shopping mall server 1 identifies a variation corresponding to the inputted attribute value from among the extracted variations of the attribute value. Then, the online shopping mall server 1 associates an attribute item corresponding to the identified variation with the tab axis. Further, the online shopping mall server 1 performs control so that the sale item variation table of the tab corresponding to the identified variation is displayed first.

Figure 25:
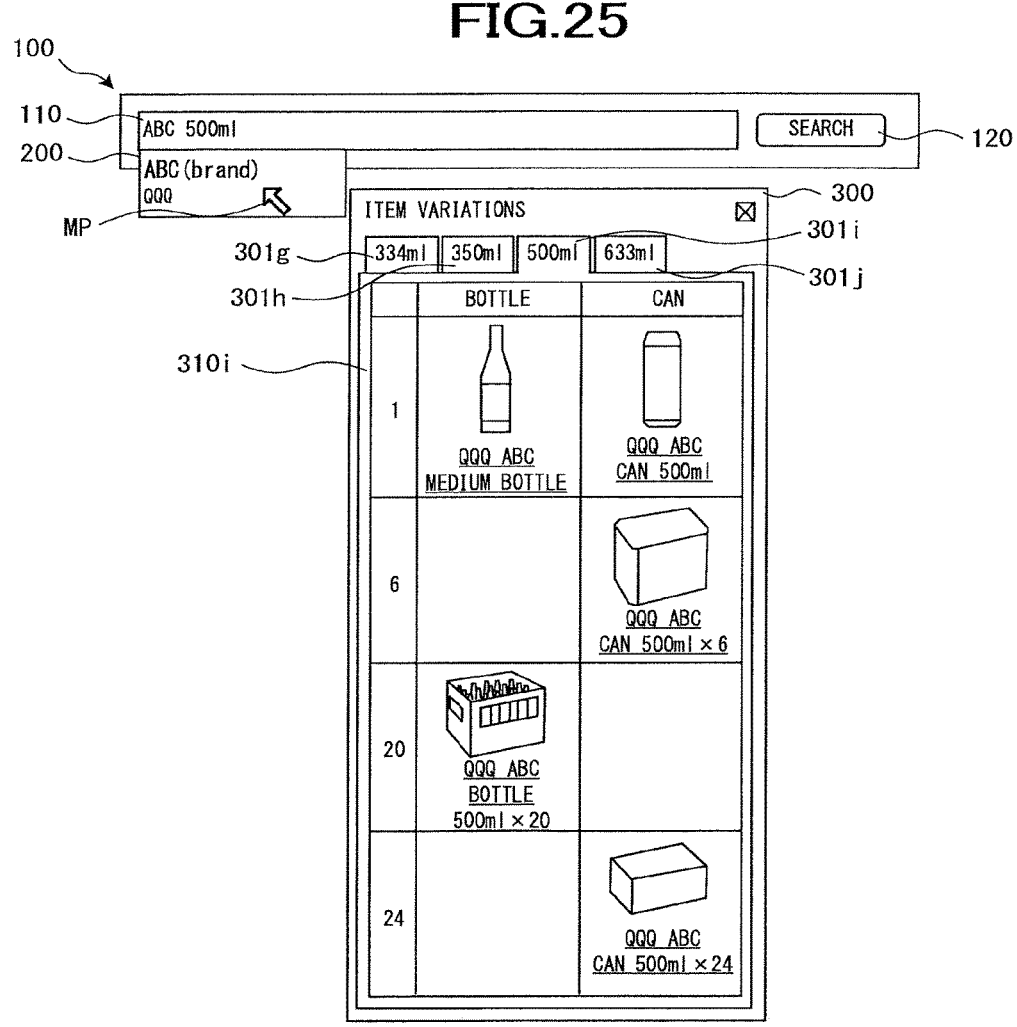
FIG. 25 is a diagram illustrating a display example of a sale item variation table.

FIG. 25 is a diagram illustrating a display example of the sale item variation table. For example, the user inputs "ABC 500 ml" in the keyword input field 110. Thereafter, the user mouses over "ABC" displayed in the proposal area 200. Regarding the item for sale of "ABC", there is a variation of "500" for the "content volume". Therefore, the "content volume" is associated with the tab axis. Therefore, as illustrated in FIG. 25, tabs 301g to 301j and a sale item variation table 310i are displayed in the sale item variation window 300. An attribute value corresponding to the "content volume" is associated with each of the tabs 301g to 301j. Specifically, the tab 301g corresponds to 334 ml, the tab 301h corresponds to 350 ml, the tab 301i corresponds to 500 ml, and the tab 301j corresponds to 633 ml. Among the tabs 301g to 301j, the tab 301i is selected. The sale item variation table 310i is a sale item variation table corresponding to 500 ml. Therefore, variations of item for sale whose content volume is 500 ml are displayed in the sale item variation table 310i.

Figure 26:
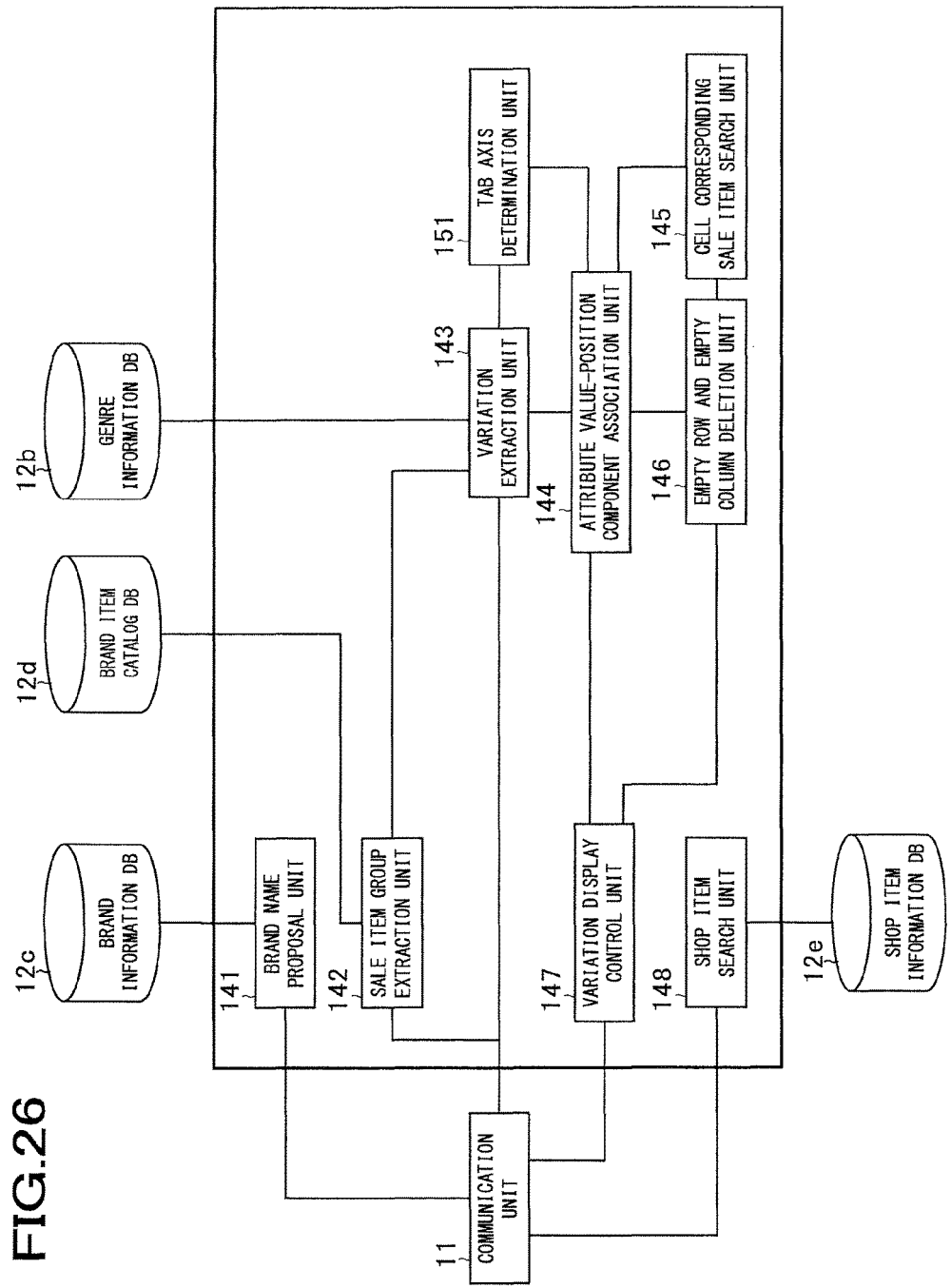
FIG. 26 is a diagram illustrating an example of functional blocks of an online shopping mall server 1 according to an embodiment.

FIG. 26 is a block diagram illustrating an example of functional blocks of the online shopping mall server 1 according to the present embodiment. In FIG. 26, the same components as those in FIG. 13 are denoted by the same reference numerals. As illustrated in FIG. 26, the system control unit 14 functions as a brand name proposal unit 141, a sale item group extraction unit 142, a variation extraction unit 143, an attribute value-position component association unit 144, an cell corresponding sale item search unit 145, an empty row and empty column deletion unit 146, a variation display control unit 147, a shop item search unit 148, and a tab axis determination unit 151. The tab axis determination unit 151 is an example of an attribute item determination means in the present invention. A combination of the variation display control unit 147 and the tab axis determination unit 151 is an example of the table display control means in the present invention.

When two or more keywords are included in the character string being inputted into the keyword input field 110, the tab axis determination unit 151 searches for a variation corresponding to the second keyword from among variations of attribute value. The variation corresponding to the keyword may be, for example, at least one of a variation identical to the keyword and a variation partially identical to the keyword. Further, the variation corresponding to the keyword may be, for example, a variation whose forward part is identical to the keyword and a variation whose backward part is identical to the keyword. For an attribute item including an additional character, the tab axis determination unit 151 performs search on the attribute item to which the additional characters is added. For example, in the case of the number of bottles or cans, the attribute values added the additional characters are "1 bottle", "6 bottles", and the like. When there is a variation corresponding to the second keyword, the tab axis determination unit 151 associates an attribute item corresponding to the variation with the tab axis. Then, the tab axis determination unit 151 determines the tab corresponding to the variation corresponding to the second keyword as an object to be displayed first. The tab axis determination unit 151 may search a variation of an attribute value corresponding to a keyword other than the second keyword.

Figure 27:
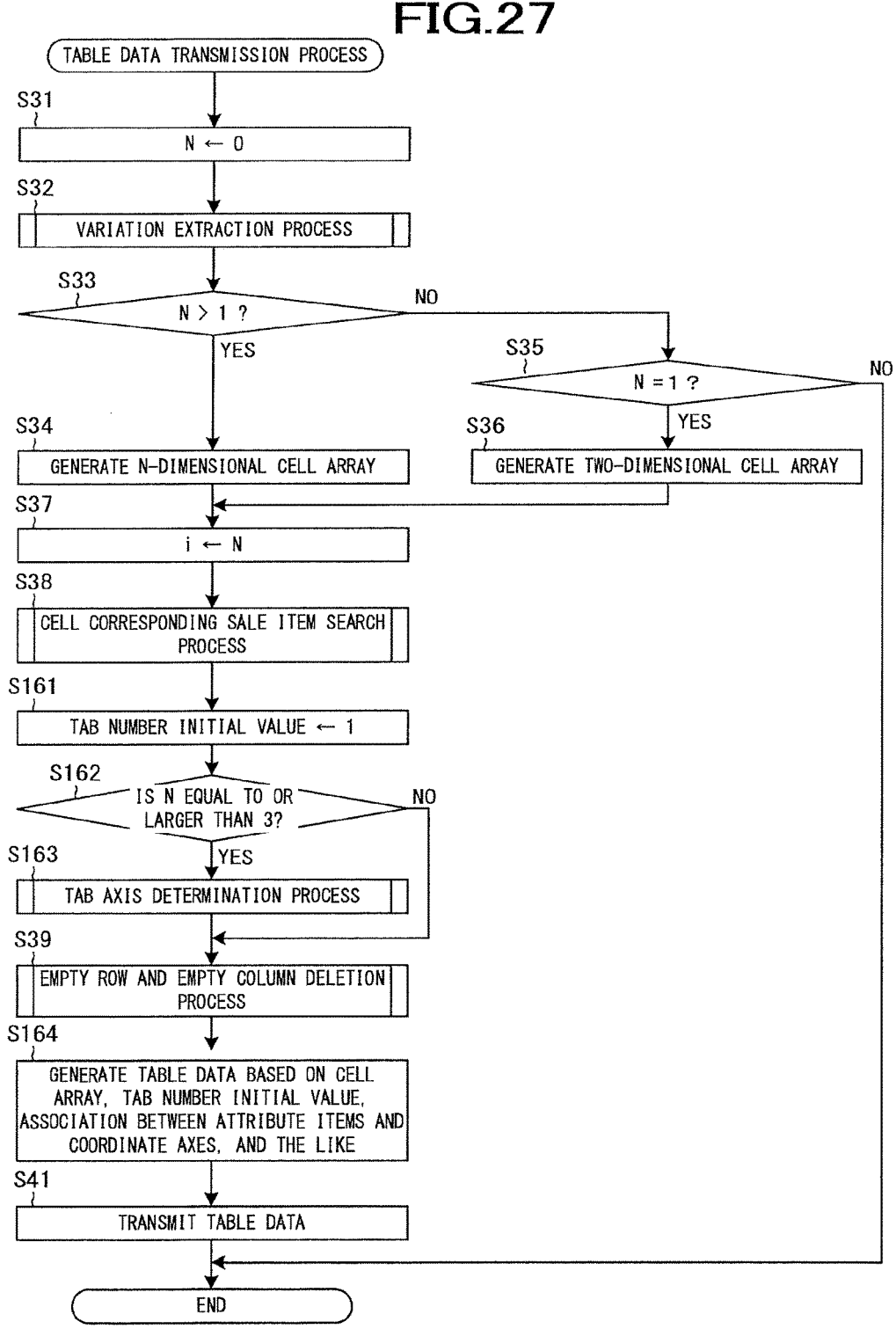
FIG. 27 is a flowchart illustrating a process example of a table data transmission process of a system control unit 14 of the online shopping mall server 1 according to an embodiment.

FIG. 27 is a flowchart illustrating a process example of the table data transmission process of the system control unit 14 of the online shopping mall server 1 according to the present embodiment. In FIG. 27, the same processes as those in FIG. 14 are denoted by the same reference numerals.

As illustrated in FIG. 27, steps S31 to S38 are executed. Next, the tab axis determination unit 151 sets a tab number initial value to 1 (step S161). The tab number initial value is a tab number of a sale item variation table that is displayed first in the sale item variation window 300. Next, the tab axis determination unit 151 determines whether or not the number of dimensions N is greater than or equal to three (step S162). At this time, if the tab axis determination unit 151 determines that the number of dimensions N is not greater than or equal to three (NO in step S162), the tab axis determination unit 151 proceeds to step S39. On the other hand, if the tab axis determination unit 151 determines that the number of dimensions N is greater than or equal to three (YES in step S162), the tab axis determination unit 151 proceeds to step S163. In step S163, the tab axis determination unit 151 executes a tab axis determination process.

Figure 28:
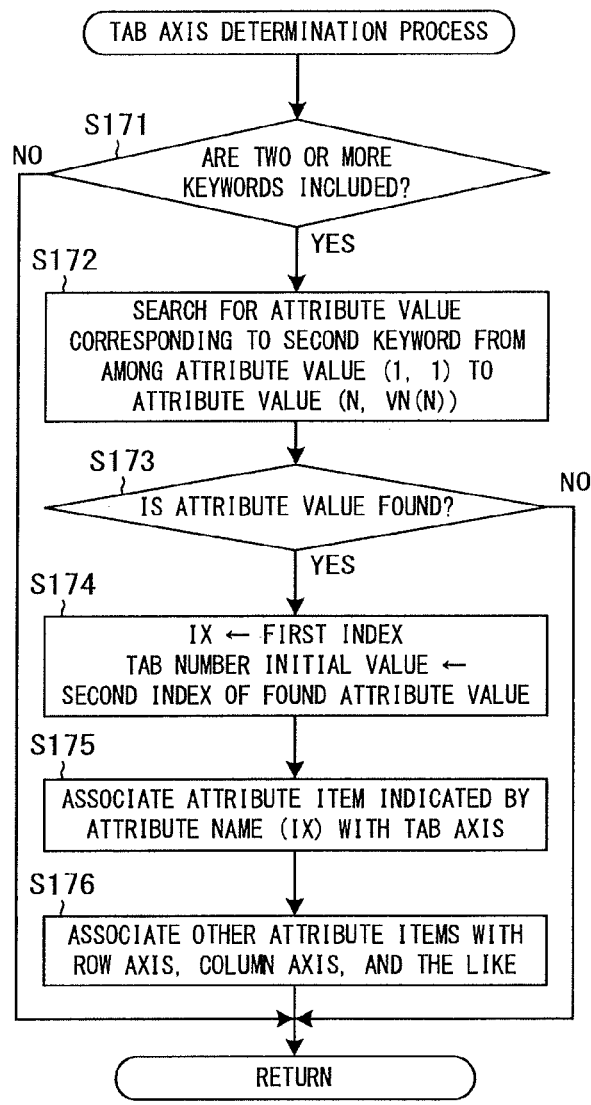
FIG. 28 is a flowchart illustrating a process example of a tab axis determination process of the system control unit 14 of the online shopping mall server 1 according to an embodiment.

FIG. 28 is a flowchart illustrating a process example of the tab axis determination process of the system control unit 14 of the online shopping mall server 1 according to the present embodiment.

As illustrated in FIG. 28, the tab axis determination unit 151 determines whether or not two or more keywords are included in the character string which is being inputted and transmitted from the user terminal 3 in step S2 in FIG. 4 (step S171). At this time, if the tab axis determination unit 151 determines that two or more keywords are included (YES in step S171), the tab axis determination unit 151 proceeds to step S172. On the other hand, if the tab axis determination unit 151 determines that two or more keywords are not included (NO in step S171), the tab axis determination unit 151 ends the tab axis determination process.

In step S172, the tab axis determination unit 151 searches for an attribute value corresponding to the second keyword included in the character string being inputted from among the attribute value (1, 1) to the attribute value (N, VN(N)). Next, the tab axis determination unit 151 determines whether or not the attribute value is found (step S173). At this time, if the tab axis determination unit 151 determines that the attribute value is found (YES in step S173), the tab axis determination unit 151 proceeds to step S174. On the other hand, if the tab axis determination unit 151 determines that the attribute value is not found (NO in step S173), the tab axis determination unit 151 ends the tab axis determination process.

In step S174, the tab axis determination unit 151 sets an index IX to a value of the first index corresponding to an array element of the searched attribute value. Further, the tab axis determination unit 151 sets the tab number initial value to a value of the second index corresponding to the array element of the searched attribute value.

Next, the tab axis determination unit 151 associates an attribute item indicated by an attribute name (IX) with the tab axis (step S175). Next, the tab axis determination unit 151 associates attribute items indicated by attribute names of the attribute name (1) to the attribute name (N) except for the attribute name (IX) with the row axis, the column axis, the in-tab table axis, and the like (step S176). After completing this process, the tab axis determination unit 151 ends the tab axis determination process.

After the tab axis determination process, as illustrated in FIG. 27, the empty row and empty column deletion unit 146 executes step S39. After step S39, the variation display control unit 147 generates table data based on the association between the attribute items and the coordinate axes, the attribute name (1) to the attribute name (N), the cell array, and the tab number initial value (step S164). At this time, the variation display control unit 147 sets the tab number initial value in the table data. Next, the variation display control unit 147 performs step S41 and ends the table data transmission process.

The user terminal 3 displays the sale item variation table on the screen based on the table data received from the online shopping mall server 1. At this time, the user terminal 3 displays the sale item variation table corresponding to a tab indicated by the tab number initial value set in the table data.

As described above, according to the present embodiment, the system control unit 14 identifies a variation corresponding to a keyword included in a character string being inputted into the keyword input field 110 from among variations of attribute value, determines an attribute item corresponding to the identified variation to be an attribute item whose variation is associated with one of a plurality of sale item variation tables, enables a plurality of sale item variation tables to be displayed so that a sale item variation table to be displayed with another one of the plurality of sale item variation tables, and causes a sale item variation table corresponding to the variation corresponding to the keyword to be displayed first among the plurality of sale item variation tables. Therefore, it is possible to cause a sale item variation table corresponding to an item for sale which has an attribute desired by the user to be displayed among a plurality of sale item variation tables.

The online shopping mall server 1 can perform association between the attribute items and coordinate axes by combining the fourth embodiment with at least one of the first to the third embodiments. For example, the online shopping mall server 1 may determine an attribute item to be associated with the tab axis based on a keyword and thereafter may perform association between the attribute items and coordinate axes based on the number of empty cells among attribute items other than the attribute item associated with the tab axis.

5. Fifth Embodiment

Next, a fifth embodiment will be described with reference to FIGS. 29 to 34. In the fifth embodiment, when an empty cell appears in a sale item variation table, the online shopping mall server 1 identifies a substitute sale item according to an attribute value corresponding to the position of the empty cell. Then, the online shopping mall server 1 performs control so that a sale item image and a sale item name of the substitute sale item are displayed in the corresponding cell.

When the number of dimensions is two or more, an empty cell may appear in a sale item variation table. However, when a plurality of the same items for sale are collected to form one set of items for sale, the one set of items for sale may be substantially the same as an item for sale that should have an attribute value corresponding to the position of the empty cell. The online shopping mall server 1 identifies a certain item for sale which satisfies a condition that a plurality of the certain items for sale are substantially the same as the item for sale corresponding to the position of the empty cell when the plurality of the certain items for sale are gathered.

For example, in the case of "ABC", there is no item for sale where the number of cans is 24, the content volume is 350 ml, and the container is a can. Therefore, as illustrated in FIG. 8, the cell C3-1 is an empty cell. However, there is an item for sale where the number of cans is 1, the content volume is 350 ml, and the container is a can. Therefore, if the user purchases 24 pieces of the item for sale, it is substantially the same as purchasing an item for sale where the number of cans is 24, the content volume is 350 ml, and the container is a can. The same goes for a case in which the user purchases four pieces of an item for sale where the number of cans is 6, the content volume is 350 ml, and the container is a can. When obtaining one set of items for sale which are equivalent to an item for sale having an attribute indicated by an attribute value corresponding to the position of a cell, the number of the items for sale which compose the set is referred to as a "required quantity".

Figure 29:
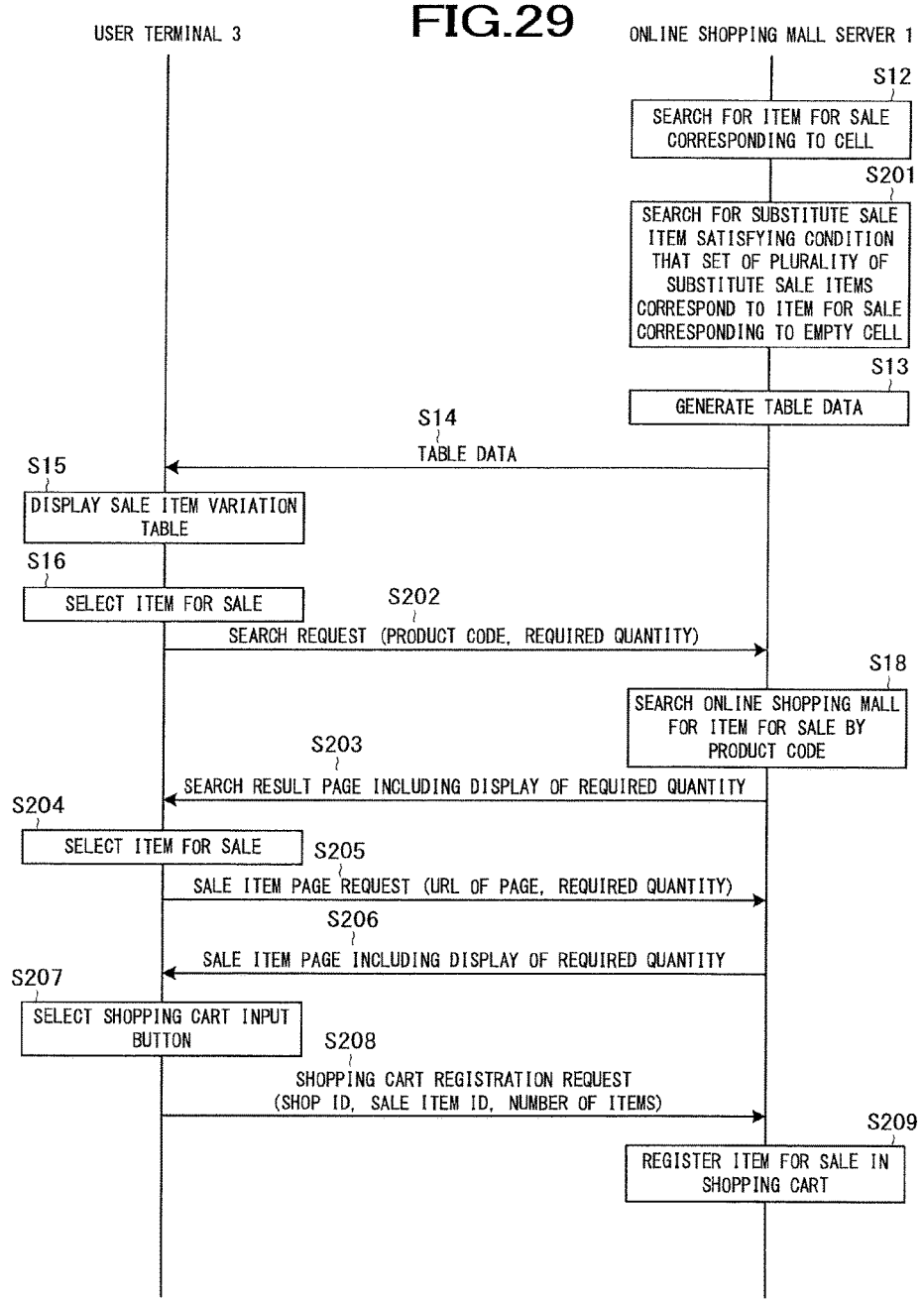
FIG. 29 is a sequence diagram illustrating a process overview of an information processing system S according to an embodiment.

FIG. 29 is a sequence diagram illustrating a process overview of the information processing system S according to the present embodiment. In FIG. 29, the same processes as those in FIG. 4 are denoted by the same reference numerals. After steps S1 to S12 illustrated in FIG. 4, as illustrated in FIG. 29, the online shopping mall server 1 searches for a substitute sale item corresponding to an empty cell from a sale item group of the specified brand (step S201). Next, the online shopping mall server 1 generates table data and transmits the table data (steps S13 and S14). The user terminal 3 displays a sale item variation table based on the table data on the screen (step S15).

Figure 30:
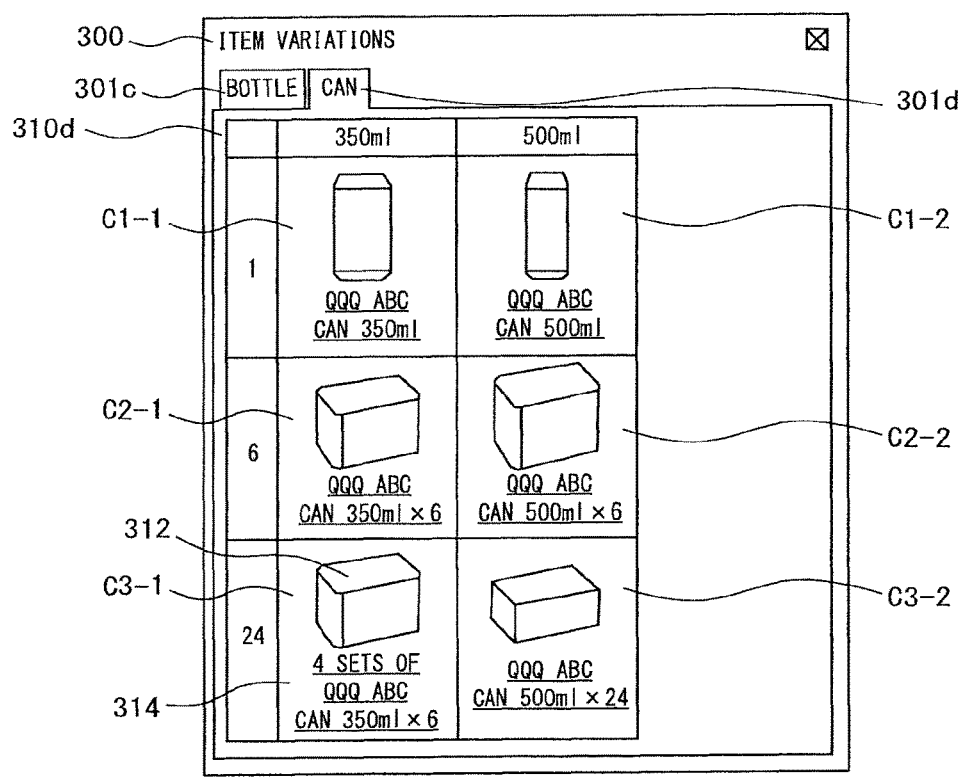
FIG. 30 is a diagram illustrating a display example of a sale item variation window 300 when a user selects a tab 301c.

FIG. 30 is a diagram illustrating a display example of the sale item variation window 300 when the user selects the tab 301c. As illustrated in FIG. 30, the sale item image 312 and the sale item name 314 are displayed in the cell C3-1 which is an empty cell in FIG. 8. The sale item image 312 is, for example, an image of an item for sale where the number of cans is 6, the content volume is 350 ml, and the container is a can. As the sale item name 314, for example, "4 sets of QQQ ABC Can 350 ml×6" is displayed. Here, "QQQ ABC Can 350 ml×6" is the original sale item name. The "4 sets of" indicates the required quantity of the substitute sale item. Since the required quantity is displayed, the user can recognize how many substitute sale items the user should purchase. The sale item name 314 is an example of display information in the present invention. For example, the required quantity of sale item images 312 may be displayed in the cell C3-1 along with the display of the required quantity in the sale item name 314 or instead of the display of the required quantity in the sale item name 314.

The user selects one of the sale item image 312 and the sale item name 314 of the substitute sale item (step S16). Then, the user terminal 3 transmits a search request of items for sale to the online shopping mall server 1 (step S202). The search request in this case includes a product code and a required quantity of the substitute sale item. The online shopping mall server 1 searches for items for sale by the product code included in the search request (step S18). Next, the online shopping mall server 1 generates a sale item page. At this time, the online shopping mall server 1 generates a sale item page including a display of the required quantity. Then, the online shopping mall server 1 transmits a search result page to the user terminal 3 (step S203).

Figure 31A:
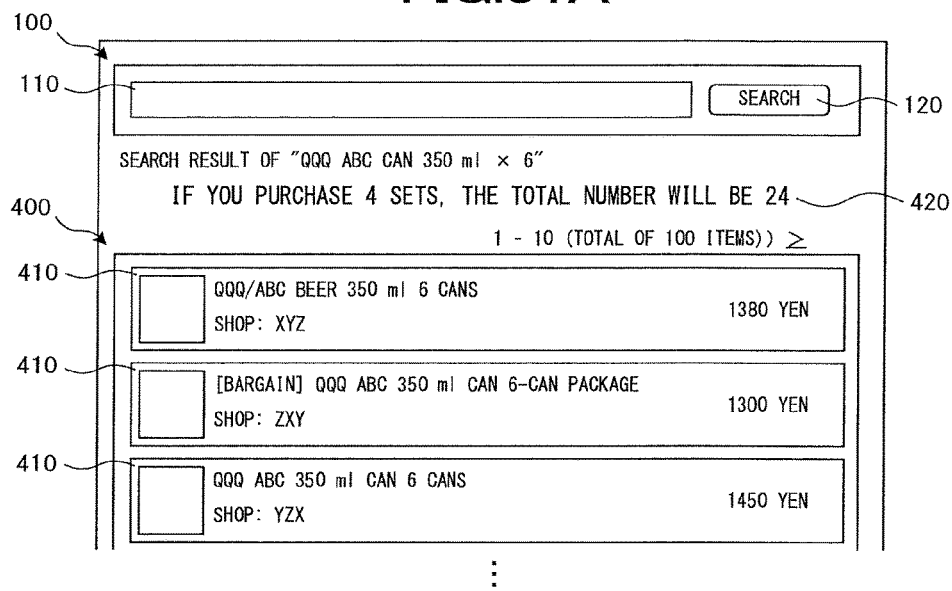
FIG. 31A is a diagram illustrating a display example of a search result page.

FIG. 31A is a diagram illustrating a display example of the search result page. As illustrated in FIG. 31A, the search result page includes a search condition setting area 100, a search result display area 400, a message 420, and the like. In the search result display area 400, a list of found substitute sale item is displayed. The message 420 indicates the required quantity. For example, when the user selects one of the sale item image 312 and the sale item name 314 in the cell C3-1 from the sale item variation table illustrated in FIG. 30, for example, a message "If you purchase 4 sets, the total number will be 24" is displayed as the message 420.

If the user selects one of pieces of searched sale item information 410 from the search result display area 400 (step S204), the user terminal 3 transmits a sale item page request to the online shopping mall server 1 (step S205). The sale item page request includes a URL of the sale item page of the substitute sale item corresponding to the selected searched sale item information 410 and the required quantity. A normal sale item page request does not include the required quantity. The online shopping mall server 1 transmits a sale item page including a display of the required quantity to the user terminal 3 according to the sale item page request (step S206). The user terminal 3 displays the received sale item page on the screen.

Figure 31B:
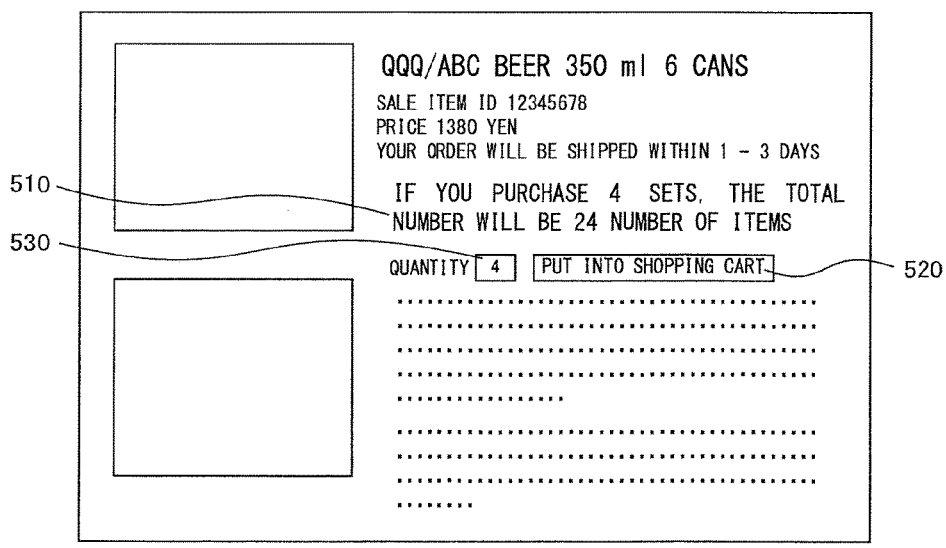
FIG. 31B is a display example of a sale item page.

FIG. 31B is a display example of the sale item page. As illustrated in FIG. 31B, a sale item name, a sale item image, a sale item ID, a sale item price, a sale item description, and the like are displayed on the sale item page. Further, a message 510, a shopping cart registration button 520, and a quantity input field 530 are displayed on the sale item page. The message 510 indicates the required quantity. The content of the message 510 may be, for example, the same as that of the message 420. The shopping cart registration button 520 is a button for putting an item for sale into the shopping cart. The shopping cart is a virtual container into which an item for sale selected by the user as objects to be purchased are put. The user can purchase items for sale from among the items for sale put into the shopping cart. The quantity input field 530 is an input field for inputting a quantity of items for sale to be put into the shopping cart. The required quantity is inputted into the quantity input field 530 in advance.

When the user selects the shopping cart registration button 520, the user terminal 3 transmits a shopping cart registration request to the online shopping mall server 1 (step s208). The shopping cart registration request includes a combination of a shop ID and a sale item ID of the item for sale and the quantity inputted into the quantity input field 530. The online shopping mall server 1 performs a process to register items for sale, which are indicated by the combination of the shop ID and the sale item ID and whose quantity is the quantity included in the shopping cart registration request, in the shopping cart (step S209).

The message 420 and the message 510 are displayed as illustrated in FIGS. 31A and 31B, so that the user can recognize how many substitute sale items the user should purchase. The required quantity is set in the quantity input field 530, so that the user can save the time and effort to input the required quantity. It is not necessary to perform all of the display of the message 420, the display of the message 510, and the setting of the required quantity in the quantity input field 530. For example, any one or two may be executed or none of them may be executed.

Figure 32:
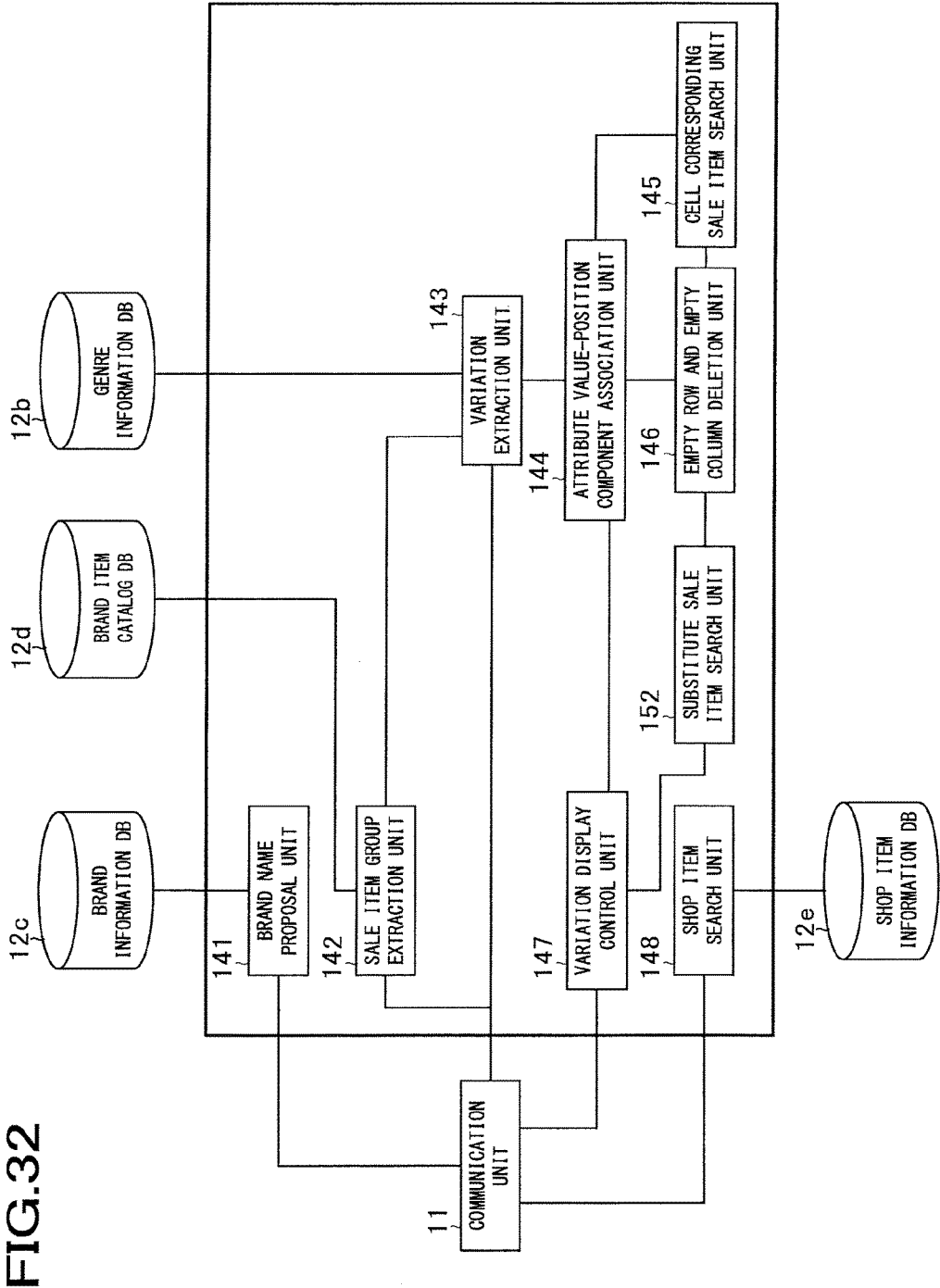
FIG. 32 is a diagram illustrating an example of functional blocks of an online shopping mall server 1 according to an embodiment.

FIG. 32 is a block diagram illustrating an example of functional blocks of the online shopping mall server 1 according to the present embodiment. In FIG. 32, the same components as those in FIG. 13 are denoted by the same reference numerals. As illustrated in FIG. 32, the system control unit 14 functions as a brand name proposal unit 141, a sale item group extraction unit 142, a variation extraction unit 143, an attribute value-position component association unit 144, a cell corresponding sale item search unit 145, an empty row and empty column deletion unit 146, a variation display control unit 147, a shop item search unit 148, and a substitute sale item search unit 152. A combination of the cell corresponding sale item search unit 145 and the substitute sale item search unit 152 is an example of the transaction target identification means in the present invention.

The substitute sale item search unit 152 determines whether or not there is an attribute item corresponding to substituting an item for sale among attribute items where there are variations of attribute value. For example, regarding beverage, the number of bottles or cans corresponds to substituting, but the container does not correspond to substituting. This is because it is not possible to replace a can with a bottle. The attribute information that is registered in the genre information DB 12b includes a substitute corresponding flag in order to determine an attribute item corresponding to substituting. The substitute corresponding flag indicates whether or not an attribute item corresponds to substituting an item for sale. When there is an attribute item corresponding to substituting an item for sale, the substitute sale item search unit 152 searches for a substitute sale item corresponding to an empty cell. An administrator of the online shopping mall can arbitrarily determine an attribute item corresponding to substituting an item for sale for each genre. For example, the number of items may be an attribute item corresponding to substituting an item for sale. Whether or not an attribute item can correspond to substituting an item for sale may be different depending on genre. For example, the content volume, the weight, the length, and the like may correspond to substituting an item for sale in a genre of material, but they do not correspond to substituting an item for sale in a genre of electrical appliances.

FIG. 33 is a flowchart illustrating a process example of the table data transmission process of the system control unit 14 of the online shopping mall server 1 according to the present embodiment. In FIG. 33, the same processes as those in FIG. 14 are denoted by the same reference numerals.

As illustrated in FIG. 33, steps S31 to S39 are performed. Next, the substitute sale item search unit 152 determines whether or not there is an attribute item corresponding to substituting an item for sale among attribute items indicated by the attribute name (1) to the attribute name (N) based on the substitute corresponding flags (step S221). At this time, if the substitute sale item search unit 152 determines that there is an attribute item corresponding to substituting an item for sale (YES in step S221), the substitute sale item search unit 152 proceeds to step S222. On the other hand, if the substitute sale item search unit 152 determines that there is no attribute item corresponding to substituting an item for sale (NO in step S221), the substitute sale item search unit 152 proceeds to step S40. In step S222, the substitute sale item search unit 152 executes a substitute sale item search process.

FIG. 34 is a flowchart illustrating a process example of the substitute sale item search process of the system control unit 14 of the online shopping mall server 1 according to the present embodiment.

As illustrated in FIG. 34, the substitute sale item search unit 152 selects one array element corresponding to an empty cell from the cell array (step S231). Next, the substitute sale item search unit 152 searches, from among the catalog information group of the specified brand, for catalog information including an attribute value corresponding to an attribute item that does not correspond to substituting an item for sale among attribute values corresponding to the selected array element (step S232). Next, the substitute sale item search unit 152 searches, from among the catalog information found in step S232, for catalog information including a true divisor of an attribute value corresponding to an attribute item corresponding to substituting an item for sale as an attribute value among attribute values corresponding to the selected array element (step S233).

Next, the substitute sale item search unit 152 determines whether or not the catalog information is found in step S233 (step S234). At this time, if the substitute sale item search unit 152 determines that the catalog information is found (YES in step S234), the substitute sale item search unit 152 proceeds to step S235. On the other hand, if the substitute sale item search unit 152 determines that the catalog information is not found (NO in step S234), the substitute sale item search unit 152 proceeds to step S239.

In step S235, the variation display control unit 147 divides the attribute value corresponding to an attribute item corresponding to substituting an item for sale among attribute values corresponding to the selected array element by an attribute value corresponding to an attribute item corresponding to substituting an item for sale among attribute values included in the found catalog information. Thereby, the variation display control unit 147 calculates the required quantity. When a plurality pieces of catalog information is selected, the variation display control unit 147 may use any piece of catalog information.

Next, the variation display control unit 147 acquires a sale item name, a URL of a sale item image, and a product code from the searched catalog information (step S236). Next, the variation display control unit 147 generates data of link indicating an item for sale based on the acquired information and the required quantity (step S237). At this time the variation display control unit 147 generates data of link so that a search request including the product code and the required quantity is transmitted, when the sale item image 312 or the sale item name 314 is selected. Next, the variation display control unit 147 stores the generated link data in the selected array element (step S238). Next, the variation display control unit 147 proceeds to step S239.

In step S239, the substitute sale item search unit 152 determines whether or not there is an array element which has not yet been selected among the array elements corresponding to an empty cell from the cell array. At this time, if the substitute sale item search unit 152 determines that there is an array element which has not yet been selected (YES in step S239), the substitute sale item search unit 152 proceeds to step S240. In step S240, the substitute sale item search unit 152 selects one array element which has not yet been selected among the array elements corresponding to an empty cell. Next, the substitute sale item search unit 152 proceeds to step S232. On the other hand, if the substitute sale item search unit 152 determines that all the array elements corresponding to an empty cell have been selected (NO in step S239), the substitute sale item search unit 152 ends the substitute sale item search process.

After the substitute sale item search process, as illustrated in FIG. 33, the variation display control unit 147 executes steps S40 and S41 and ends the table data transmission process.

As described above, according to the present embodiment, the system control unit 14 identifies an item for sale to be a component of one item for sale and a required quantity of the components so that the one item for sale has an attribute indicated by a variation corresponding to an empty cell when the one item for sale is formed by a plurality of the same items for sale for an empty cell that does not have an item for sale having an attribute indicated by a corresponding variation, and causes a sale item variation table in which the cell includes a sale item image and a sale item name according to the identified item for sale and the identified required quantity to be displayed. Therefore, even for an empty cell, when a plurality of items for sale is purchased, if the items for sale are substantially equivalent to an item for sale having an attribute indicated by an attribute value corresponding to the empty cell, a sale item image and a sale item name of the item for sale are displayed in content according to the required quantity. Therefore, the user can easily recognize that there is a substitute sale item.

The online shopping mall server 1 can perform processing by combining the fifth embodiment with at least one of the first to the fourth embodiments.

In the embodiments described above, when the user selects one of the sale item image 312 and the sale item name 313, the online shopping mall server 1 searches for items for sale and causes the user terminal 3 to display a search result page. However, the online shopping mall server 1 may cause the user terminal 3 to display a web page related to an item for sale indicated by the selected sale item image 312 or sale item name 313 based on, for example, catalog information. On the web page, for example, a sale item name, a brand name, a genre name, a sale item description, each attribute value, and the like are displayed.

The online shopping mall server 1 may perform association between the attribute items and the coordinate axes based on a sale item image. For example, the online shopping mall server 1 compares corresponding sale item images between variations of attribute value for an attribute item where there are variations of attribute value. Thereby, the online shopping mall server 1 calculates a degree of image similarity between the sale item images. Then, the online shopping mall server 1 associates an attribute item whose degree of image similarity is the lowest with the tab axis. Thereby, a sale item variation table of items for sale whose appearances are relatively similar to each other is displayed. The online shopping mall server 1 may set priorities so that the higher the degree of similarity of an attribute item is, the higher the priority of the attribute item becomes, and perform association between the attribute items and the coordinate axes based on the priorities.

The online shopping mall server 1 does not have to perform association of one or more part of variations among variations of attribute value. The online shopping mall server 1 only has to perform association of at least one variation.

In the embodiments described above, the present invention is applied to the online shopping mall in which items for sale are sold from a plurality of shops. However, the present invention may be applied to a web site of electronic commerce in which items for sale are sold from a single distributor.

In the embodiments described above, the transaction target of the present invention is applied to an item for sale. However, the transaction target of the present invention can be applied to a thing that can be commercially traded. For example, the transaction target of the present invention may be applied to a service. For example, the present invention may be applied to a reservation of an accommodation facility, a reservation of a ticket, a reservation of a seat on a transport facility, and the like. In the case of a service, there is a service brand as a brand of the transaction target.

In the embodiments described above, the information processing apparatus of the present invention is applied to a server device in a client-server system. However, the information processing apparatus of the present invention may be applied to an information processing apparatus other than the server device. For example, the information processing apparatus of the present invention may be applied to the user terminal 3 or the like. For example, a control unit included in an information processing apparatus functions as means in the present invention, and thereby the control unit may cause the table according to the present invention to be displayed by a display means such as a display. In this case, the display means may be included in the information processing apparatus. Or, the display means may be a device separate from the information processing apparatus.

REFERENCE SIGNS LIST

1 ONLINE SHOPPING MALL SERVER
2 SHOP TERMINAL
3 USER TERMINAL
11 COMMUNICATION UNIT
12 STORAGE UNIT
12A MEMBER INFORMATION DB
12B GENRE INFORMATION DB
12C BRAND ITEM INFORMATION DB
12D BRAND ITEM CATALOG DB
12E SHOP ITEM INFORMATION DB
13 INPUT/OUTPUT INTERFACE
14 SYSTEM CONTROL UNIT
14A CPU
14B ROM
14C RAM
15 SYSTEM BUS
141 BRAND NAME PROPOSAL UNIT
142 SALE ITEM GROUP EXTRACTION UNIT
143 VARIATION EXTRACTION UNIT
144 ATTRIBUTE VALUE-POSITION COMPONENT ASSOCIATION UNIT
145 CELL CORRESPONDING SALE ITEM SEARCH UNIT
146 EMPTY ROW AND EMPTY COLUMN DELETION UNIT
147 VARIATION DISPLAY CONTROL UNIT
148 SHOP ITEM SEARCH UNIT
149 ASSOCIATION CHANGE UNIT
150 ROW AXIS AND COLUMN AXIS DETERMINATION UNIT
151 TAB AXIS DETERMINATION UNIT
152 SUBSTITUTE SALE ITEM SEARCH UNIT
NW NETWORK
S INFORMATION PROCESSING SYSTEM

The invention claimed is:

1. An information processing apparatus comprising:
at least one non-transitory memory operable to store computer program code; and
at least one processor operable to read said computer program code and operate as instructed by said computer program code, said computer program code comprising:
determination code configured to cause at least one of said at least one processor to determine, for a transaction target group identified based on a user operation from transaction targets each having an attribute indicated by an attribute value corresponding to an attribute item, whether there are two or more attribute values for each attribute item;
association code configured to cause at least one of said at least one processor to associate the attribute item where it is determined that there are two or more attribute values by the determination code with tables, rows, or columns;
transaction target identification code configured to cause at least one of said at least one processor to identify, based on association by the association code, the transaction target having the attribute indicated by the attribute value corresponding to a cell of the table from among the transaction target group for each cell; and
table display control code configured to cause at least one of said at least one processor to display the table in which the cell includes display information indicating the transaction target identified by the transaction target identification code,
comparison code configured to cause at least one of said at least one processor to compare the number of vertical cells in the table and corresponding vertical length of a screen area in which the table is displayed with the number of horizontal cells in the table and corresponding horizontal length of the screen area, wherein
as a result of the comparing, when it determined that, the vertical length is greater than the horizontal length and the number of horizontal cells are greater the vertical cells, or when the horizontal length is greater than the vertical length and the number of horizontal cells are less than the vertical cells, the association code is further configured to cause at least one of said at least one processor to switch the attribute items between rows and columns.

2. The information processing apparatus according to claim 1, further comprising:
attribute item information acquisition code configured to cause at least one of said at least one processor to acquire attribute item information of a division to which the transaction target group belongs from an attribute item information storage storing the attribute item information indicating the attribute item for each division of the transaction target; and
attribute value acquisition code configured to cause at least one of said at least one processor to acquire the attribute value of each transaction target included in the transaction target group from an attribute value storage storing the attribute value of each transaction target for each transaction item,
wherein the determination code is further configured to cause at least one of said at least one processor to determine whether there are two or more attribute values on the basis of the attribute value acquired by the attribute value acquisition code for the attribute item indicated by the attribute item information acquired by the attribute item information acquisition code.

3. The information processing apparatus according to claim 1, wherein
the transaction target group is identified by using a brand of the transaction target, which is positioned in a layer lower than that of a corporate brand in a hierarchy of brands.

4. The information processing apparatus according to claim 1, wherein
the association code includes an attribute item determination code configured to cause at least one of said at least one processor to determine the attribute item that is associated with the rows, the attribute item that is associated with the columns, and the attribute item that is associated with the tables when there are three or more attribute items where it is determined that there are two or more attribute values by the determination code, and
the table display control code further configured to cause at least one of said at least one processor to display each of the tables.

5. The information processing apparatus according to claim 4, further comprising:
priority acquisition code configured to cause at least one of said at least one processor to acquire priorities of the attribute items in the division to which the transaction target group belongs from a priority storage storing priorities of the attribute items for each division, wherein the attribute item determination code is further configured to cause at least one of said at least one processor to determine the attribute item that is associated with the tables on the basis of the priority acquired by the priority acquisition code.

6. The information processing apparatus according to claim 4, wherein
the table display control code is further configured to cause at least one of said at least one processor to display the table with empty cells, and
the attribute item determination code is further configured to cause at least one of said at least one processor to determine the attribute item that is associated with the tables so that empty cells in the tables is the smallest.

7. The information processing apparatus according to claim 4, further comprising:
attribute value identification code configured to cause at least one of said at least one processor to identify the attribute value corresponding to a search condition specified based on the user operation from among the attribute values where it is determined that there are two or more of them by the determination code,
wherein the attribute item code is further configured to cause at least one of said at least one processor to determine the attribute item corresponding to the attribute value identified by the attribute value identification code to be the attribute item associated with the tables, and
the table display control code is further configured to cause at least one of said at least one processor to display each of the tables so that a table to be displayed can be replaced with another table of the tables, and displays the table corresponding to the attribute value identified by the attribute value identification code first among the tables.

8. The information processing apparatus according to claim 1, wherein
for the cell to which there is no transaction target having the attribute indicated by the attribute value corresponding, the transaction target identification code is further configured to cause at least one of said at least one processor to identify a transaction target to be a component of one transaction target and a number of the components so that the one transaction target has the attribute indicated by the attribute value corresponding to the cell when the same transaction targets compose the one transaction target, and
the table display control code is further configured to cause at least one of said at least one processor to display the table in which the cell includes the display information according to the transaction target and the number that are identified by the transaction target identification code.

9. The information processing apparatus according to claim 1, further comprising:
division display control code configured to cause at least one of said at least one processor to display one or more divisions identified based on a word included in a search character string inputted by a user from among divisions of the transaction target;
transaction target group identification code configured to cause at least one of said at least one processor to identify the transaction target group belonging to the division specified by the user from the one or more displayed divisions;
search code configured to cause at least one of said at least one processor to search, when any of the display information is specified by the user from the displayed table, a transaction target information storage for transaction target information related to the transaction target indicated by the specified display information, the transaction target information storage storing the transaction target information related to the transaction target provided from each of providers that may provide the same transaction targets, the providers being different from each other; and
search result display control code configured to cause at least one of said at least one processor to display a search result by the search code,
wherein the determination code is further configured to cause at least one of said at least one processor to determine whether there are two or more attribute values for the transaction target group identified by the transaction target group identification code.

10. An information processing method performed by a computer, the method comprising:
determining, for a transaction target group identified based on a user operation from among transaction targets each having an attribute indicated by an attribute value corresponding to an attribute item, whether there are two or more attribute values for each attribute item;
associating the attribute item where it is determined that there are two or more attribute values with tables, rows, or columns;
identifying, based on the association, the transaction target having the attribute indicated by the attribute value corresponding to a cell of the table from among the transaction target group for each cell;
displaying the table in which the cell includes display information indicating the transaction target identified;
comparing the number of vertical cells in the table and corresponding vertical length of a screen area in which the table is displayed with the number of horizontal cells in the table and corresponding horizontal length of the screen area, wherein
as a result of the comparing, when it determined that, the vertical length is greater than the horizontal length and the number of horizontal cells are greater than the vertical cells, or when the horizontal length is greater than the vertical length and the number of horizontal cells are less than the vertical cells, switching the attribute items between rows and columns.

11. The information processing apparatus according to claim 2, wherein
the transaction target group is identified by using a brand of the transaction target, which is positioned in a layer lower than that of a corporate brand in a hierarchy of brands.

12. The information processing apparatus according to claim 2, wherein
the association code includes a row-column determination code configured to cause at least one of said at least one processor to determine, for at least one of the attribute items where it is determined that there are two or more attribute values by the determination code, whether the attribute item is associated with the rows or the columns so that a number relationship between a number of vertical cells and a number of horizontal cells in the table corresponds to a length relationship between a vertical length and a horizontal length of an area in which the table is displayed.

13. The information processing apparatus according to claim 3, wherein the association code includes a row-column determination code configured to cause at least one of said at least one processor to determine, for at least one of the attribute items where it is determined that there are two or more attribute values by the determination code, whether the attribute item is associated with the rows or the columns so that a number relationship between a number of vertical cells and a number of horizontal cells in the table corresponds to a length relationship between a vertical length and a horizontal length of an area in which the table is displayed.

14. The information processing apparatus according to claim 2, wherein
the association code includes an attribute item determination code configured to cause at least one of said at least one processor to determine the attribute item that is associated with the rows, the attribute item that is associated with the columns, and the attribute item that is associated with the tables when there are three or more attribute items where it is determined that there are two or more attribute values by the determination code, and
the table display control code is configured to cause at least one of said at least one processor to display each of the tables.

15. The information processing apparatus according to claim 3, wherein
the association code includes an attribute item determination code configured to cause at least one of said at least one processor to determine the attribute item that is associated with the rows, the attribute item that is associated with the columns, and the attribute item that is associated with the tables when there are three or more attribute items where it is determined that there are two or more attribute values by the determination code, and
the table display control code is configured to cause at least one of said at least one processor to display each of the tables.

16. The information processing apparatus according to claim 1, wherein
the association code includes an attribute item determination code configured to cause at least one of said at least one processor to determine the attribute item that is associated with the rows, the attribute item that is associated with the columns, and the attribute item that is associated with the tables when there are three or more attribute items where it is determined that there are two or more attribute values by the determination code, and
the table display control code is configured to cause at least one of said at least one processor to display each of the tables.

17. The information processing apparatus according to claim 5, wherein
the table display control code is configured to cause at least one of said at least one processor to display the table with empty cells, and
the attribute item determination code is configured to cause at least one of said at least one processor to determine the attribute item that is associated with the tables so that empty cells in the tables is the smallest.

18. The information processing apparatus according to claim 5, further comprising:
attribute value identification code configured to cause at least one of said at least one processor to identify the attribute value corresponding to a search condition specified based on the user operation from among the attribute values where it is determined that there are two or more of them by the determination code,
wherein the attribute item determination code is configured to cause at least one of said at least one processor to determine the attribute item corresponding to the attribute value identified by the attribute value identification code to be the attribute item associated with the tables, and
the table display control code is configured to cause at least one of said at least one processor to display each of the tables so that a table to be displayed can be replaced with another table of the tables, and display the table corresponding to the attribute value identified by the attribute value identification code at first among the tables.

19. The information processing apparatus according to claim 6, further comprising:
attribute value identification code configured to cause at least one of said at least one processor to identify the attribute value corresponding to a search condition specified based on the user operation from among the attribute values where it is determined that there are two or more of them by the determination code,
wherein the attribute item determination code is configured to cause at least one of said at least one processor to determine the attribute item corresponding to the attribute value identified by the attribute value identification code to be the attribute item associated with the tables, and
the table display control code is configured to cause at least one of said at least one processor to display each of the tables so that a table to be displayed can be replaced with another table of the tables, and displays the table corresponding to the attribute value identified by the attribute value identification code at first among the tables.

20. A non-transitory recording medium on which a product information display program is recorded, the product information display program causing a computer to:
determine, for a transaction target group identified based on a user operation from among transaction targets each having an attribute indicated by an attribute value corresponding to an attribute item, whether there are two or more attribute values for each attribute item;
associate the attribute item where it is determined that there are two or more attribute values with tables, rows, or columns;
identify, based on the association, the transaction target having the attribute indicated by the attribute value corresponding to a cell of the table from among the transaction target group for each cell;
display the table in which the cell includes display information indicating the transaction target identified;
compare the number of vertical cells in the table and corresponding vertical length of a screen area in which the table is displayed with the number of horizontal cells in the table and corresponding horizontal length of the screen area, wherein
as a result of the comparing, when it determined that, the vertical length is greater than the horizontal length and the number of horizontal cells are greater than the vertical cells, or when the horizontal length is greater than the vertical length and the number of horizontal cells are less than the vertical cells, switch the attribute items between rows and columns.

\* \* \* \* \*